United States Patent
Cox

(10) Patent No.: US 10,833,611 B2
(45) Date of Patent: Nov. 10, 2020

(54) DUAL-INVERTER FOR A BRUSHLESS MOTOR

(71) Applicant: Black & Decker Inc., New Britain, CT (US)

(72) Inventor: John D. Cox, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/699,040

(22) Filed: Sep. 8, 2017

(65) Prior Publication Data

US 2018/0076745 A1 Mar. 15, 2018

Related U.S. Application Data

(60) Provisional application No. 62/385,433, filed on Sep. 9, 2016.

(51) Int. Cl.
*H02P 25/22* (2006.01)
*H02P 6/28* (2016.01)
(Continued)

(52) U.S. Cl.
CPC .............. *H02P 6/12* (2013.01); *B25F 5/02* (2013.01); *H02J 9/061* (2013.01); *H02M 3/10* (2013.01);
(Continued)

(58) Field of Classification Search
CPC .......... H02P 6/12; H02P 27/08; H02P 25/184; H02P 6/085; H02P 4/00; H02P 25/22; H02P 2209/01; H02P 6/28; H02P 6/182; H02P 27/06; H02P 6/14; B25F 5/02; H02M 3/10; H02M 7/53875; H02J 9/061; H02J 1/10; H02K 7/145
See application file for complete search history.

(56) References Cited

U.S. PATENT DOCUMENTS

| 6,456,033 | B1 | 9/2002 | Nishimura |
| 9,024,563 | B2 * | 5/2015 | Bunte ............... F03D 7/0224 318/494 |

(Continued)

FOREIGN PATENT DOCUMENTS

| DE | 102014224432 | 6/2016 |
| EP | 2290791 | 3/2011 |

(Continued)

OTHER PUBLICATIONS

Extended EPSR dated Feb. 8, 2018 issued in corresponding EP application No. 17189979.2.
(Continued)

*Primary Examiner* — Bickey Dhakal
(74) *Attorney, Agent, or Firm* — Amir Rohani

(57) ABSTRACT

A power tool is provided including: an electric brushless direct current (BLDC) motor having rotor and a stator defining phases; a power unit including a first switch circuit connected electrically between a first power supply and the motor, and a second switch circuit connected electrically between a second power supply and the motor; and a controller configured to control a switching operation of the first switch circuit and the second switch circuit to regulate a supply of power from at least one of the first power supply and/or the second power supply to the motor.

17 Claims, 42 Drawing Sheets

(51) Int. Cl.
    *H02P 4/00*                (2006.01)
    *H02P 6/14*                (2016.01)
    *H02J 9/06*                (2006.01)
    *H02M 7/5387*          (2007.01)
    *H02P 27/06*             (2006.01)
    *H02P 6/12*                (2006.01)
    *H02P 25/18*             (2006.01)
    *H02P 27/08*             (2006.01)
    *B25F 5/02*                (2006.01)
    *H02M 3/10*              (2006.01)
    *H02P 6/08*                (2016.01)
    *H02P 6/182*             (2016.01)

(52) U.S. Cl.
    CPC .......... *H02M 7/53875* (2013.01); *H02P 4/00* (2013.01); *H02P 6/085* (2013.01); *H02P 6/14* (2013.01); *H02P 6/182* (2013.01); *H02P 6/28* (2016.02); *H02P 25/184* (2013.01); *H02P 25/22* (2013.01); *H02P 27/06* (2013.01); *H02P 27/08* (2013.01); *H02P 2209/01* (2013.01)

(56) References Cited

U.S. PATENT DOCUMENTS

| | | | |
|---|---|---|---|
| 9,314,900 B2* | 4/2016 | Vanko | B24B 23/028 |
| 9,692,343 B2 | 6/2017 | Kuramitsu | |
| 2003/0085627 A1 | 5/2003 | Lipo | |
| 2003/0127932 A1* | 7/2003 | Ishida | B25F 5/00 |
| | | | 310/184 |
| 2004/0046614 A1 | 3/2004 | Pigott | |
| 2008/0116770 A1 | 5/2008 | Lewis | |
| 2009/0295313 A1* | 12/2009 | Suzuki | B25F 5/00 |
| | | | 318/139 |
| 2009/0309523 A1 | 12/2009 | Ikei | |
| 2010/0289372 A1 | 11/2010 | Taniguchi et al. | |
| 2011/0101906 A1 | 5/2011 | Tagome | |
| 2011/0227523 A1 | 9/2011 | Grantz | |
| 2013/0033210 A1 | 2/2013 | Suzuki et al. | |
| 2013/0181295 A1 | 7/2013 | Russell | |
| 2013/0328493 A1 | 12/2013 | Munday | |
| 2014/0009101 A1 | 1/2014 | Diel | |
| 2014/0265604 A1* | 9/2014 | Mergener | H02J 7/0063 |
| | | | 307/80 |
| 2016/0020443 A1 | 1/2016 | White et al. | |
| 2016/0036371 A1* | 2/2016 | Yamasaki | B62D 5/0403 |
| | | | 318/400.22 |
| 2016/0204728 A1 | 7/2016 | Notohara et al. | |
| 2016/0328928 A1 | 11/2016 | Lutz | |
| 2017/0187199 A1 | 6/2017 | Wei et al. | |
| 2017/0264178 A1* | 9/2017 | Stauder | H02K 3/18 |
| 2017/0346436 A1* | 11/2017 | Hara | H02P 29/032 |
| 2017/0373620 A1* | 12/2017 | Chang | H02P 27/06 |
| 2019/0152524 A1* | 5/2019 | Fujita | B62D 15/0215 |

FOREIGN PATENT DOCUMENTS

| | | | |
|---|---|---|---|
| EP | 3006257 | 4/2016 | |
| EP | 3006257 A1 * | 4/2016 | .......... B60L 11/1814 |
| WO | 2015179318 | 11/2015 | |
| WO | 2016115684 | 7/2016 | |
| WO | WO-2016115684 A1 * | 7/2016 | .............. H02P 27/06 |

OTHER PUBLICATIONS

Extended EPSR dated Feb. 13, 2018 issued in corresponding EP application No. 17189981.8.
Extended EPSR dated Feb. 7, 2018 issued in corresponding EP application No. 17189985.9.
Extended EPSR dated Feb. 7, 2018 issued in corresponding EP application No. 17189986.7.

* cited by examiner

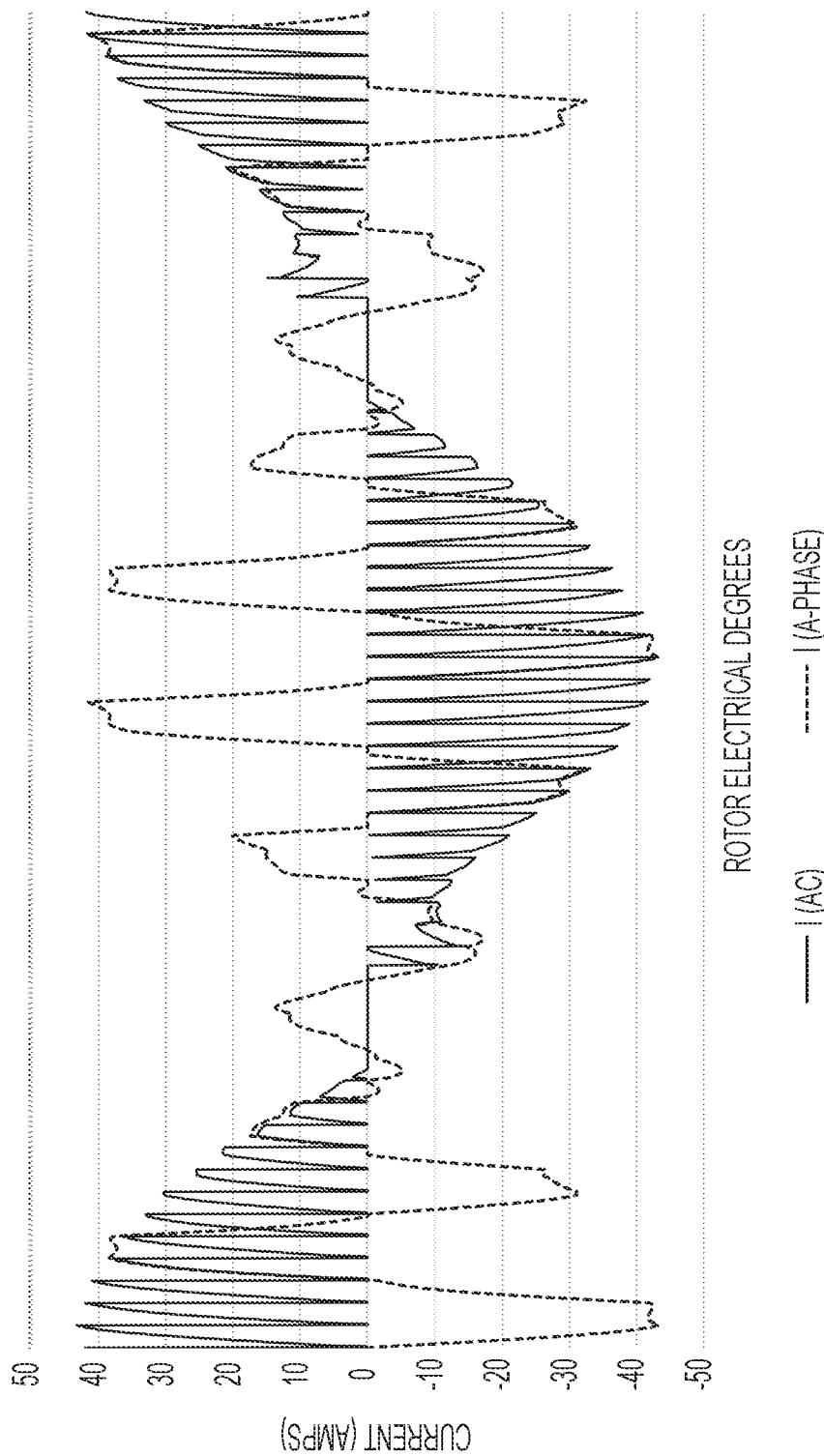

DUAL-INVERTER FOR A BRUSHLESS MOTOR

RELATED APPLICATION

This application claims the benefit of U.S. Provisional Application No. 62/385,433 filed Sep. 9, 2016, content of which is incorporated herein by reference in its entirety.

FIELD

This disclosure relates to brushless motor controls. More particularly, the present invention relates to a dual-inverter circuit for a brushless motor.

BACKGROUND

Power tools may be of different types depending on the type of output provided by the power tool. Power tools such as drills, hammers, grinders, impact wrenches, circular saws, reciprocating saws, and so on are marketed in different parts of the world and used widely in consumer, DIY, and construction market. Power tools may be provided with a rotary motor such as a brushless DC (BLDC) motor.

Conventionally, large power tools that require high power for heavy duty applications may be powered by an alternating current (AC) power source, while other portable power tools may be powered by a direct current (DC) power source such as a battery pack. More recently, power tools that were conventionally powered by AC power sources only have been provided with the capability to receive AC or DC power supplies. U.S. Pat. No. 9,406,915, filed May 18, 2015, which incorporated herein by reference in its entirety, provides examples of AC/DC power tools that can be powered by an AC power supply, a DC power supply, or a hybrid combination of AC and DC power supplies.

Power tools including BLDC motors typically include an inverter circuit including a series of semiconductor solid-state switches that drive the different phases of the motor. The type of switches employed in such circuits are selected based on the power output requirements.

BLDC motors may also be wound differently based on the power output requirements. The two basic winding configurations for the phases of the motor are wye and delta connections. A motor with windings configured in the delta configuration can operate at a greater speed than the same windings configured in the wye configuration. A motor with windings configured in the wye configuration can operate with a greater torque than the same windings configured in the delta configuration.

Furthermore, the windings within each phase of the motor may be connected in either series or parallel. A series connection is often more suitable for relatively high voltage applications, and a parallel connection is often more suitable for relatively low voltage applications.

What is needed is a system that can utilize proper inverter switches for the needed application without sacrificing performance. What is further needed is a system that can configure the motor in the most effective manner based on the power requirements of the power tool to increase motor efficiency.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to an embodiment of the invention, a power tool is provided including: an electric brushless direct current (BLDC) motor having rotor and a stator defining phases; a power unit including a first switch circuit connected electrically between a first power supply and the motor, and a second switch circuit connected electrically between a second power supply and the motor; and a controller configured to control a switching operation of the first switch circuit and the second switch circuit to regulate a supply of power from at least one of the first power supply and/or the second power supply to the motor.

In an embodiment, the first power supply is an alternating current (AC) power supply coupled to a bridge rectifier to generate a positive voltage waveform, and the second power supply is a direct current (DC) power supply.

In an embodiment, the first switch circuit includes insulated-gate bipolar transistors (IGBTs) and the second switch circuit includes field-effect transistors (FETs).

In an embodiment, the stator defines three phases with each phase corresponding to two windings electrically connected. In an embodiment, each of the first switch circuit and the second switch circuit is configured as a three-phase inverter circuit. In an embodiment, each phase is electrically coupled to both the first switch circuit and the second switch circuit and is selectively driven by one of the first switch circuit or the second switch circuit.

In an embodiment, the stator defines six phases with each phase corresponding to a winding, a first set of windings being coupled to the first switch circuit and a second set of windings being coupled to second switch circuit. In an embodiment, the first set of windings and the second set of windings are alternatingly distributed around the stator. In an embodiment, the first set of windings includes thicker magnet wires wound at a lower number of turns than the second set of windings.

In an embodiment, the first and the second power supplies drive the motor in tandem. In an embodiment, the first power supply is an alternating current (AC) power supply, the second power supply is a direct current (DC) power supply, and a current draw by the motor exceeds an average current provided by the first power supply. In an embodiment, the controller is configured to enable current draw from the second power supply when the current draw by the motor exceeds a threshold. In an embodiment, the controller is configured to enable current draw from the second power supply for predetermined time periods before and after zero-crossings of the first power supply voltage.

In an embodiment, the power tool further includes a charging circuit arranged to charge the second power supply from the power supplied via the first power supply. In an embodiment, the charging circuit is arranged between one or more drive signals of the first switch circuit and the second power supply.

In an embodiment, the power tool further includes a power supply regulator coupled to the first power supply and the second power supply to generate a voltage signal for powering the controller.

According to another aspect/embodiment of the invention, a power tool is provided including: an electric brushless direct current (BLDC) motor having a rotor and a stator defining phases; a power unit including a first switch circuit connected electrically between a first power supply and the motor, and a second switch circuit connected electrically between a second power supply and the motor, to effectively provide a parallel connection between the first power supply and the second power supply; and a controller configured to control a switching operation of the first switch circuit and the second switch circuit to regulate a supply of power from the first power supply and the second power supply to the motor.

In an embodiment, the first power supply and the second power supply are both direct current (DC) power supplies.

In an embodiment, the first switch circuit and the second switch circuit both include insulated-gate bipolar transistors (IGBTs). Alternatively, in an embodiment, the first switch circuit and the second switch circuit both include field-effect transistors (FETs).

In an embodiment, the first switch circuit and the second switch circuit are arranged to electrically isolate the first power supply from the second power supply to prevent flow of current from first power supply to the second power supply or vice versa.

In an embodiment, the controller is configured to control motor commutation by concurrently driving the first switch circuit and the second switch circuit using one set of drive signals.

In an embodiment, the stator includes a series of windings associated with the phases, first switch circuit is electrically connected to a first set of stator windings, and the second switch circuit is electrically connected to a second set of stator windings. In an embodiment, the first set of windings and the second set of windings are alternatingly disposed around the stator.

In an embodiment, the power tool further includes a battery selector switch disposed between the first power supply and the second switch circuit to selectively couple the first power supply to the second switch circuit when the second power supply is not present.

According to an alternative embodiment, a power tool is provided including an electric brushless direct current (BLDC) motor having a rotor and a stator defining phases associated with windings; a power unit including a first switch circuit connected electrically between a first power supply and a first set of stator windings and a second switch circuit connected electrically between a second power supply and a second set of windings; and a controller configured to control a switching operation of the first switch circuit and the second switch circuit to regulate a supply of power from the first power supply and the second power supply to the motor. In an embodiment, the power unit effectively provides a parallel connection between the first power supply and the second power supply.

According to another aspect/embodiment of the invention, a power tool is provided including an electric brushless direct current (BLDC) motor having a rotor and a stator defining phases associated with windings. A power unit is electrically connected between a power supply and the motor, the power unit including a first switch circuit connected electrically to a first set of stator windings and a second switch circuit connected electrically to a second set of windings. The first switch circuit and the second switch circuit are arranged to facilitate one of a series or a parallel connection between corresponding windings of the first and second sets of stator windings. A controller is provided and configured to control a switching operation of the first switch circuit and the second switch circuit to regulate a supply of power from the power supply to the motor.

In an embodiment, the power supply is a direct current (DC) power supply.

In an embodiment, the power supply is defines as an alternating-current (AC) power supply and a bridge rectifier arranged to generate a positive voltage waveform from the AC power supply. In an embodiment, the power tool further includes a capacitor coupled to the rectifier.

In an embodiment, the first switch circuit and the second switch circuit both include insulated-gate bipolar transistors (IGBTs) or field-effect transistors (FETs).

In an embodiment, the first switch circuit and the second switch circuit each includes a positive terminal and a negative terminal.

In an embodiment, the positive terminals of the first and second switch circuits are commonly coupled to a positive terminal of the power supply, and the negative terminals of the first and second switch circuits are commonly coupled to a negative terminal of the power supply, to effectively create a parallel connection between corresponding windings of the first and second sets of stator windings.

Alternatively, in an embodiment, the positive terminal of the first switch circuit and the negative terminal of the second switch circuit are electrically coupled to the power supply, and the negative terminal of the first switch circuit is electrically coupled to the positive terminal of the second switch circuit, to effectively create a series connection between corresponding windings of the first and second sets of stator windings.

In an embodiment, the first switch circuit and the second switch circuit each includes power switches having a voltage rating that is approximately half a nominal voltage of the power supply.

In an embodiment, the power tool further includes a switching unit disposed between two or more of the positive and negative terminals of the first and second switch circuits to selectively connect the first switch circuit and the second switch circuit in a way to facilitate one of a series or a parallel connection between corresponding windings of the first and second sets of stator windings. In an embodiment, the switching unit selectively couples the negative terminal of the first switch circuit to one of the positive terminal of the second switch circuit or the negative terminal of the second switch circuit. In an embodiment, the switching unit comprises two single-pole double-throw switches.

In an embodiment, the corresponding windings of the first and second sets of stator windings are not electrically connected via an electrical connection on the stator.

In an embodiment, the controller is configured to control motor commutation by concurrently driving the first switch circuit and the second switch circuit using one set of drive signals.

According to another aspect/embodiment of the invention, a power tool is provided including: an electric brushless direct current (BLDC) motor having a rotor and a stator defining phases associated with windings; a power unit electrically connected between a power supply and the motor, the power unit including a first switch circuit connected electrically to a first set of stator windings and a second switch circuit connected electrically to a second set of windings; and a controller configured to control a switching operation of the first switch circuit and the second switch circuit to regulate a supply of power from the power supply to the motor. In an embodiment, the first set of stator windings are connected together in a first winding configuration and the second set of stator windings are connected together in a second winding configuration that is different from the first winding configuration.

In an embodiment, the first winding configuration is a wye configuration and the second winding configuration is a delta configuration.

In an embodiment, the controller is configured to drive the first switch circuit and the second switch circuit using a six-phase commutation sequence. In an embodiment, drive signals for the first switch signal are advanced by a lead angle compared to drive signals for the second switch circuit. In an embodiment, the lead angle is approximately 30 degrees.

In an embodiment, the phase current corresponding to the first set of stator windings and the phase current corresponding to the second set of stator windings are in line with a back-electromagnetic force (back-EMF) voltage of the motor.

In an embodiment, the motor line current corresponding to the first set of stator windings is shifted by approximately the lead angle compared to motor line current corresponding to the second set of stator windings.

In an embodiment, the power supply is an alternating-current (AC) power supply. In an embodiment, a bridge rectifier is arranged to generate a positive voltage waveform from the AC power supply. In an embodiment, a capacitor is further provided and coupled to an output of the bridge rectifier.

In an embodiment, the first switch circuit and the second switch circuit both comprise a plurality of insulated-gate bipolar transistors (IGBTs) or a plurality of field-effect transistors (FETs).

In an embodiment, the first set of windings and the second set of windings are alternatingly distributed around the stator.

BRIEF DESCRIPTION OF THE DRAWINGS

The drawings described herein are for illustrative purposes only of selected embodiments and not all possible implementations, and are not intended to limit the scope of the present disclosure.

FIG. 33 depicts a current diagram for a conventional three-phase BLDC motor coupled to an AC power supply, according to an embodiment;

Corresponding reference numerals indicate corresponding parts throughout the several views of the drawings.

DETAILED DESCRIPTION

Figure 1:
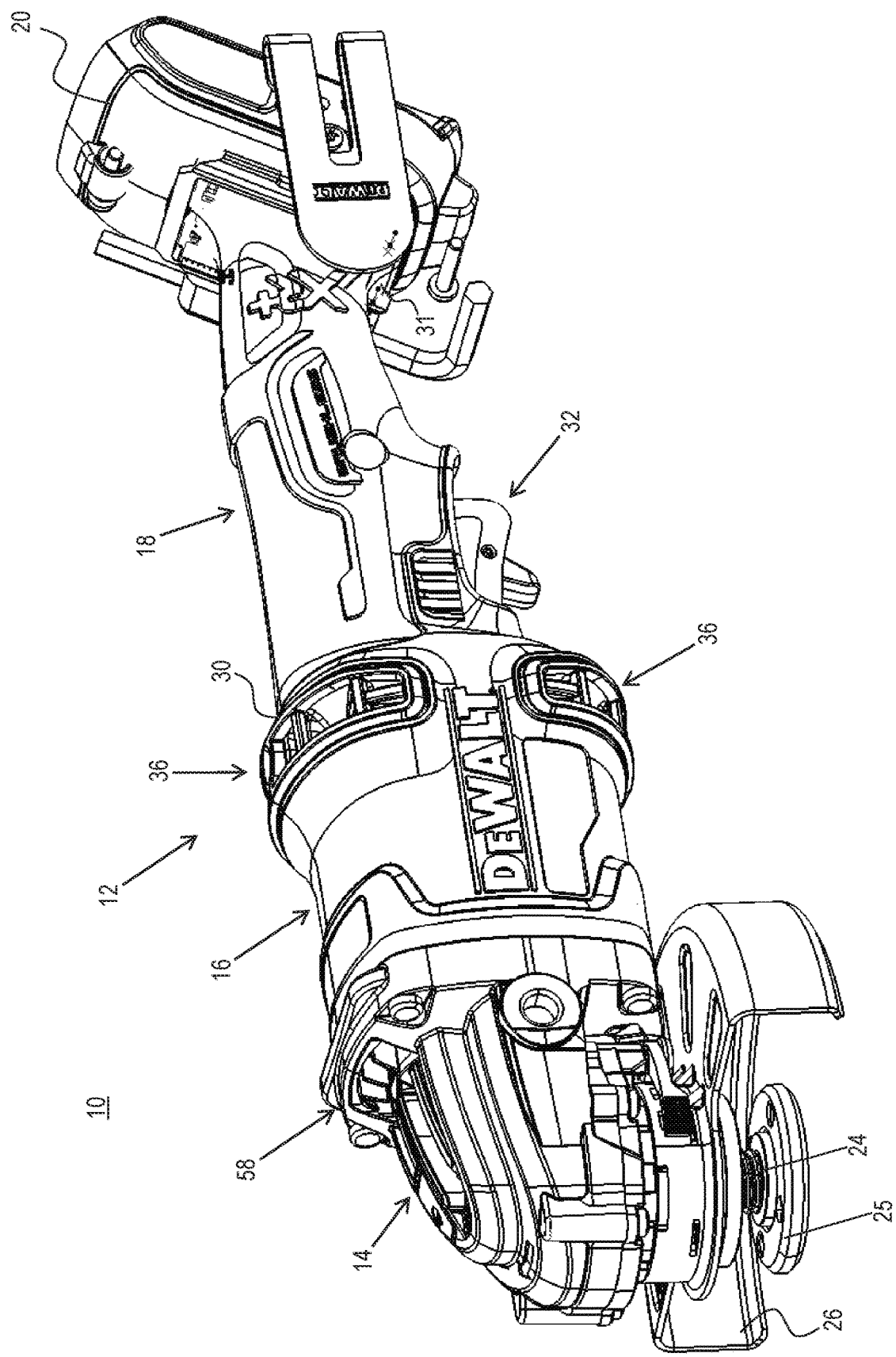
FIG. 1 depicts a perspective view of a power tool, according to an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
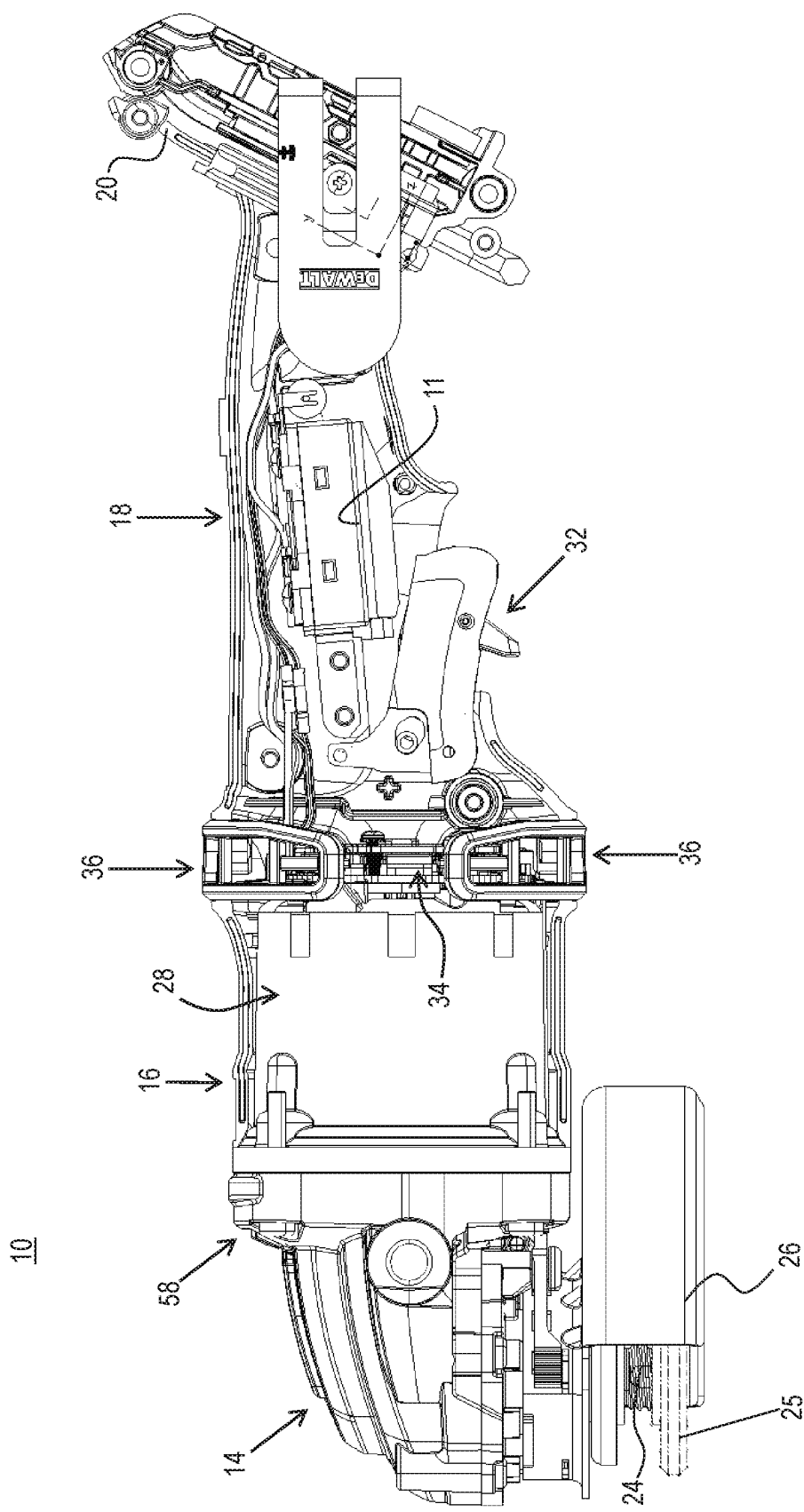
FIG. 2 depicts a side view of the power tool with the housing partially removed, according to an embodiment.
Figure 3:
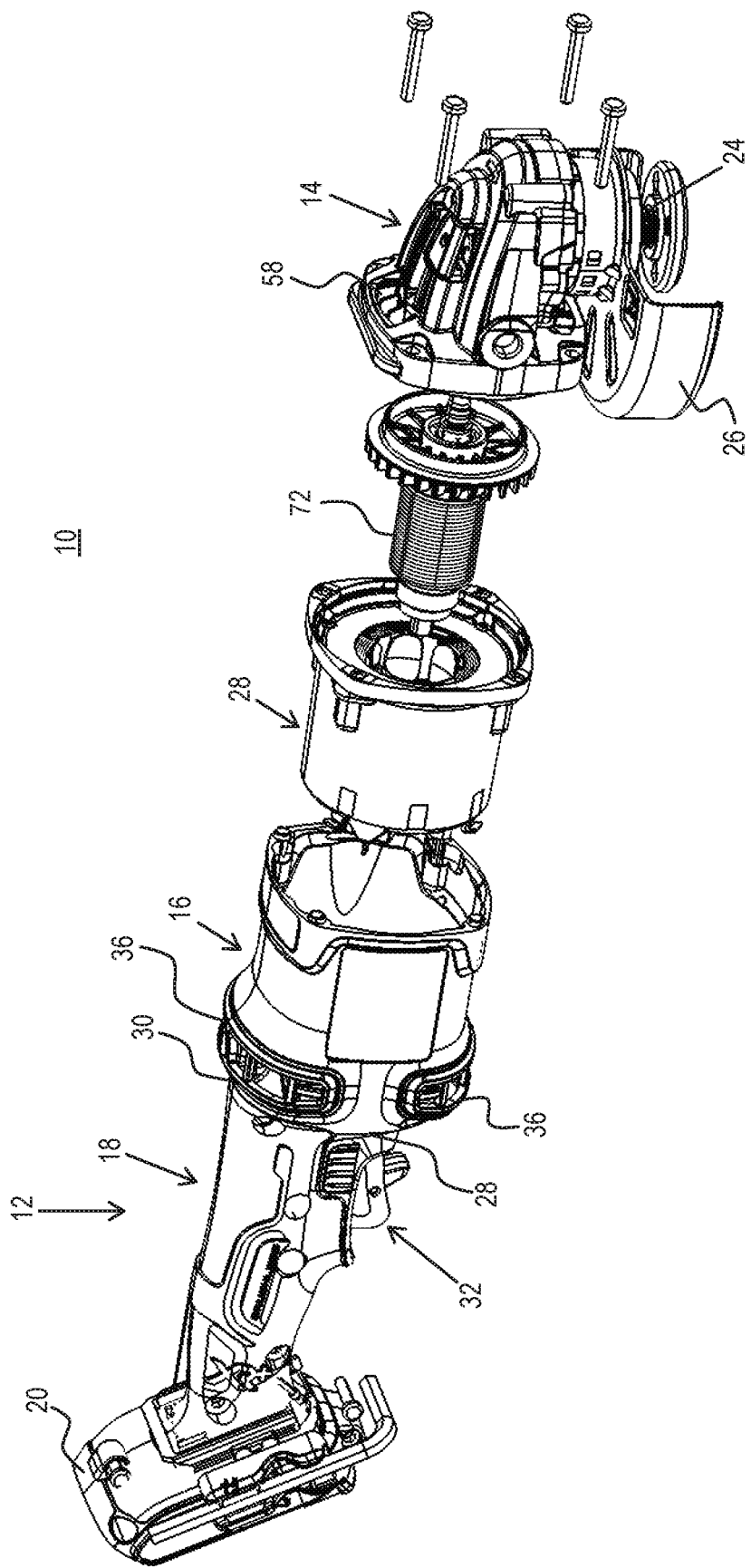
FIGS. 3 and 4 depict perspective front and rear exploded view of the power tool, according to an embodiment.
Figure 4:
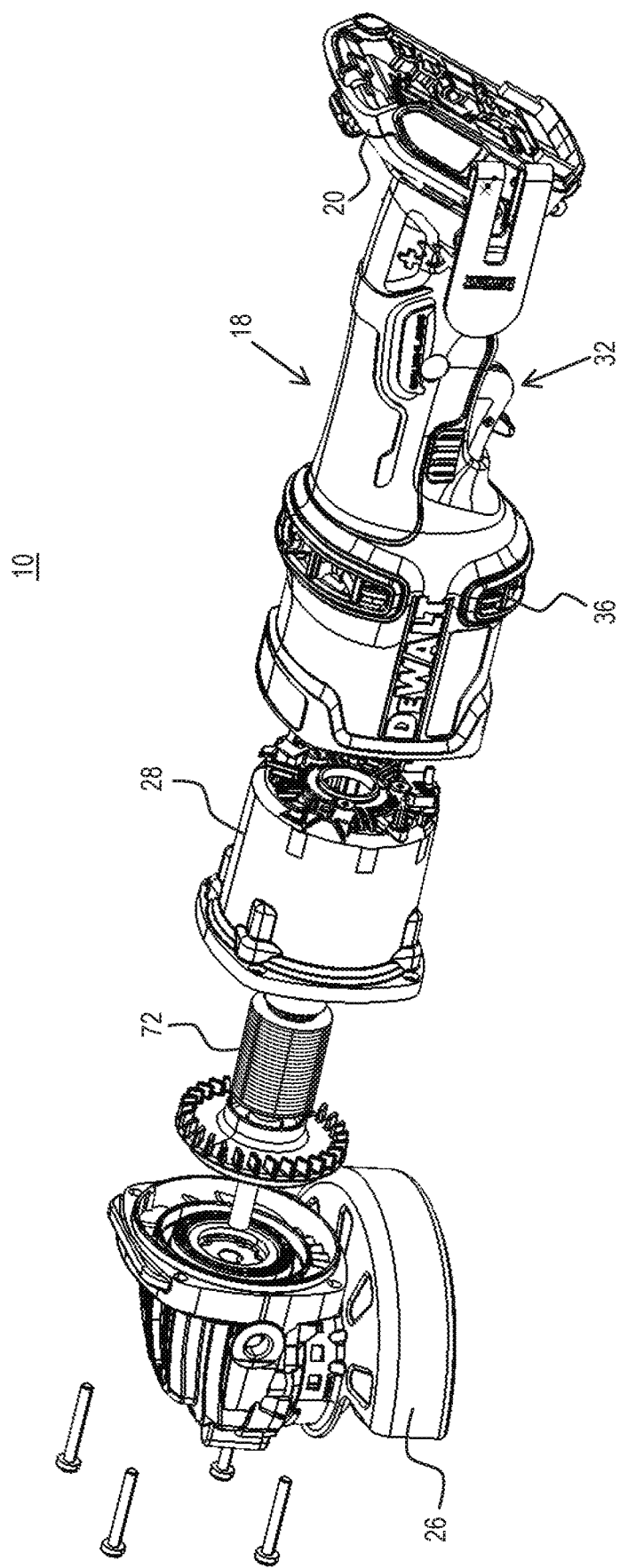

As shown in FIGS. 1-4, according to an embodiment of the invention, a power tool 10 is provided including a housing 12 having a gear case 14, a motor case 16, a handle portion 18, and a battery receiver 20. FIG. 1 provides a perspective view of the tool 10. FIG. 2 provides a side view of tool 10 including its internal components. FIGS. 3 and 4 depict two exploded views of tool 10. Power tool 10 as shown herein is an angle grinder with the gear case 14 housing a gear set (not shown) that drives a spindle 24 arranged to be coupled to a grinding or cutting disc (not shown) via a flange (or threaded nut) 25 and guarded by a disc guard 26. It should be understood, however, that the teachings of this disclosure may apply to any other power tool including, but not limited to, a saw, drill, sander, and the like.

In an embodiment, the motor case 16 attaches to a rear end of the gear case 14 and houses a motor 28 operatively connected to the gear set 22. The handle portion 18 attaches to a rear end 30 of the motor case 16 and includes a trigger assembly 32 operatively connected to a control module 11 disposed within the handle portion 18 for controlling the operation of the motor 28. The battery receiver 20 extends from a rear end 31 of the handle portion 18 for detachable engagement with a battery pack (not shown) to provide power to the motor 28. The control module 11 is electronically coupled to a power module 34 disposed substantially adjacent the motor 28. The control module 11 controls a switching operation of the power module 34 to regulate a supply of power from the battery pack to the motor 28. The control module 11 uses the input from the trigger assembly 32 to control the switching operation of the power module 34. In an exemplary embodiment, the battery pack may be a 60 volt max lithium-ion type battery pack, although battery packs with other battery chemistries, shapes, voltage levels, etc. may be used in other embodiments.

In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. Pat. No. 9,406,915, filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

Referring to FIG. 2, the trigger assembly 32 is a switch electrically connected to the control module 11 as discussed above. The trigger assembly 32 in this embodiment is an ON/OFF trigger switch pivotally attached to the handle 18. The trigger 32 is biased away from the handle 18 to an OFF position. The operator presses the trigger 32 towards the handle to an ON position to initiate operation of the power tool 10. In various alternate embodiments, the trigger assembly 32 can be a variable speed trigger switch allowing the operator to control the speed of the motor 28 at no-load, similar to variable-speed switch assembly disclosed in U.S. Pat. No. 8,573,324, hereby incorporated by reference. However, any suitable input means can be used including, but not limited to a touch sensor, a capacitive sensor, or a speed dial.

In an embodiment, power tool 10 described herein is high-power power tool configured to receive a 60V max battery pack or a 60V/20V convertible battery pack configured in its 60V high-voltage-rated state. The motor 28 is accordingly configured for a high-power application with a stator stack length of approximately 30 mm. Additionally, as later described in detail, the power module 34, including its associated heat sink, is located within the motor case 16 in the vicinity of the motor 28. Additionally and/or alternatively, power tool 10 may be have a low-voltage rating (e.g., 20V) or mid-voltage rating (e.g., 40V) adapted to receive a 20V max or a 40V max battery pack.

While embodiments depicted herein relate to a DC-powered power tool powered by a battery pack, it is noted that the teachings of this disclosure also apply to an AC-powered tool, as disclosed in US Patent Publication No. 2015/0111480, which is incorporated herein by reference in its entirety. In this embodiment, a power cord may be provided instead of battery receiver 20. The power tool 10 may be configured to receive AC supply having a nominal voltage of, for example, 120VAC. Alternatively, power tool 10 may be configured to receive AC supply having a nominal voltage of, for example, 230 VAC.

Additionally and/or alternatively, the teachings of this disclosure also apply to an AC/DC power tool, as disclosed in WO2015/179318 filed May 18, 2015, which is incorporated herein by reference in its entirety. In this case, the power tool may be provided with a battery receptacle 20 as well as a power cord (not shown). Alternatively, an AC/DC power adaptor may be provided to supply one of AC or DC power to the power tool via the battery receiver 20, as described in detail in the '318 application.

Figure 5:
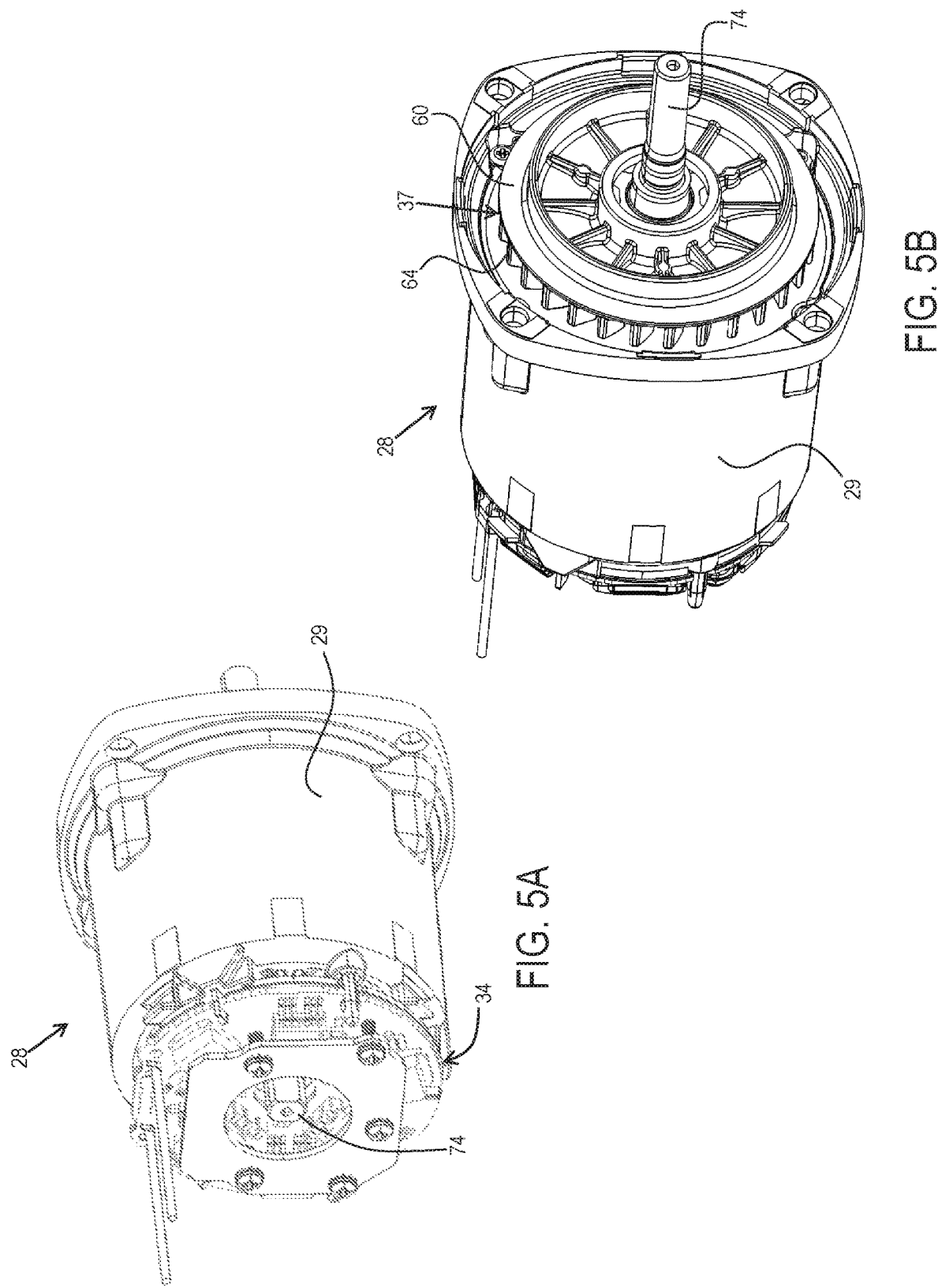
FIGS. 5A and 5B depict perspective front and rear views of a motor and power module employed in the power tool, according to an embodiment.
Figure 6:
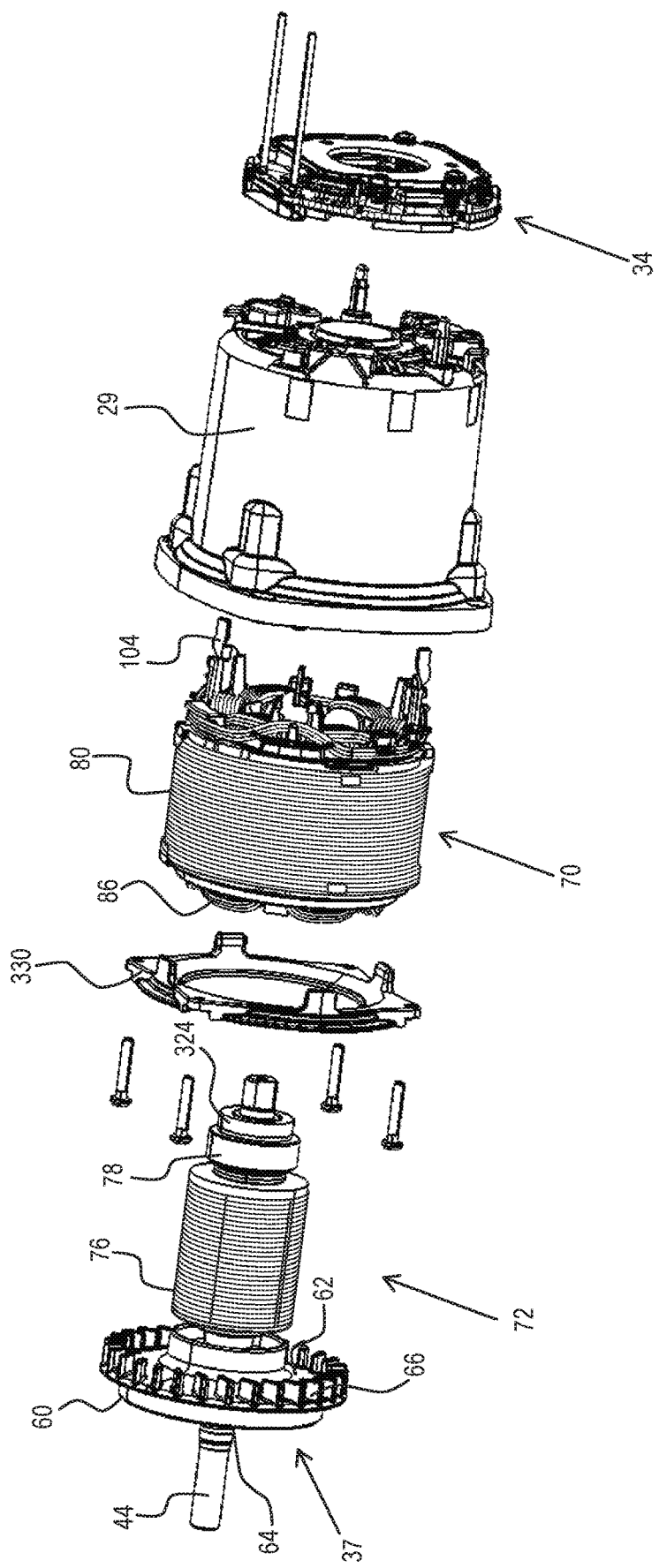
FIG. 6 depicts a perspective exploded view of the motor and power module, according to an embodiment.

FIGS. 5A and 5B depict two perspective views of motor 28, according to an embodiment. FIG. 6 depicts an exploded view of the motor 28, according to an embodiment. As shown in these figures, the motor 28 is a three-phase brushless DC (BLDC) motor having a can or motor housing 29 sized to receive a stator assembly 70 and a rotor assembly 72. Various aspects and features of the motor 28 are described herein in detail. It is noted that while motor 28 is illustratively shown in FIGS. 1-4 as a part of an angle grinder, motor 28 may be alternatively used in any power tool or any other device or apparatus.

In an embodiment, rotor assembly 72 includes a rotor shaft 74, a rotor lamination stack 76 mounted on and rotatably attached to the rotor shaft 74, a rear bearing 78 arranged to axially secure the rotor shaft 74 to the motor housing 29, a sense magnet ring 90 attached to a distal end of the rotor shaft 74, and fan 37 also mounted on and rotatably attached to the rotor shaft 74. In various implementations, the rotor lamination stack 76 can include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 76 or housed therein. The permanent magnets may be, for example, a set of four PMs that magnetically engage with the stator assembly 70 during operation. Adjacent PMs have opposite polarities such that the four PMs have, for example, an N-S-N-S polar arrangement. The rotor shaft 74 is securely fixed inside the rotor lamination stack 76. Rear bearing 78 provide longitudinal support for the rotor 74 in a bearing pocket (described later) of the motor housing 29.

In an embodiment, stator assembly 70 includes a generally cylindrical lamination stack 80 having center bore configured to receive the rotor assembly 72. Lamination stack 80 further includes a plurality of stator teeth extending inwardly from a stator ring towards the center bore. The stator teeth define a plurality of slots there between configured. A plurality of coil windings 86 are wound around the stator teeth 82 into the slots. Coil windings 86 may be wound and connected together in various configurations, as discussed later in detail. In an embodiment, where motor 28 is a three-phase BLDC motor, a total of six coil windings 86 may be provided. Terminals 104 are coupled to the coil windings 86. Although three terminals 104 are depicted herein, in an embodiment, one terminal 104 may be provided for each coil winding 86 for a total of six terminals 104.

In an embodiment, fan 37 of the rotor assembly 72 includes a back plate 60 having a first side 62 facing the motor case 16 and a second side 64 facing the gear case 14. A plurality of blades 66 extend axially outwardly from first side 62 of the back plate 60. Blades 64 rotate with the rotor shaft 44 to generate an air flow as previously discussed. When motor 28 is fully assembled, fan 37 is located at or outside an open end of the motor housing 28 with a baffle 330 arranged between the stator assembly 70 and the fan 37. The baffle 33 guides the flow of air from the blades 64 towards the exhaust vents 58.

Power module 34 in the illustrated example is provided adjacent the motor housing 29. In an embodiment, power module 34 includes a heat sink and a circuit board. Power switching components, as will be described later in detail, may be mounted on the circuit board in close proximity to the heat sink. In an embodiment, a series of positional sensors (e.g., hall sensors) may also be provided as a part of the power module 34 close proximity to sense magnet ring 90 to sense the magnetic rotational position of the sense magnet ring 90. In this embodiment, terminals 104 protrude from the back of the motor housing 29 and are received into corresponding slots of the power module 34.

It must be understood that while power module 34 in this embodiment is provided adjacent the motor housing 29, the circuit board for the power switching components may be provided anywhere in the power tool, including, but not limited to, below the motor housing 29, or in the handle portion 18. In other power tools, such as drills or impact drivers, the circuit board may be provided in the tool handle. An example of such an arrangement is disclosed in US Patent Publication No. 2015/0280517, which is incorporated herein by reference in its entirety.

Figure 7:
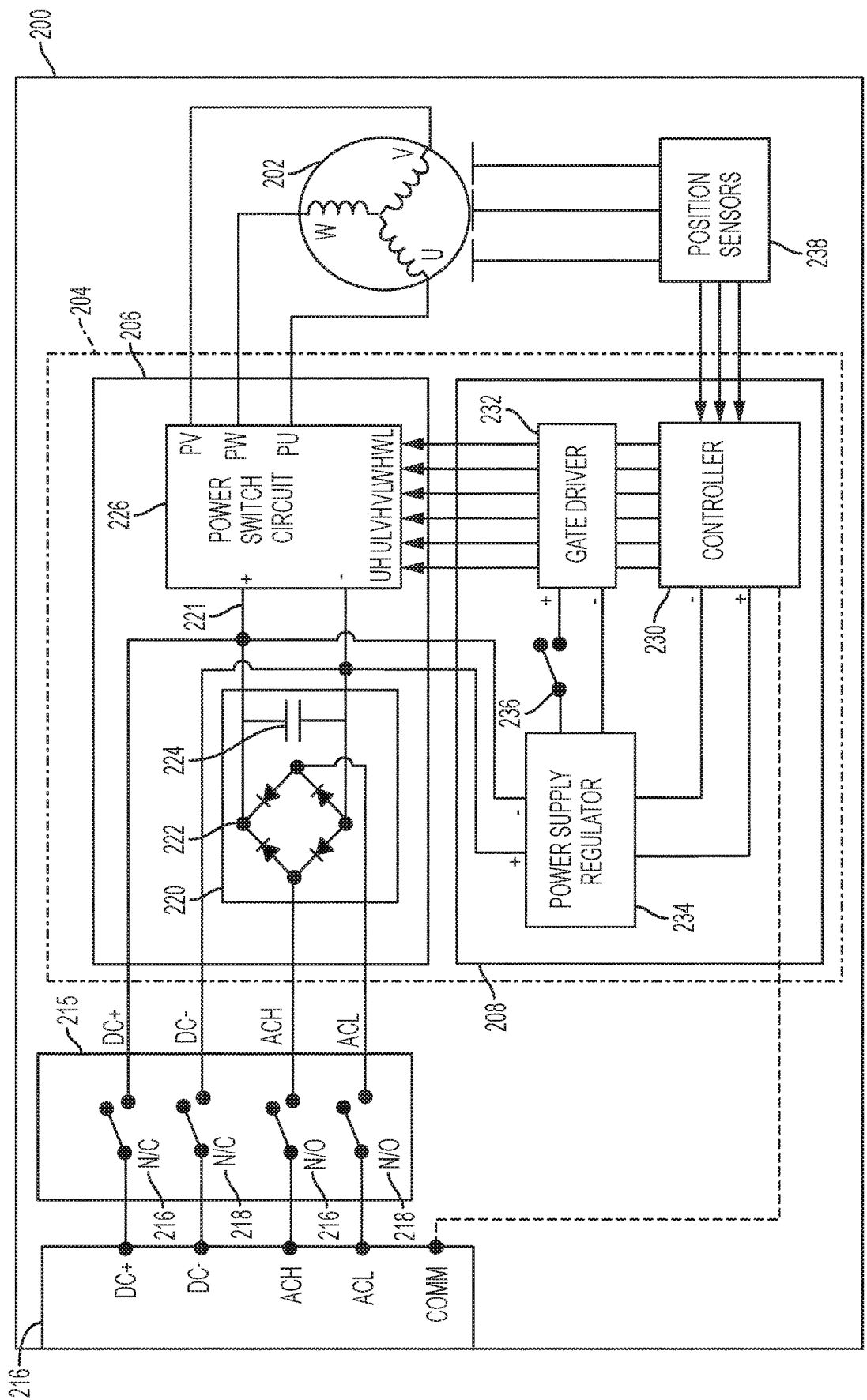
FIG. 7 depicts a block circuit diagram of a conventional AC/DC power tool, according to an embodiment.

FIG. 7 depicts an exemplary block circuit diagram for controlling the commutation of BLDC motor 202 for an AC/DC power tool 200. As shown in this figure, power tool 200 may include a motor control circuit 204 disposed between a power supply interface 216 and motor 202 to control supply of power from the power supply interface 216 to motor 202.

In an embodiment, power supply interface 216 is configured to receive power from one or more of the aforementioned DC power supplies and/or AC power supplies. The power supply interface 216 is electrically coupled to the motor control circuit 204 by DC power lines DC+ and DC− (for delivering power from a DC power supply) and by AC power lines ACH and ACL (for delivering power from an AC power supply). In an embodiment, in order to minimize leakage and to isolate the DC power lines DC+/DC− from the AC power lines ACH/ACL, a power supply switching unit 215 may be provided between the power supply interface 216 and the motor control circuit 204. The power supply switching unit 215 may be utilized to selectively couple the motor 202 to only one of AC or DC power supplies. Switching unit 215 may be configured to include relays, single-pole double-throw switches, double-pole double-throw switches, or a combination thereof. In the illustrative example, switching unit 215 includes two power supply switching units 216 and 218, in this case two double-pole double-throw switches, which receive the DC power lines DC+/DC− and the AC power lines ACH/ACL, and output the same signals to the motor control circuit 204.

In an embodiment, motor control circuit 204 includes a power unit 206 and a control unit 208.

In an embodiment, power unit 206 includes a power switch circuit 226 that is coupled to motor 202 terminal to drive the motor windings. As previously discussed, the power switch circuit 226 may include six semi-conductor switching components configured as a three-phase rectifier bridge circuit and disposed in power module 34.

In an embodiment, power unit 206 is additionally provided with a with a rectifier circuit 220. In an embodiment, power from the AC power lines ACH and ACL is passed through the rectifier circuit 220 to convert or remove the negative half-cycles of the AC power for compatibility with motor 202. In an embodiment, rectifier circuit 220 may include a full-wave bridge diode rectifier 222 to convert the negative half-cycles of the AC power to positive half-cycles and output a DC bus line 221. Alternatively, in an embodiment, rectifier circuit 220 may include a half-wave rectifier to eliminate the half-cycles of the AC power. The DC bus line is coupled to the input terminals of the power switch circuit 226. In an embodiment, rectifier circuit 220 may further include a bus capacitor 224 provided across the DC bus line 221. In an embodiment, capacitor 224 may have a relatively small value of, for example, 5 to 50 uF, designed to remove part of the high frequency noise from the bus voltage. The DC power lines DC+ and DC− bypass the rectifier circuit 220 and is coupled directly to the DC bus line 221.

In an embodiment, control unit 208 includes a controller 230, a gate driver 232, a power supply regulator 234, and a power switch 236. In an embodiment, controller 230 is a programmable device arranged to control a switching operation of the power devices in power switching circuit 226. In an embodiment, controller 230 receives rotor rotational position signals from a set of position sensors 238 provided in close proximity to the motor 202 rotor. In an embodiment, position sensors 238 may be Hall sensors. It should be noted, however, that other types of positional sensors may be alternatively utilized. It should also be noted that controller 230 may be configured to calculate or detect rotational positional information relating to the motor 202 rotor without any positional sensors (in what is known in the art as sensorless brushless motor control). Controller 230 also receives a variable-speed signal from variable-speed actuator (not shown) discussed above. Based on the rotor rotational position signals from the position sensors 238 and the variable-speed signal from the variable-speed actuator, controller 230 outputs drive signals UH, VH, WH, UL, VL, and WL through the gate driver 232, which provides a voltage level needed to drive the gates of the semiconductor switches within the power switch circuit 226 in order to control a PWM switching operation of the power switch circuit 226.

In an embodiment, power supply regulator 234 may include one or more voltage regulators to step down the power supply from power supply interface 128-5 to a voltage level compatible for operating the controller 230 and/or the gate driver 232. In an embodiment, power supply regulator 234 may include a buck converter and/or a linear regulator to reduce the power voltage of power supply interface 128-5 down to, for example, 15V for powering the gate driver 232, and down to, for example, 3.2V for powering the controller 230.

In an embodiment, power switch 236 may be provided between the power supply regulator 234 and the gate driver 232. Power switch 236 may be an ON/OFF switch coupled to the ON/OFF trigger or the variable-speed actuator to allow the user to begin operating the motor 202, as discussed above. Power switch 236 in this embodiment disables supply of power to the motor 202 by cutting power to the gate drivers 232. It is noted, however, that power switch 236 may be provided at a different location, for example, within the power unit 206 between the rectifier circuit 220 and the power switch circuit 226. It is further noted that in an embodiment, power tool 128 may be provided without an ON/OFF switch 236, and the controller 230 may be configured to activate the power devices in power switch circuit 226 when the ON/OFF trigger (or variable-speed actuator) is actuated by the user.

While the circuit diagram above is provided for an AC/DC system, it must be understood that a similar circuit may be employed for an AC-only or a DC-only system with a modified power supply interface 216 and without the switching unit 215. It must also be understood that an AC/DC system may include a circuit wherein a single power interface is configured to receive only one of an AC power supply or a DC power supply at a given time, thus without the need for a switching unit 215 as shown.

Dual-Inverter for BLDC Motors and Multi-Voltage Power Supplies

One aspect of the invention is described herein with reference to FIGS. 8-15, according to an embodiment of the invention.

Two types of commonly used semiconductor power switches for driving a BLDC motor are FETs (Field-Effect Transistors) and IGBTs (Insulated-Gate Bipolar Transistors). While both provide benefits of a solid-state solution for motor control applications, they exhibit different characteristics and are suitable for different voltage and power applications. While FETs support high frequency switching applications and reduce switching losses, IGBTs have better durability to high current. Thus, IGBTs are often associated with higher voltage applications, and FETs are used in relatively low voltage and low power applications. Accordingly, in an embodiment, in power tool designed to operate at a low or mid rated voltage range (e.g., less than 100V), the power switching components in the three-phase inverter bridge are FETs. Also, in power tool designed to operate at a high-rated voltage range (e.g., 100V or above), the power switching components in the three-phase inverter bridge are IGBTs.

U.S. patent application Ser. No. 14/715,258 filed May 18, 2015, which is incorporated herein by reference in its entirety, describes various AC/DC power tool configurations using power supplies having comparable or disparate power supply voltage ratings. For example, in an embodiment, an AC/DC power tool may include two battery receptacles designed to receive two 60V battery packs for a total of 120V DC power, and an AC power cord adapted to receive 120V AC power. Alternatively, an AC/DC power tool may operate with power supplies having disparate voltage ratings, i.e., where voltage provided by the AC power supply has a nominal voltage that is significantly different from a nominal voltage provided from the DC power supply. For example, the tool may include two battery receptacles designed to receive two 60V battery packs for a total of 120V DC power, and an AC power cord adapted to receive 230V AC power (e.g., in Europe). Yet alternatively, an AC/DC power tool may include a single battery receptacle designed to receive a nominal voltage of 40V-80V (e.g., from a single battery pack), and an AC power cord adapted to receive a nominal voltage of 100V-120V AC power. In these configurations, the power switching components may be suitable for one power supply voltage rating but not another.

It is initially noted that while the embodiments of this disclosure are described herein with reference to an AC/DC system, principles of this disclosure may apply to any multi-voltage system, including, but not limited to, DC-only power tools configured to operate with various DC power supplies (e.g., a single 60V battery pack or two 60V battery pack connected in series).

Figure 8:
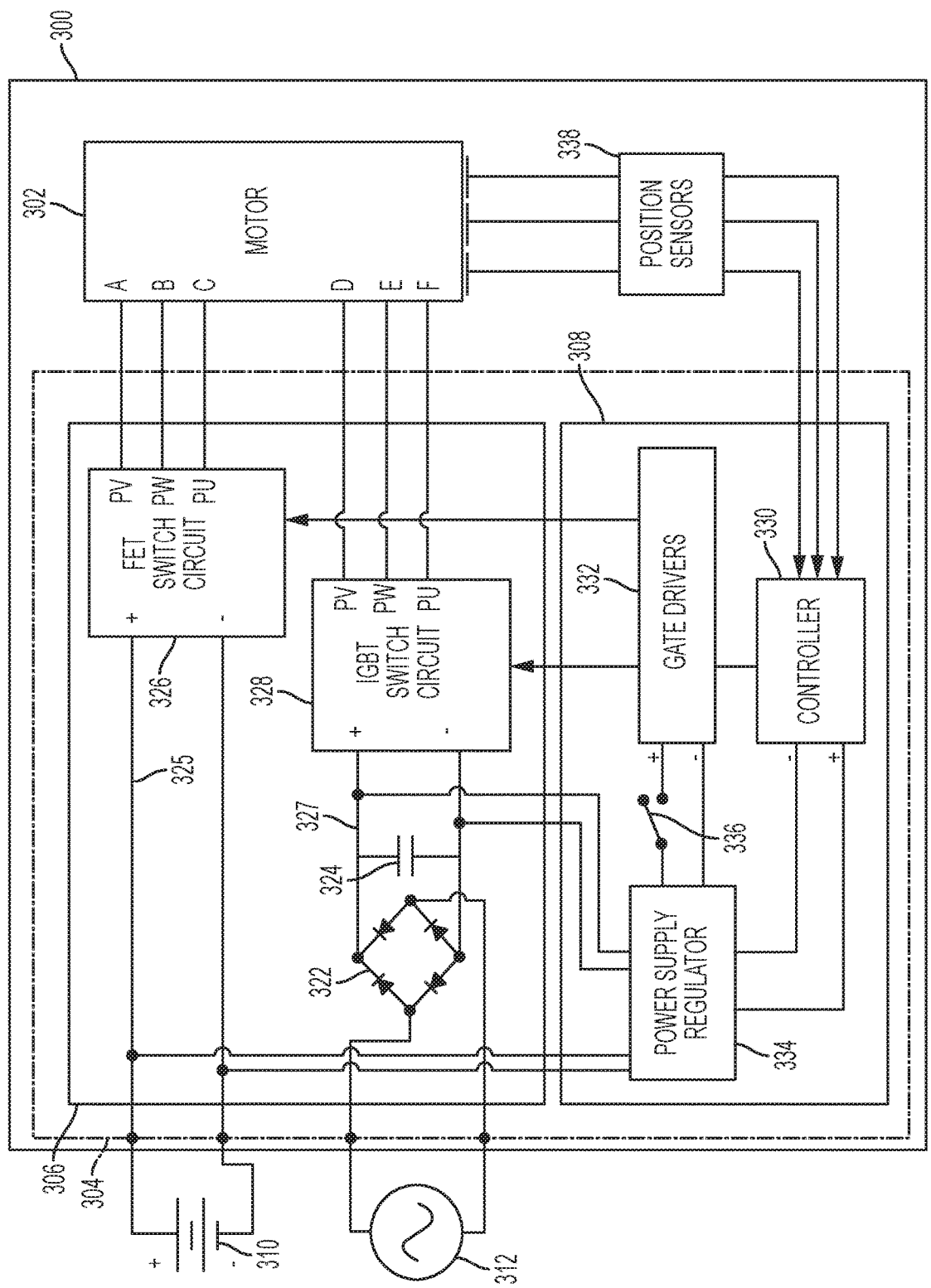
FIG. 8 depicts a block circuit diagram of an AC/DC power tool having a dual-inverter circuit, according to an embodiment.

Referring now to FIG. 8, an improved exemplary block circuit diagram for controlling the commutation of BLDC motor 302 for an AC/DC power tool 300 is depicted, according to an embodiment. In this embodiment, power tool 300 may include a motor control circuit 304 including a power unit 306 and a control unit 308. Similarly to FIG. 7, control unit 308 includes a controller 330, a gate driver 332, a power supply regulator 334, and a power switch 336. Power unit 306 is disposed between power supply interface (not shown for the sake of simplicity) and the motor 302. Power supply interface receives electric power from a DC power supply 310 and/or an AC power supply 312. The power line from the AC power supply is coupled to a bridge rectifier 322 and a bus capacitor 324 to produce a positive waveform. Unlike the embodiment of FIG. 7, power unit 306 includes two power switching circuits: a FET switch circuit 326 disposed on a first DC bus line 325 between the DC power supply 310 and the motor 302, and an IGBT switch circuit 328 disposed on a second DC bus line 327 between the AC power supply 312 and the motor 302. Using this arrangement, FETs are utilized for motor commutation in low-voltage DC-powered applications and IGBTs are utilized for motor commutation in higher-voltage/higher power AC applications.

Figure 9:
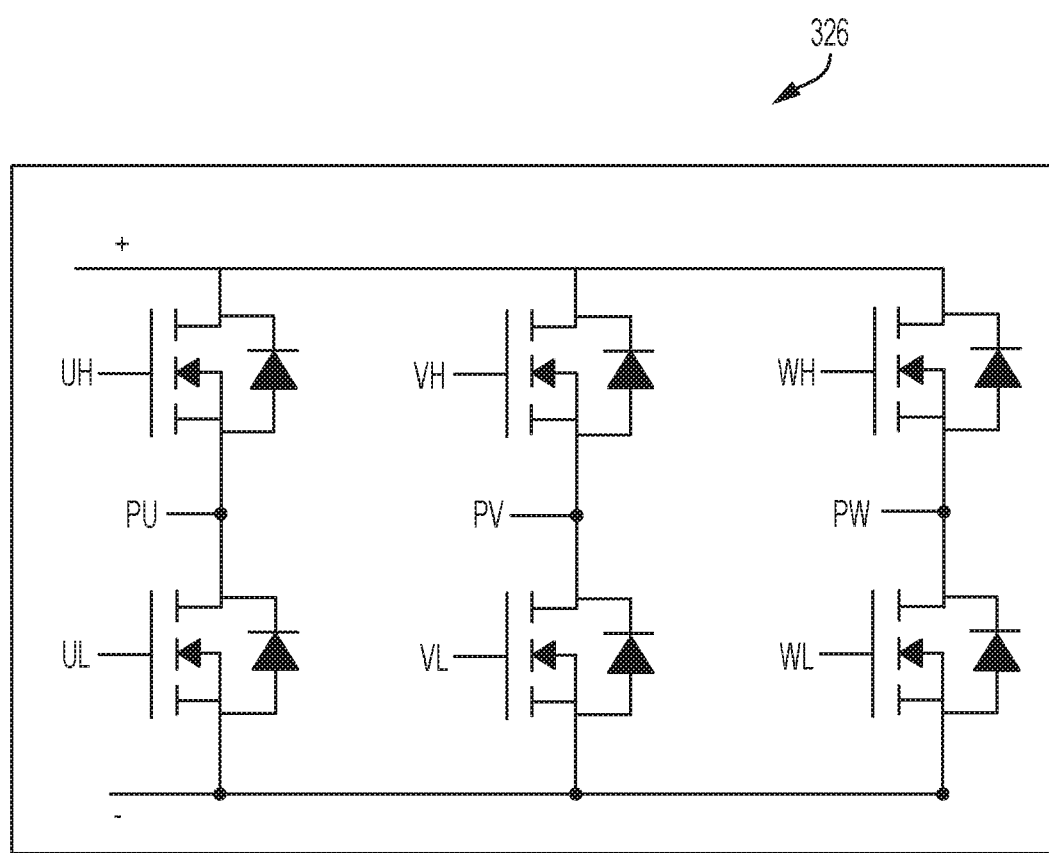
FIG. 9 depicts a circuit diagram of a FET switch inverter utilized in the dual-inverter circuit, according to an embodiment.
Figure 10:
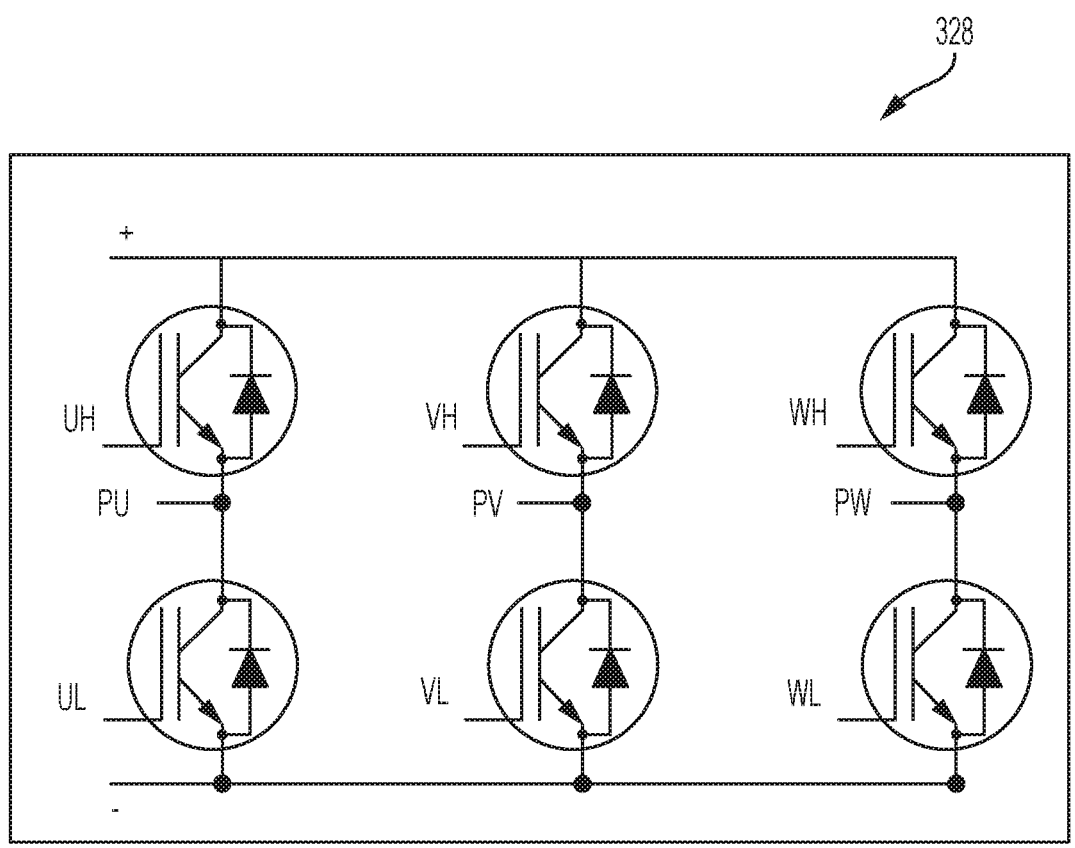
FIG. 10 depicts a circuit diagram of an IGBT switch inverter utilized in the dual-inverter circuit, according to an embodiment.

FIG. 9 depicts an exemplary FET switch circuit 326, according to an embodiment. FIG. 10 depicts an exemplary IGBT switch circuit 328, according to an embodiment. In each of these embodiments, a three-phase inverter bridge circuit is provided including three high-side power switches and three low-side power switches. The gates (or bases) of the high-side and low-side power switches are driven by controller 330 via the gate drivers 332. In an embodiment, the sources (or emitters) of the high-side power switches are coupled to the drains (or collectors) of the low-side power switches to output power signals PU, PV, and PW for driving the BLDC motor 202.

In an embodiment, the controller 330 determines the power mode and activates one of the FET switch circuit 326 and/or the IGBT switch circuit 328 accordingly. The controller 330 may do so by sensing voltage on one of the bus lines 325 or 327. Alternatively, the power supply interface (not shown) or the power supply regulator 334 may determine which of the bud lines 325 or 327 carries electrical power and send a signal indicative of the power mode to the controller 330.

In one embodiment of the invention, the motor windings are wound in pairs such that a single phase is wound around two oppositely-arranged teeth of the motor. The three phases are connected in a wye or delta configuration and electrically connected to the PV, PW, and PU outputs of both the FET switch circuit 326 and the IGBT switch circuit 328. While this arrangement can be made without considerable changes to the motor 302, usage of the same coil windings in high-voltage and low-voltage may lead to low efficiency.

Figure 11B:
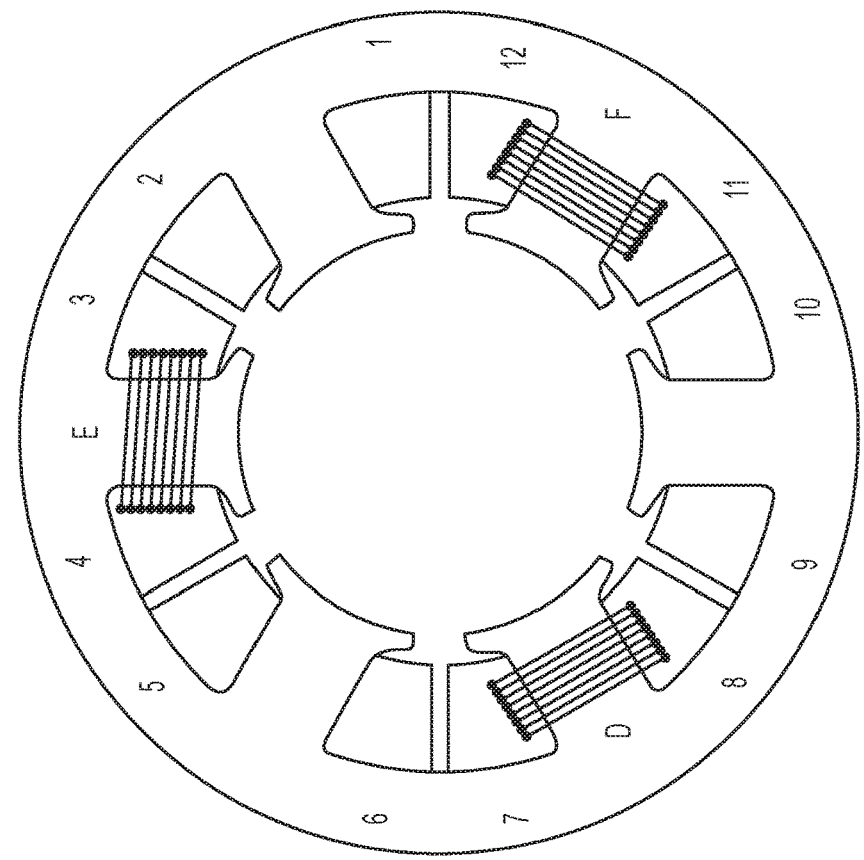
FIGS. 11A and 11B depict axial views of motor windings coupled to the two inverter circuits, according to an embodiment.
Figure 11A:
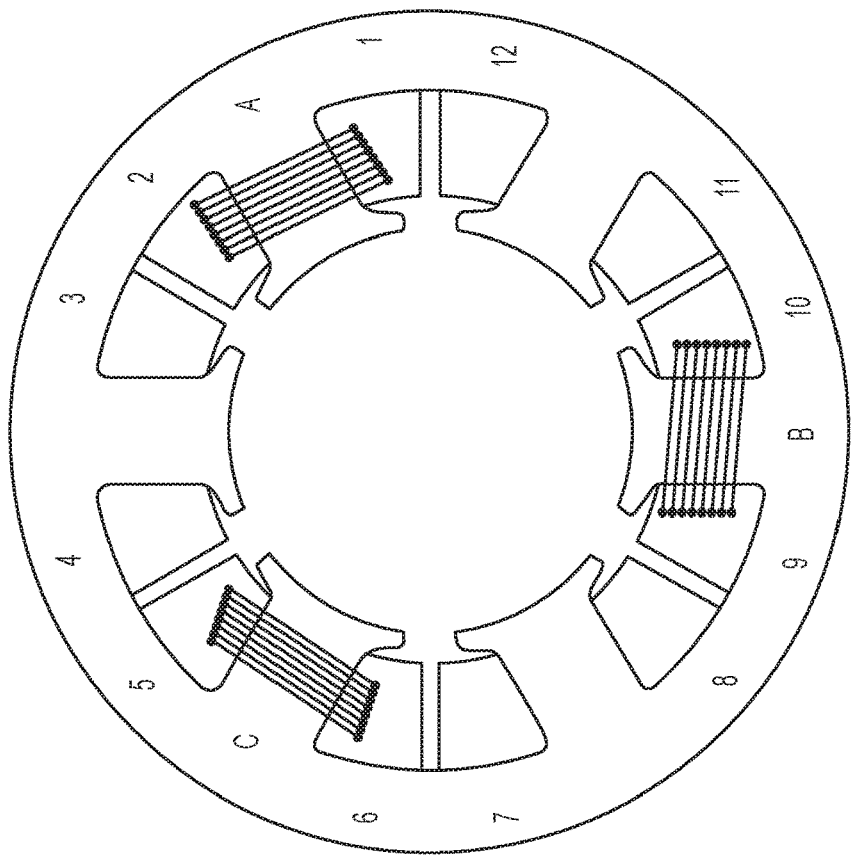

In an alternative embodiment, the as shown in FIGS. 11A and 11B, the six motor teeth are wound separately to form six electrically-isolated windings. The first set of windings A-C are connected to the outputs of the FET switch circuit 326, and the second set of windings D-F are connected to the outputs of the IGBT switch circuit 328. The first set of windings in this embodiment is optimized for application of low voltage and high current, whereas the second set of windings is optimized for application of high voltage and low current. Generally, the number of turns on each coil of the motor is directly proportional to the induced back electro-magnetic force (back-EMF) in the motor windings. Thus, for a motor optimized to operate with a low voltage power supply, the motor is generally configured with a lower number of turns per winding in comparison to a motor optimized to operate with a high voltage power supply, provided that both motors have the same output speed and power output requirements. In other words, given the same speed and power output performance, low voltage/high current applications typically require a smaller number of turns of motor windings, and low current/high voltage applications require thinner wires with a larger number of turns. Given the same slot area, higher number of turns requires use of thinner magnet wires. Accordingly, in an embodiment, the first set of windings A-C may be provided with thicker magnet wires and a low number of turns for low voltage/high current applications, and the second set of windings D-F may be provided with thinner magnet wires and a higher number of turns for high voltage/low current applications.

In the above-described embodiment, winding the coils on a single stator tooth instead of a pair of teeth effectively adversely decreases the magnetic field provided in each phase, thus reducing the speed and/or power output of the motor. This difference may be compensated, according to an embodiment, by increasing the length of the lamination stack.

Figure 12:
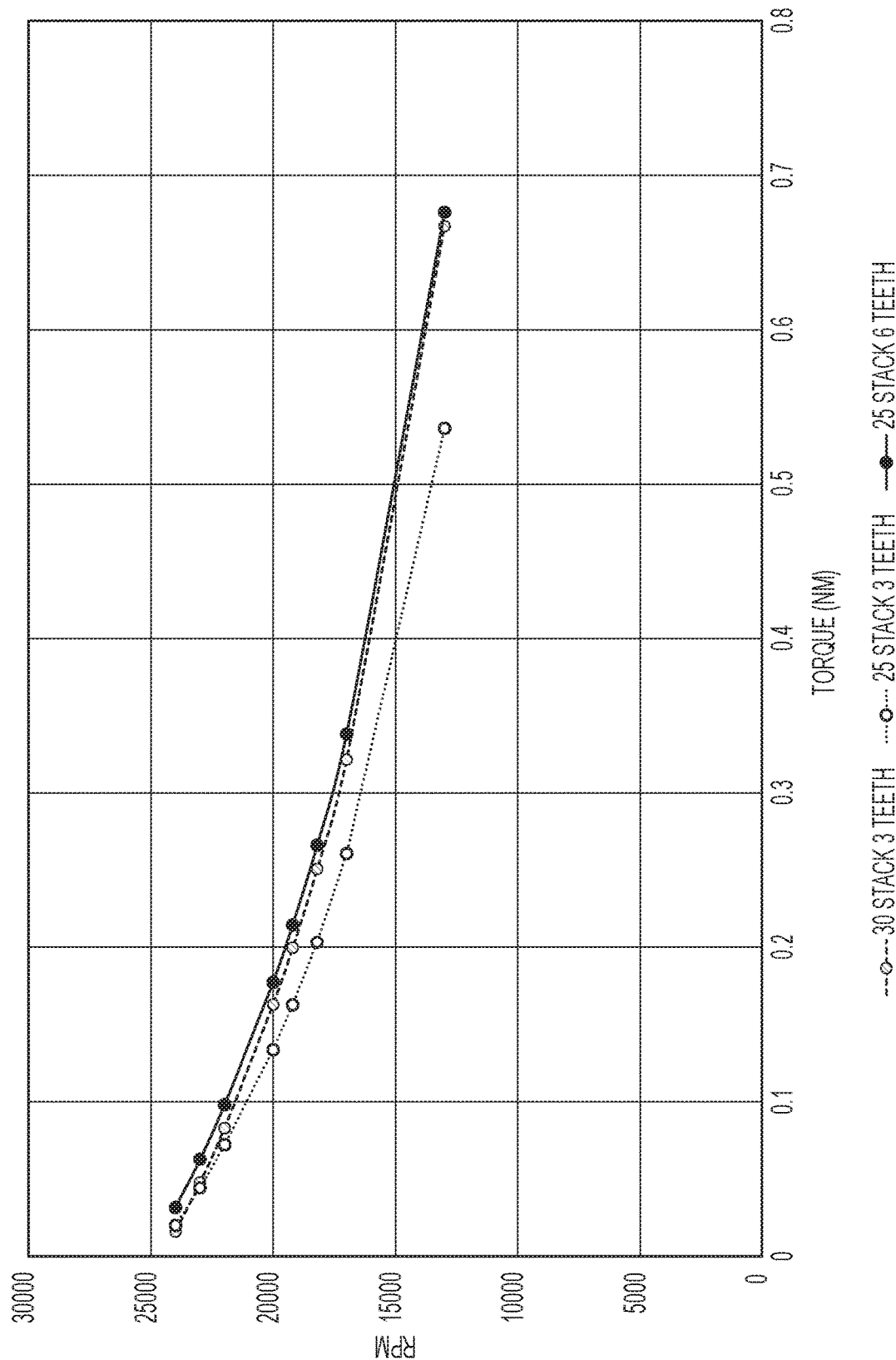
FIG. 12 depicts a comparative speed-torque diagram for three exemplary motors that are differently wound and/or have different stator stack lengths, according to an embodiment.
Figure 13:
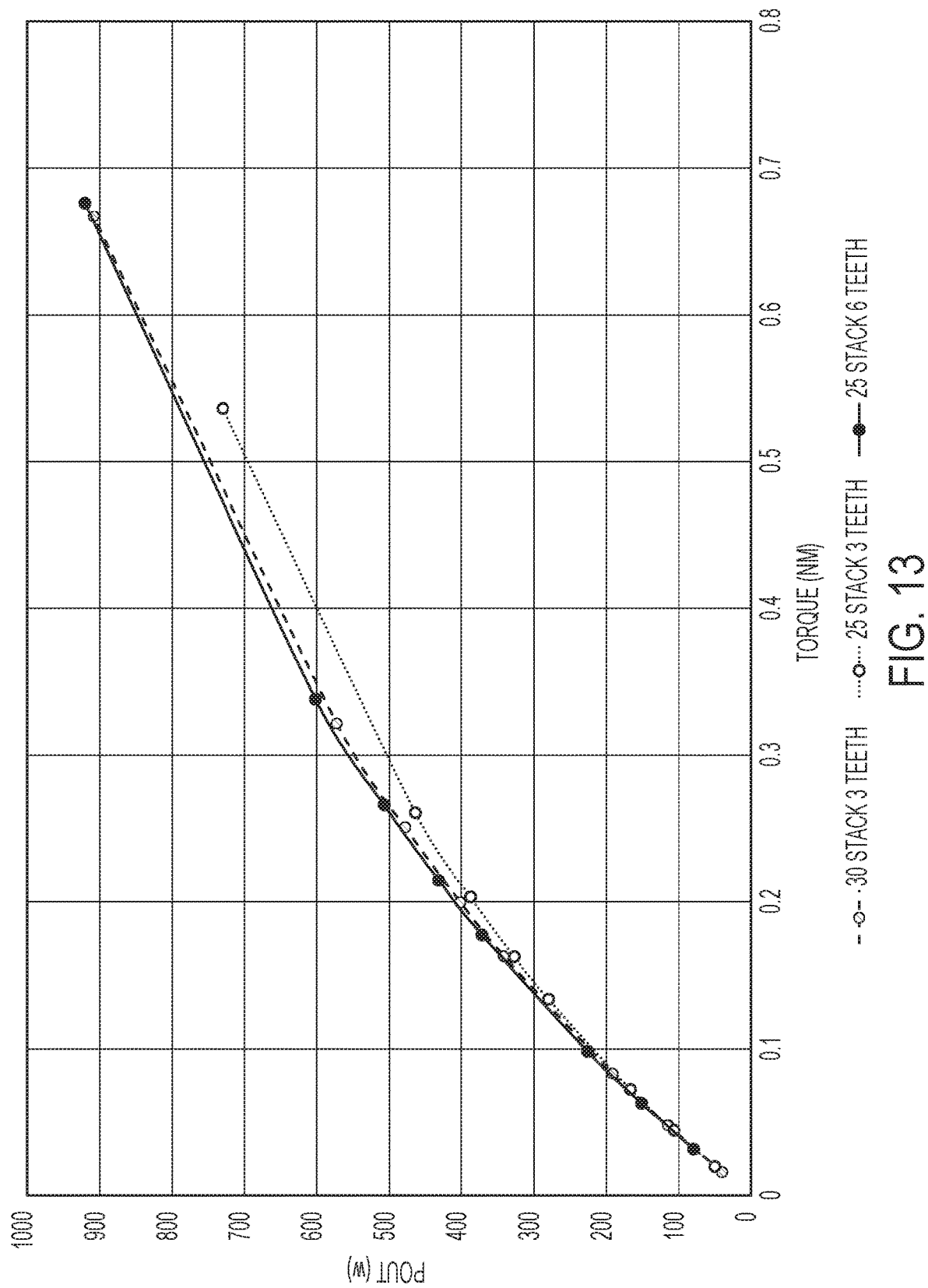
FIG. 13 depicts a comparative power-torque diagram of the three exemplary motors of FIG. 12, according to an embodiment.

FIG. 12 depicts a speed-torque diagram showing a comparison of three exemplary motors, according to an embodiment. FIG. 13 depicts a power-torque diagram shown a comparison of the same exemplary motors, according to an embodiment. The first motor (corresponding to the profile represented in solid lines) includes a stator stack of 25 laminations and is fully wound using the conventional method of winding two teeth for each phase. The second motor (corresponding to the profile represented in dotted lines) includes a stator stack of the same length but wound using a single tooth per phase. In other words, only three of the six stator teeth are wound in this motor. As shown in these figures, using a single tooth winding per phase in the second motor decreases the speed and power performance of the motor, particularly with increased torque. The third motor (corresponding to the profile represented in dashed lines) includes a stator stack of 30 laminations wound using a single tooth per phase. As shown in these figures, the third motor has comparable speed and power output performance to the first motor. It is noted that all three motors are wound using wires of the same thickness and with the same number of turns. Accordingly, while using a single tooth per phase decreases motor power and speed performance, increasing the stack length by approximately 10% to 30%, preferably by approximately 20% (i.e., from 25 to 30 laminations) compensates for that decrease and provides comparable motor speed and power output.

According to an embodiment of the invention, FET switch circuit 326 and IGBT switch circuit 328 may be controlled in a hybrid mode where both DC and AC power supplies 310 and 312 are used in tandem. This may occur in high power applications where neither power source can sufficiently handle the high current draw. In an embodiment, the power tool 300 is coupled to both the DC and AC power supplies 310 and 312 and the controller 330 executes a proper commutation algorithm on both the FET switch circuit 326 and IGBT switch circuit 328 concurrently. According to this embodiment, power output in exceed of 1800 watts can be achieved without tripping a standard 15 amp circuit breaker.

Figure 14:
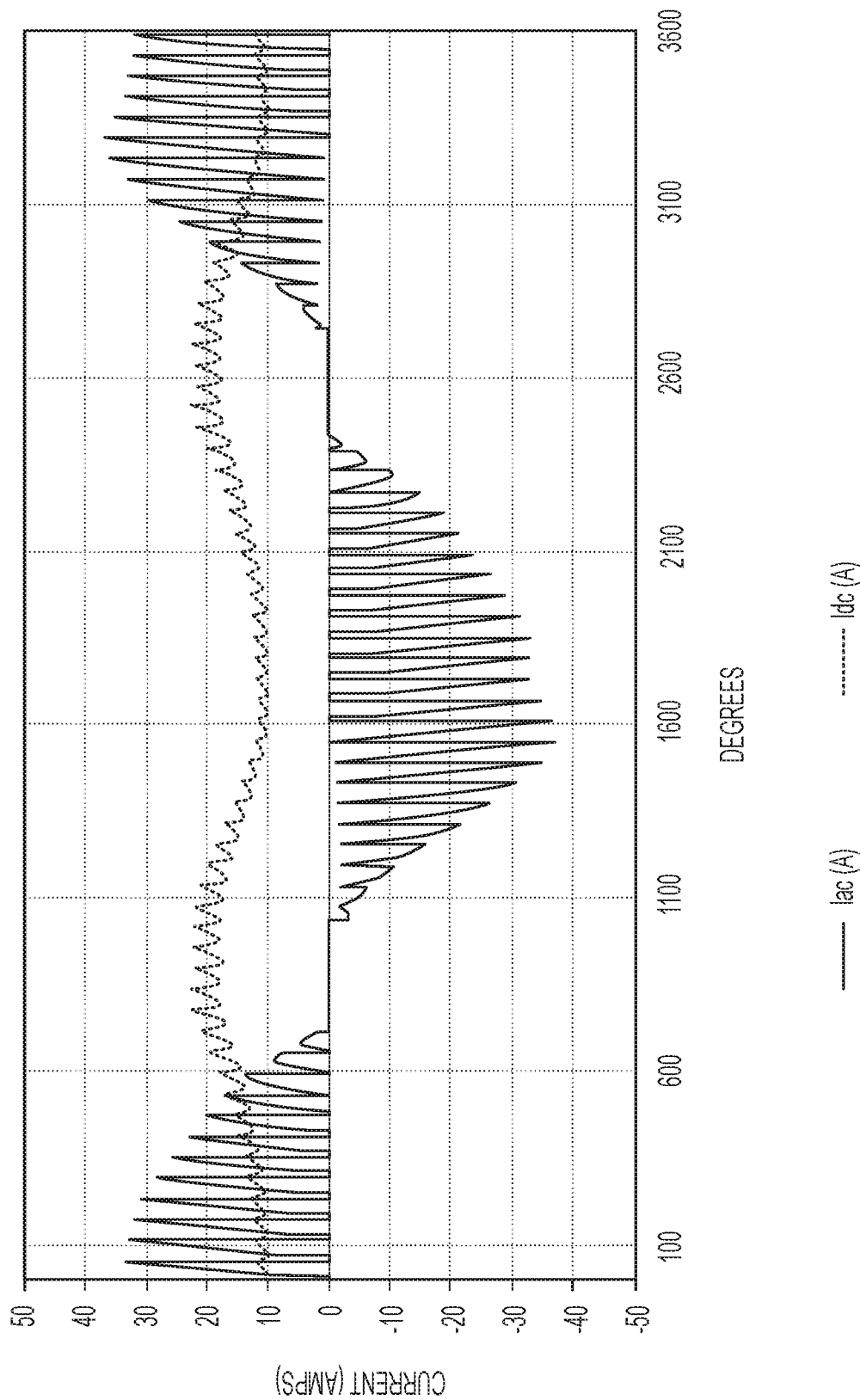
FIG. 14 depicts an exemplary current diagram of the DC and AC line currents being supplied through the AC and DC power supplies in the hybrid mode, according to an embodiment.

FIG. 14 depicts an exemplary current diagram of the DC and AC line currents being supplied through the power supplies 310 and 312 in the hybrid mode, according to an embodiment. In this embodiment, the AC power supply 312 has a 120VAC RMS voltage and the DC power supply 310 is a lithium ion battery pack having a maximum voltage of 60VDC. As shown herein, the AC current peaks at about 35 amps within each AC cycle, for an average RMS current of approximately 14 amps. The AC power supply 312 has an average current of approximately 18 amps. This allows the tool to draw substantially more current to reach a desired power output level normally not achievable from a single power source alone.

In an embodiment, the controller 330 may be configured to employ various techniques to optimize current draw from the DC power supply 310 as needed. For example, the controller 330 may enable current draw from the DC power supply 310 only when the current drawn by the motor 302 exceeds a predetermined threshold of, e.g., 14 amps. Alternatively and/or additionally, the controller 330 may enable draw current from the DC power supply 310 for several degrees before and after the zero crossings of the AC power supply 312 voltage, where current drawn from the AC power supply 312 is at a minimum, to supplement the AC power supply 312. U.S. patent application Ser. No. 14/876,458 filed Oct. 6, 2015, which is incorporated by reference in its entirety, includes some examples of hybrid power control schemes that can be utilized in the present embodiment.

Figure 15:
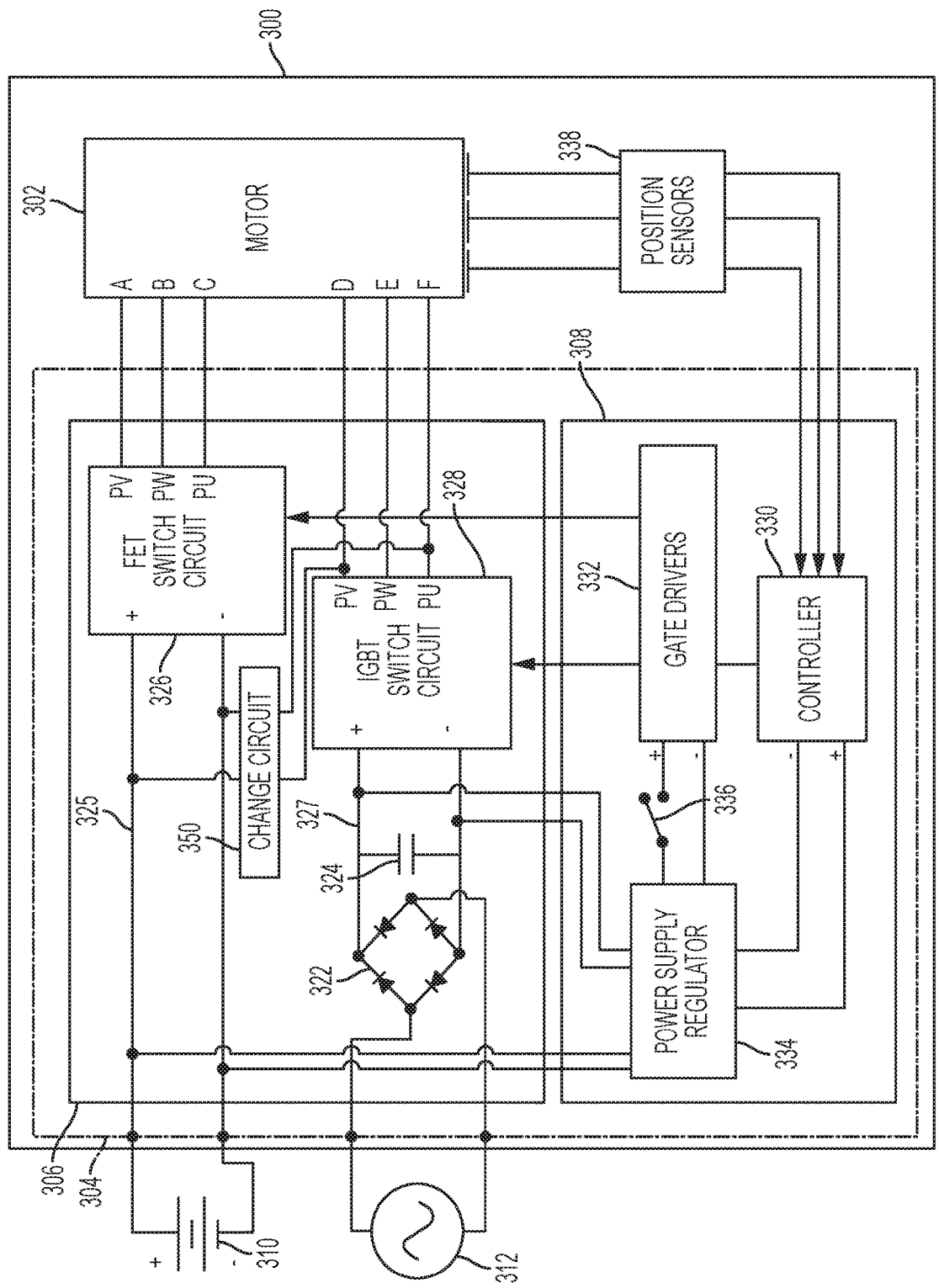
FIG. 15 depicts an additional and/or improved block diagram of an AC/DC power tool having a dual-inverter circuit, additionally provided with a charging circuit, according to an embodiment.

Referring now to FIG. 15, an additional and/or improved embodiment of the invention is depicted, according to an embodiment. This figure is similar to FIG. 8 and includes a circuit 300 having two power switching inverter circuits 326 and 328. Additionally, in this figure, circuit 300 is provided with a charging circuit 350 enabling the tool to charge the battery 310 when the tool is coupled to an AC power source 312. In an embodiment, the charging circuit 350 may be receive power from the AC bus line 327 or the motor terminals (in this case terminals D and F). The details of the charging circuit 350 is beyond the scope of this disclosure, but in short, the charging circuit 350 may include a power regulator (not shown) that provides a suitable voltage level (e.g., 20V or 60V, depending on the battery configuration) for charging the battery 310. The charging circuit 350 may also include a switch (not shown) controllable by the controller 330. The circuit 330 may also be provide with additional wiring and circuitry to provide the controller 330 with voltage sense signals from the battery 310. This allows the controller to monitor the voltage of the battery cells and regulate the supply of charging power to the battery 310 via the aforementioned switch accordingly.

Dual-Inverter for Dual-Battery Applications

A hybrid design including an AC power supply and a DC power supply was described above with reference to FIG. 14. Another aspect of the invention described herein with reference to FIGS. 16-22 for dual-inverter for a power system being powered by two or more DC power supplies.

Power tool applications powered by multiple DC power supplies, for example, power tools including two or more battery receptacles, are known. In such applications, the battery receptacles places the batteries in series to increase the total voltage supplied to the motor. For example, the two battery receptacles may receive two 60V max battery packs. The battery receptacles are connected in such a way that the battery packs are placed in series to supply a total maximum voltage of 120V to the motor.

While a series power supply configuration described above is suitable for high voltage applications, a power supply parallel configuration may be suitable in some power tool applications, for example, for a power tool having an operating voltage of around 60V and designed to receive 60V max battery packs, or a power tool having an operating voltage of around 20V and designed to receive 20V max battery packs. In such applications, if power tool ergonomics allow inclusion of two battery receptacles, connecting the battery packs in parallel may provide many advantages. Namely, using the parallel configuration, the user can operate the tool and obtain similar speed performance using one or both batteries, though using both batteries will increase runtime. Also, since the operating voltage of the power tool remains the same as the battery packs, there is no need to modify the power tool housing to provide double-insulation for the motor.

Figure 16:
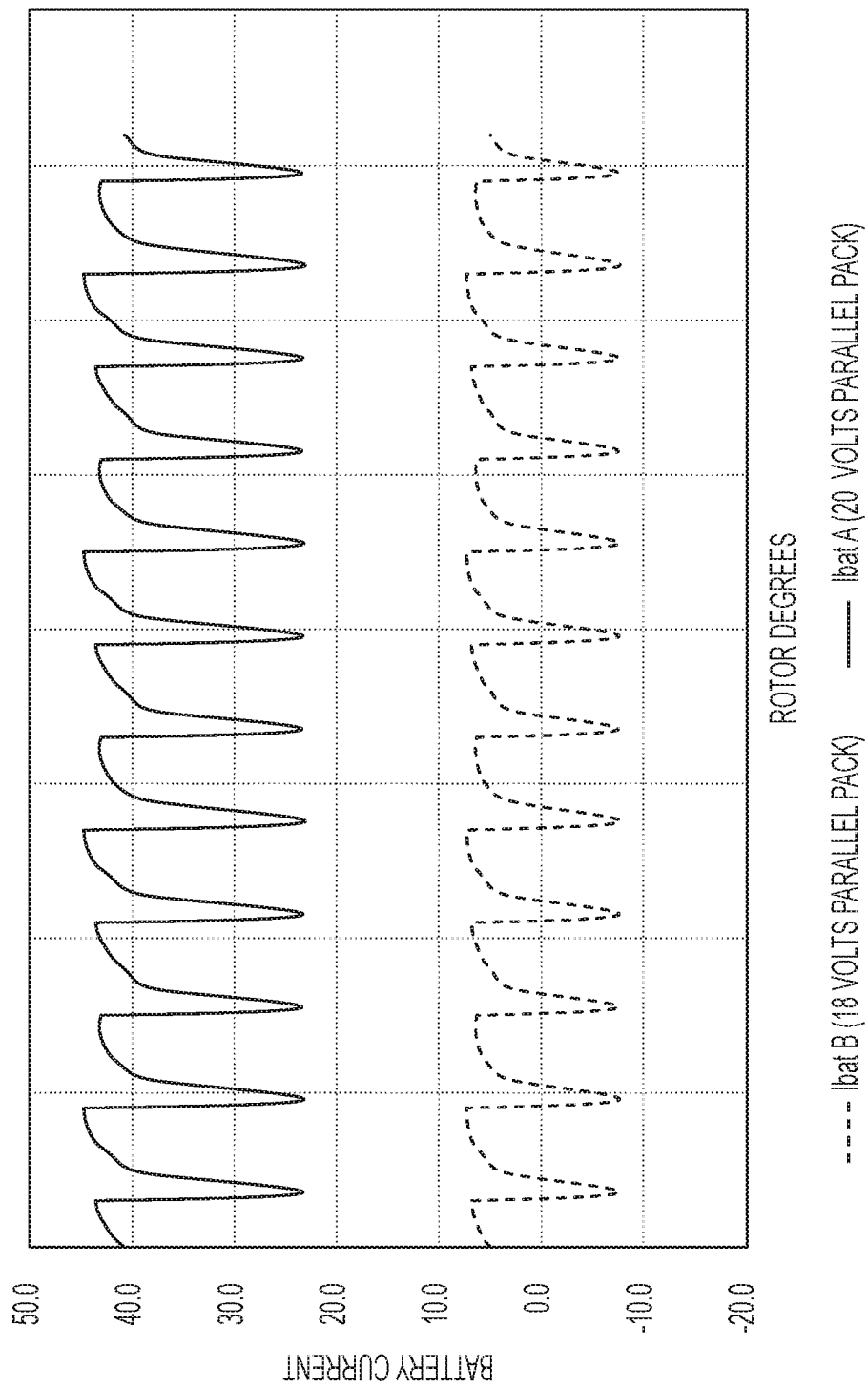
FIG. 16 depicts a current diagram for two battery packs having different states of charge, coupled in parallel at the battery receptacle terminals, according to an embodiment.

One way to achieve a parallel connection between battery packs is by connecting the terminals of the battery packs in parallel, e.g., by commonly coupling the terminals to the same DC bus line. This arrangement may work if the two battery packs have the same state of charge. However, if one of the batteries has a lower state of charge, current through the higher-voltage battery pack flows into the lower-voltage battery pack at least during a part of each commutation cycle. FIG. 16 depicts an exemplary circuit diagram for two 20V max battery packs coupled in parallel at the battery receptacle terminals, one (battery A) fully charged at 20V, and the second (battery B) charged to 18V. In this figure, significant current draw is being made from battery A, while current draw from battery B is minimal and at times negative.

Figure 17:
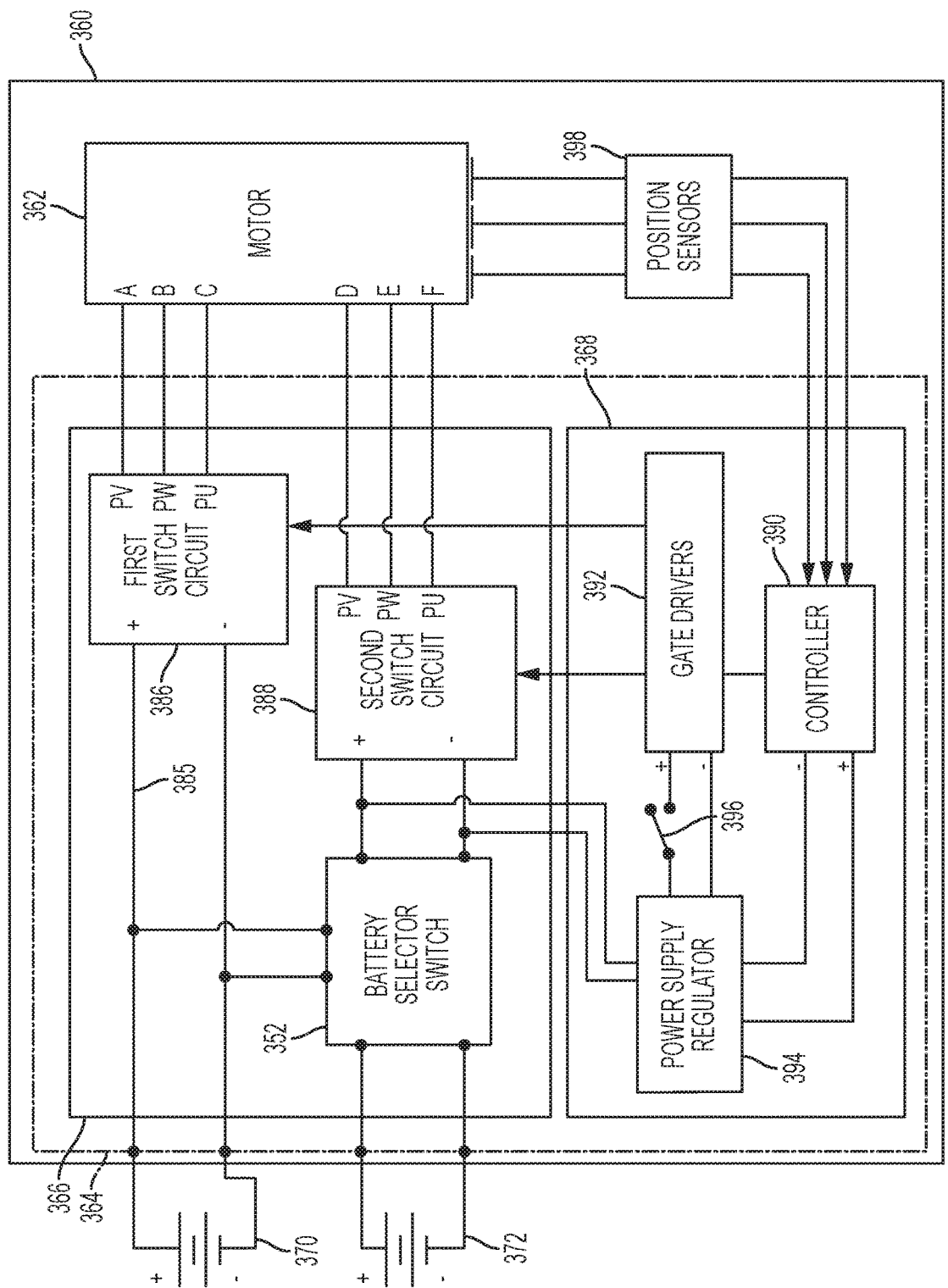
FIG. 17 depicts a block circuit diagram of a DC power tool having a dual-inverter circuit, according to an embodiment.

Referring now to FIG. 17, an exemplary block circuit diagram for controlling the commutation of BLDC motor 362 for a DC-only power tool 360 powered by two DC power supplies 370 and 372 is depicted, according to an embodiment. In this embodiment, power tool 360 may include a motor control circuit 364 having a power unit 366 and a control unit 368. Similarly to FIG. 7 previously discussed, control unit 368 may include a controller 390, a gate driver 392, a power supply regulator 394, and a power switch 396. The controller 390 receives motor 362 positional signals from position sensors 398. Power unit 366 is disposed between the motor 362 and the two DC power supplies 370 and 372. In an embodiment, the power supplies 370 and 372 are battery packs received in two battery receptacles of the power tool 360, though it must be understood that any DC power supply, e.g., from a generator or an adaptor, may be used as a power supply. It must also be understood that the principles described herein may be applied to a power tool with more than two DC power supplies.

In an embodiment, power unit 366 includes a first switch circuit 386 coupled to the first DC power supply 370 via a first DC bus line 385, and a second switch circuit 388 coupled to the second DC power supply 372 via a second DC bus line 387. The outputs of the first switch circuit 386 are coupled to windings A-C of the motor 362. The outputs of the second switch circuit 388 are coupled to windings D-F of the motor 362. These windings are configured as shown in FIGS. 11A and 11B previously discussed.

In an embodiment, power unit 366 further includes a battery selector switch 352 disposed in this example on the second DC bus line 387 arranged to coupled one of the first DC power supply 370 or second DC power supply 372 to the second switch circuit 388. In an embodiment, battery selector switch 352 is switchable via a user-actuated switch or a mechanical switch coupled to the power tool 360 battery receptacles. In this embodiment, battery selector switch 352 couples the first DC power supply 370 to the second switch circuit 388 when no second DC power supply 372 is provided, and couples the second DC power supply 373 to the second switch circuit 388 when one is provided. As such, when the power tool is operated using a single power supply 370, the power supply 370 is coupled to all the motor windings.

In an embodiment, controller 390 controls motor 362 commutation by concurrently driving the first and second switch circuits 386 and 388. In an embodiment, the controller 390 outputs one set of drive signals (i.e., UH-WH and UL-WL as shown in FIGS. 9 and 10) coupled to both the first and second switch circuits 386 and 388.

In an embodiment, where the tool 360 is designed to receive low voltage battery packs (e.g., 10-40VDC), each of the first and second switch circuits 386 and 388 may be configured using FETs, as shown in FIG. 9. In an embodiment, where the tool 360 is configured to receive at least one relatively higher-voltage battery pack, one or both of the first and second switch circuits 386 and 388 may be configured using IGBTs, as shown in FIG. 10.

The above-described embodiment effectively provided a parallel connection between two DC power supplies 370 and 372 (e.g., two battery packs) while isolating the current paths of the two battery packs. Thus, if one of the battery packs has a lower state of charge, it does not draw current from the higher-voltage battery pack as in the example of FIG. 16.

Figure 18:
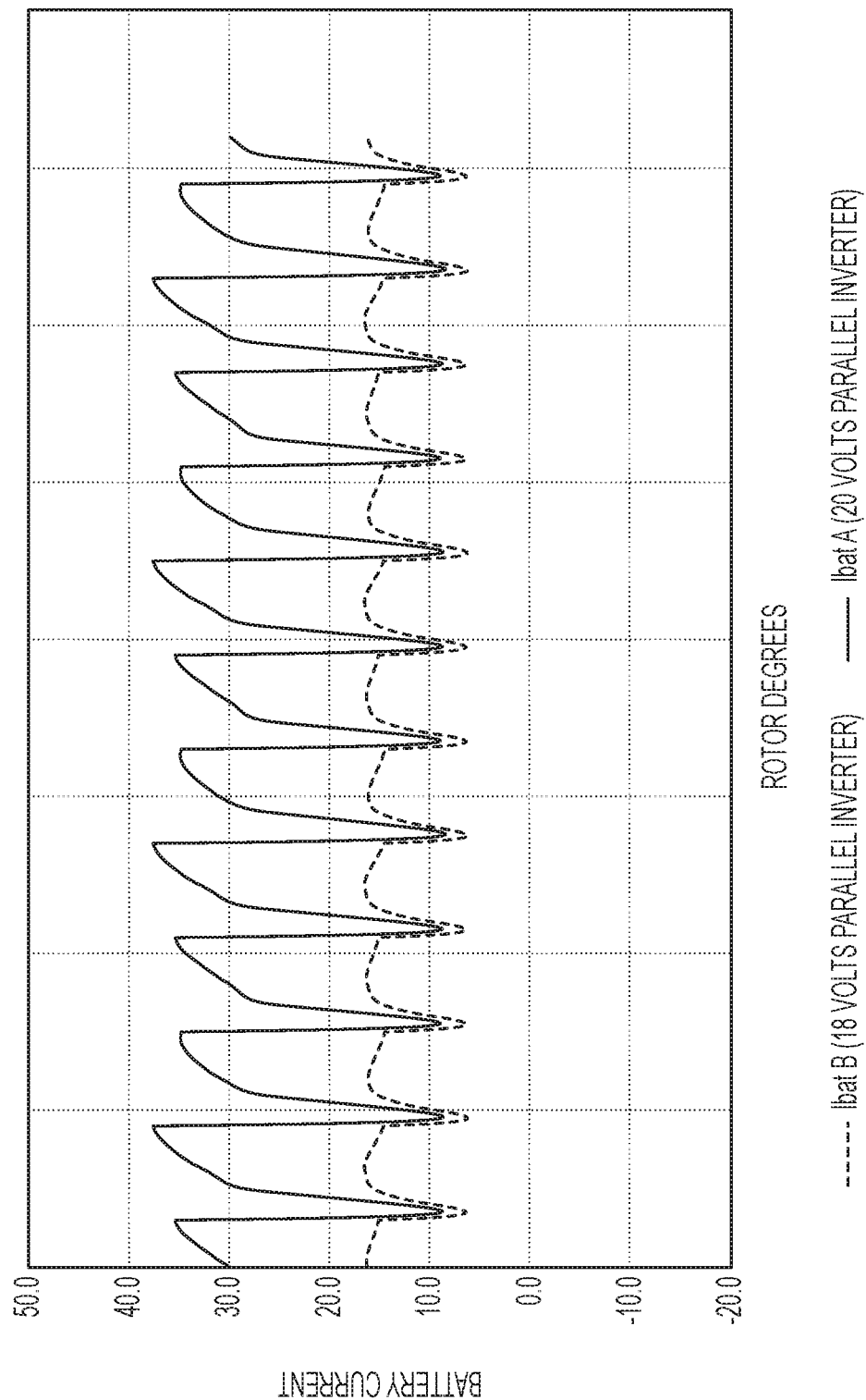
FIG. 18 depicts a current diagram for two battery packs having different states of charge, coupled in parallel via the dual-inverter circuit, according to an embodiment.

FIG. 18 depicts an exemplary current diagram for two 20V max battery packs coupled in parallel via the dual-inverter configuration described here, one (battery A) fully charged at 20V, and the second (battery B) charged to 18V. In this figure, while the current draw from battery A is higher than the current draw from battery B, it is lower in comparison the current draw in FIG. 16. Furthermore, positive current draw is being made from battery B.

This arrangement allows the user to operate the power tool using a single battery pack, which provides comparable power output and speed performance as a conventional three-phase motor and drive circuit, or using two battery packs, which provides improved power output and speed performance at approximately twice the battery life.

Figure 19:
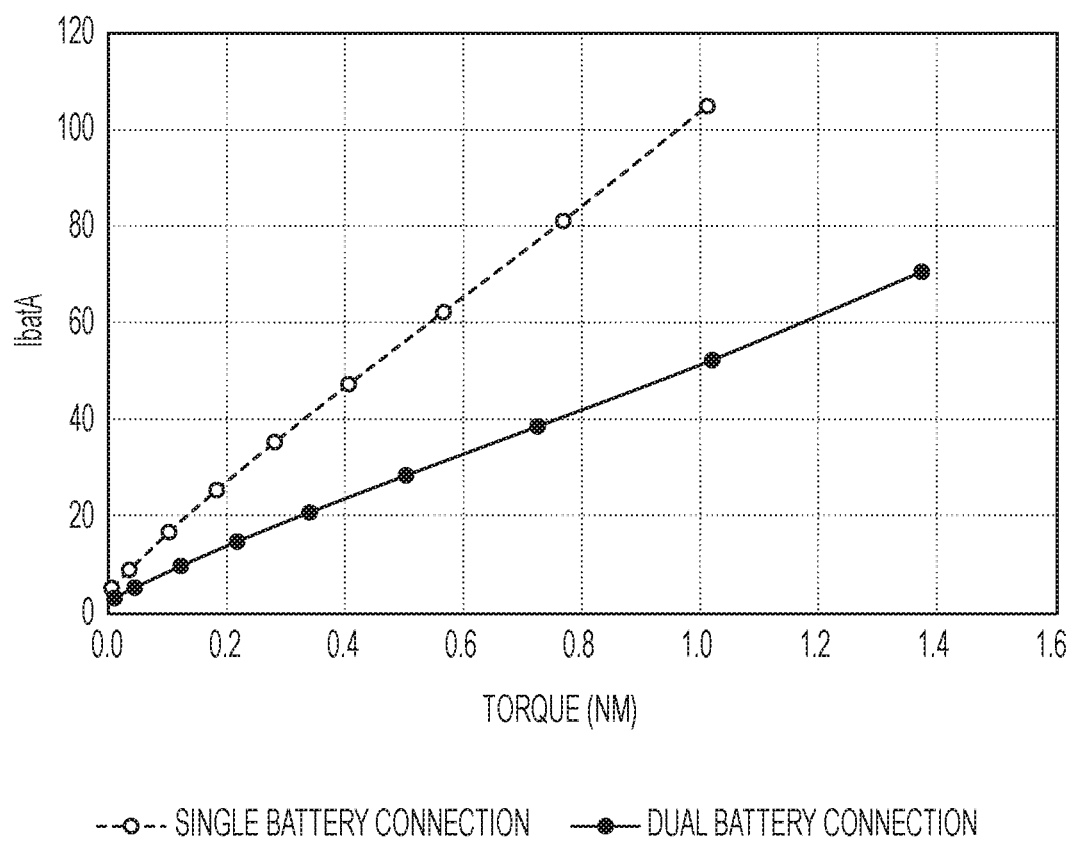
FIG. 19 depicts a comparative current/torque diagram depicting current draw from a single battery pack v. two battery packs connected in parallel, according to an embodiment.
Figure 20:
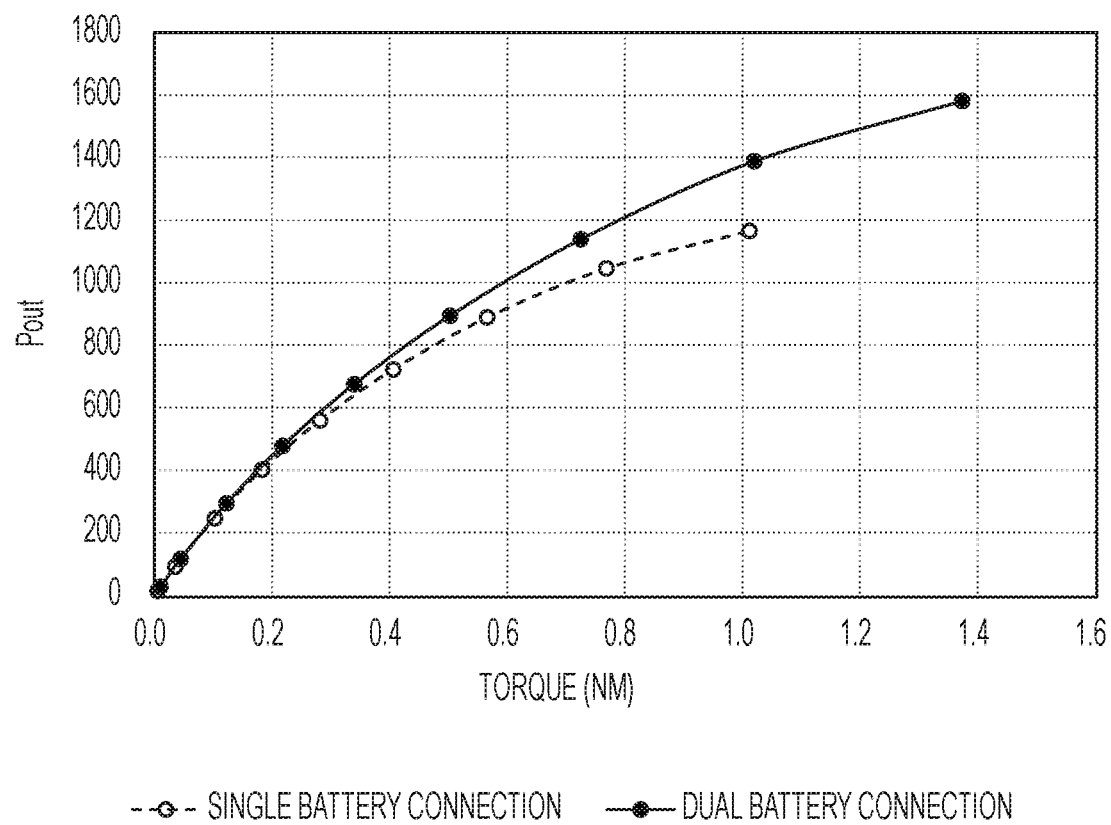
FIG. 20 depicts a comparative power/torque diagram depicting current draw from a single battery pack v. two battery packs connected in parallel, according to an embodiment.
Figure 21:
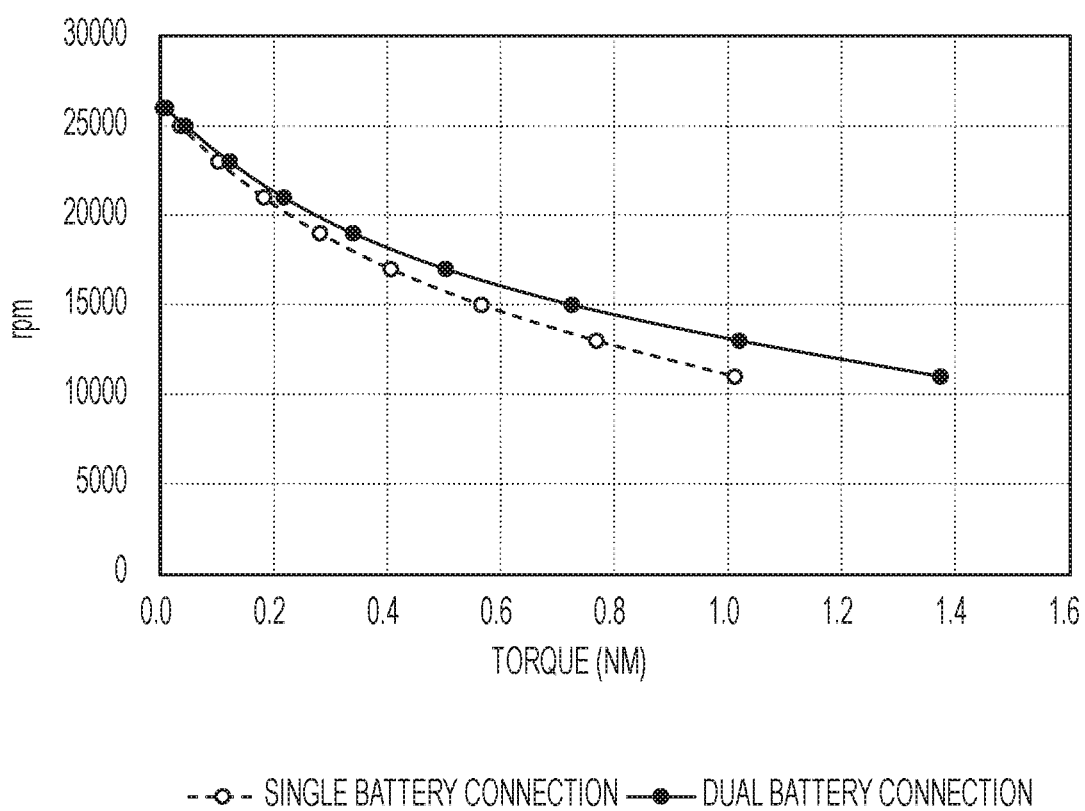
FIG. 21 depicts a comparative speed/torque diagram depicting current draw from a single battery pack v. two battery packs connected in parallel, according to an embodiment.
Figure 22:
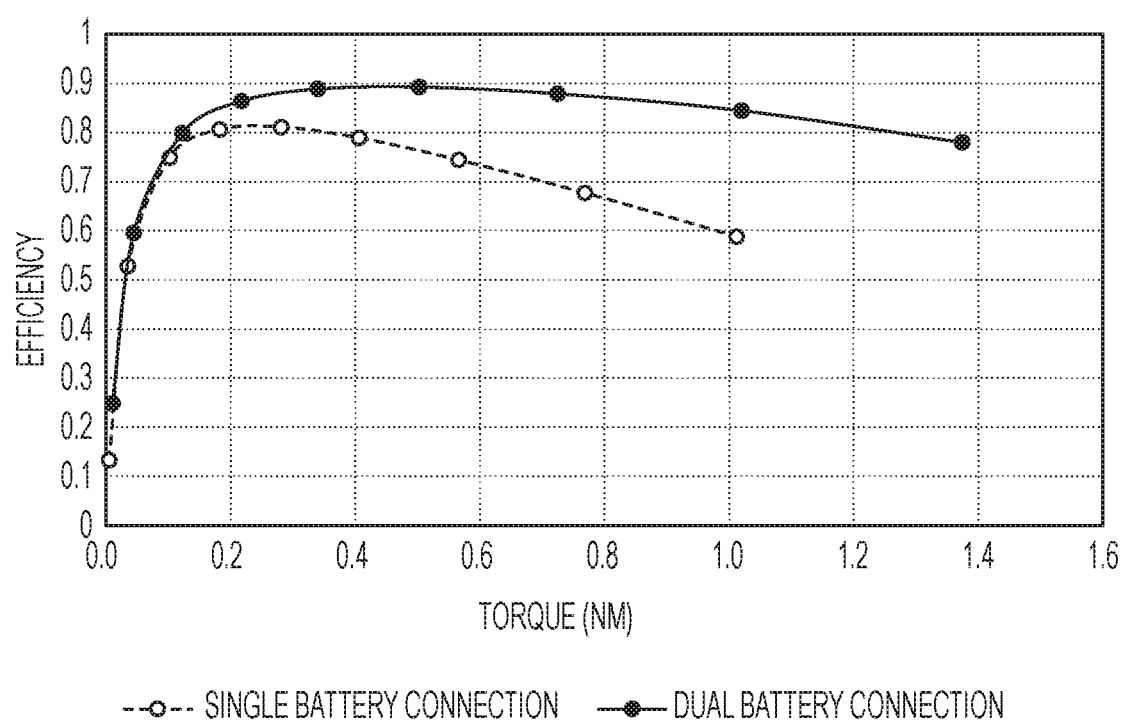
FIG. 22 depicts a comparative efficiency/torque diagram depicting current draw from a single battery pack v. two battery packs connected in parallel, according to an embodiment.

Specifically, as shown in the current (battery)/torque diagram of FIG. 19, when using two battery packs in the parallel connection described herein, the current draw from each battery pack is halved as expected. This approximately doubles the power tool runtime when using both battery packs. In addition, since current draw from each battery is lower, the voltage drop of each battery due to battery impedance is also proportionally lowered. This decreased battery impedance significantly enhances the power output capability of the two battery packs combined, as shown in the power/torque diagram of FIG. 20. Maximum speed and system efficiency are similarly improved, as shown in the speed/torque diagram of FIG. 21 and the efficiency/torque diagram of FIG. 22.

In an embodiment, the amount of current and consequently the amount of power from each DC power supply 370 and 372 (e.g., two battery packs) may be independently controlled by selecting the appropriate conduction angle and/or advance angle. As described in WO2015/179318 filed May 18, 2015, which is incorporated by reference in its entirety, the conduction band (i.e., conduction angle) of each phase of the motor may be varied from the default 120 degrees to a lesser value (e.g., 90 degrees) for decreased power output, or to a higher value (e.g., 150 degrees) for increased power output. Similarly, the advance angle may be varied from the default 30 degrees to a lesser value (e.g., 20 degrees) for decreased power output, or to a higher value (e.g., 50 degrees) for increased power output. In an embodiment, at least one of the conduction band or angle advance may be set in accordance with a condition related to the DC power supply 370 and 372. In an embodiment, the condition may be the state of the charge of the battery packs. Thus, for example, a fully charged battery pack may be fired with a condition band/angle advance (CB/AA) of 120/30 degrees, whereas a partially charged battery pack may be fired with a CB/AA of 150/45 degrees.

Dual-Inverter for Series/Parallel Winding Configuration

Another aspect of the invention is described herein with reference to FIG. 23-32.

In a three-phase BLDC motors, the stator windings may be wound in a variety of configurations. The two basic winding configurations for the phases of the motor are wye and delta connections. A motor with windings configured in the delta configuration can operate at a greater speed than the same windings configured in the wye configuration. However, a motor with windings configured in the wye configuration can operate with a greater torque than the same windings configured in the delta configuration.

Furthermore, the motor windings for each phase of the motor may also be configured in series or parallel connections. In a series winding connection, where the two coils of the same phase are stacked in series, the number of turns of the coils add up. Thus, a motor with windings configured in a series connection is suitable for high voltage/low torque applications, where a higher total number of winding turns is needed. In a parallel winding connection, where the two coils of the same phase are wired in parallel to each other, the total number of turns for each phase do not add up, but the back-EMF of the motor is decreased by half in comparison to the series connection (and resistance is decreased by a fourth). Accordingly, a motor with windings configured in a parallel configuration is suitable for low voltage/high current applications, where a higher number of winding turns is not required, but a reduced back-EMF voltage is desired. Specifically, given the same motor and the same power and speed output requirements, a series connection is more suitable for high voltage applications, e.g. power tools operating with a power supply having a rated voltage of approximately 200-240V, and a parallel connection is more suitable for relatively lower voltage applications, e.g. power tools operating with a power supply having a rated voltage of approximately 100-120V. It is noted that these voltage ranges are exemplary and these principles apply to other comparative voltage ranges, e.g., a series connection for 100-120V voltage range and a parallel connection for a 50-60V voltage range.

Figure 24:
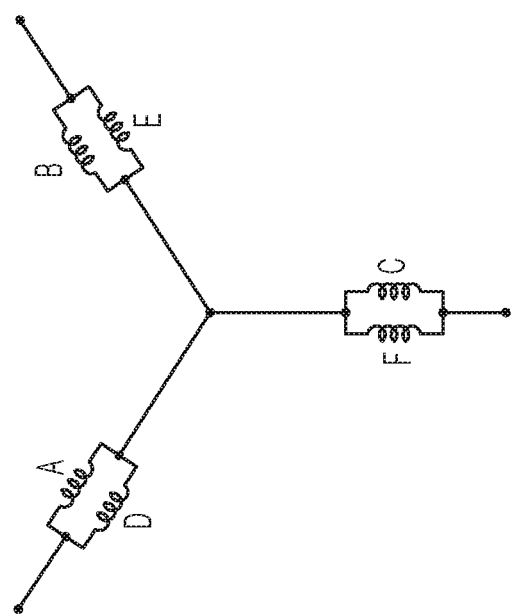
FIGS. 23 and 24 respectively depict exemplary winding configurations for a wye-series connection and a wye-parallel connection, according to an embodiment.
Figure 23:
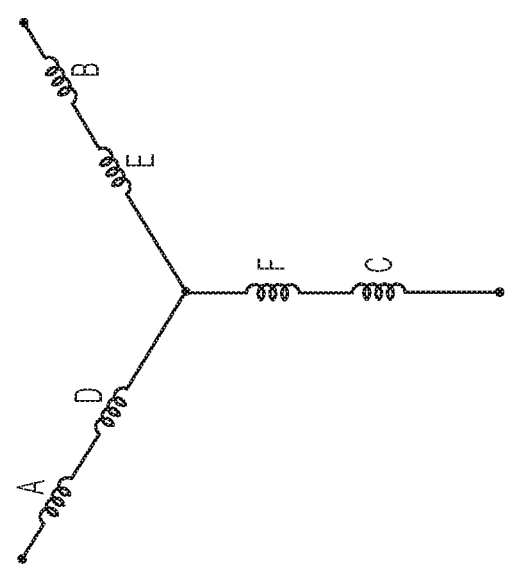

FIGS. 23 and 24 respectively depict exemplary winding configurations for a wye-series connection and a wye-parallel connection for illustration purposes, according to an embodiment.

Traditionally the series or parallel connections are facilitated on the motor itself, e.g., via wire connections on the motor stator. This complicates the motor manufacturing process where, for example, a corded power tool being manufactured for sale in the US and Europe.

According to an embodiment, the motor winding series or parallel connection is facilitated via a two inverter design, as described herein.

Figure 25:
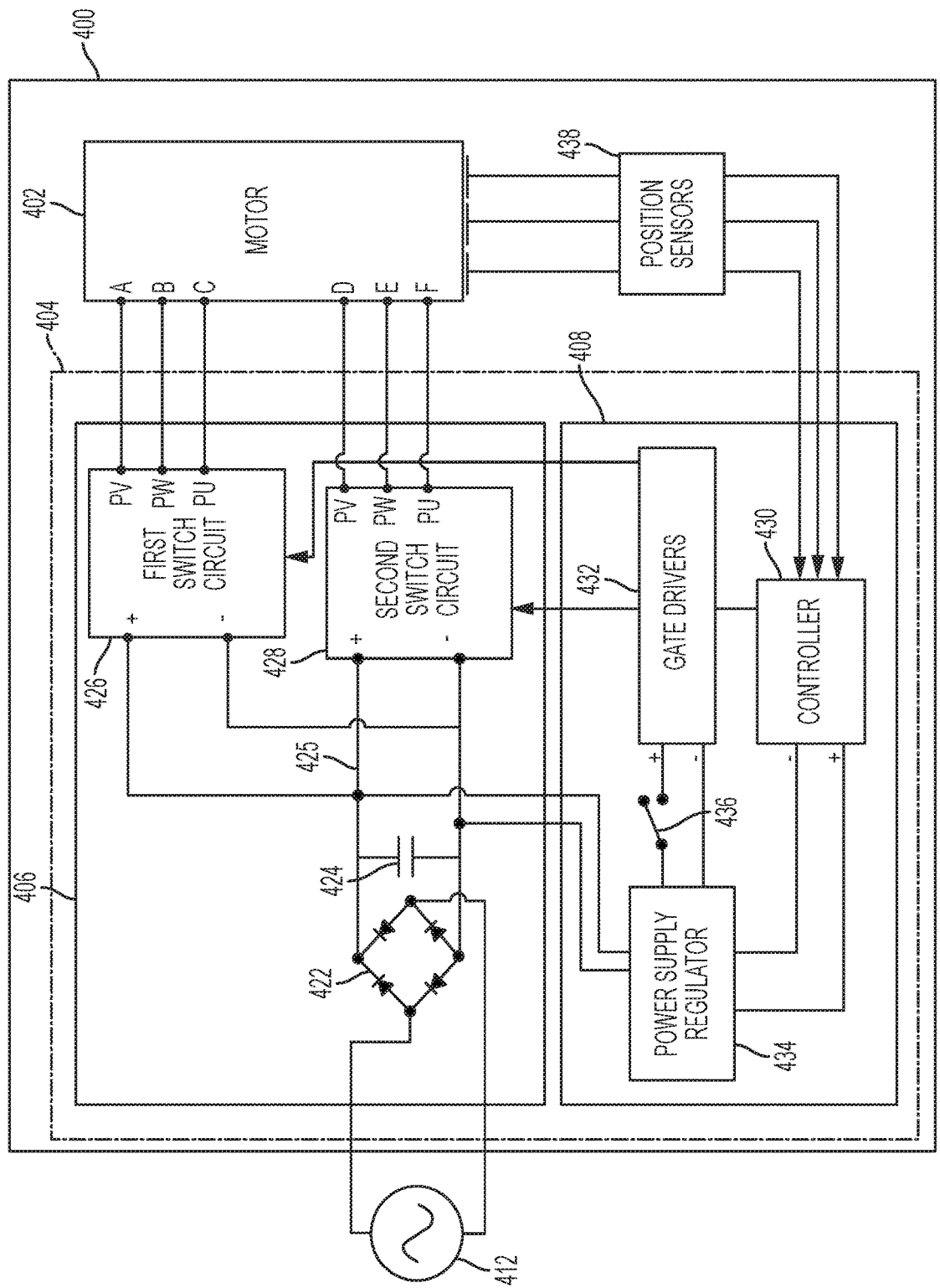
FIG. 25 depicts a block circuit diagram of an AC power tool having a dual-inverter circuit configured to connect the motor windings of each phase of the motor in parallel, according to an embodiment.

Referring to FIG. 25, an exemplary block circuit diagram for controlling the commutation of BLDC motor 402 for an AC power tool 400 is depicted, according to an embodiment. In this embodiment, power tool 400 may include a motor control circuit 404 having a power unit 406 and a control unit 408. Similarly to FIG. 7 previously discussed, control unit 408 includes a controller 430, a gate driver 432, a power supply regulator 434, and a power switch 436. Power unit 406 is disposed between AC power supply 412 and the motor 402. Power unit 406 includes bridge rectifier 422 and a bus capacitor 424 to produce a positive waveform on the DC bus line 425.

It is initially noted that while this embodiment is described herein with reference to an AC-only power tool system, the principles disclosed herein may similarly apply to a DC-only or an AC/DC power tool system.

In this embodiment, power unit 406 includes two power switching circuits: a first switch circuit 426 and a second switch circuit 428. Each of the first and second switching circuits 426 and 428 may include FETs or IGBTs depending on the voltage rating of the power supply 412. The power terminals of both the first and second switching circuits 426 and 428 are coupled to the DC bus line 425. The outputs of the first switch circuit 426 are coupled to windings A-C of the motor 402. The outputs of the second switch circuit 428 are coupled to windings D-F of the motor 402. These windings are configured as shown in FIGS. 11A and 11B previously discussed. By driving the two switch circuits 426 and 428 concurrently (i.e., using the same commutation drive signals), this configuration allows windings A and D of the motor to be connected and driven in parallel. Similarly, windings B and F, and windings C and F are connected and driven in parallel. Thus, this configuration employs a parallel winding connection on the motor without hardwiring the motor stator windings in a parallel configuration.

Figure 26:
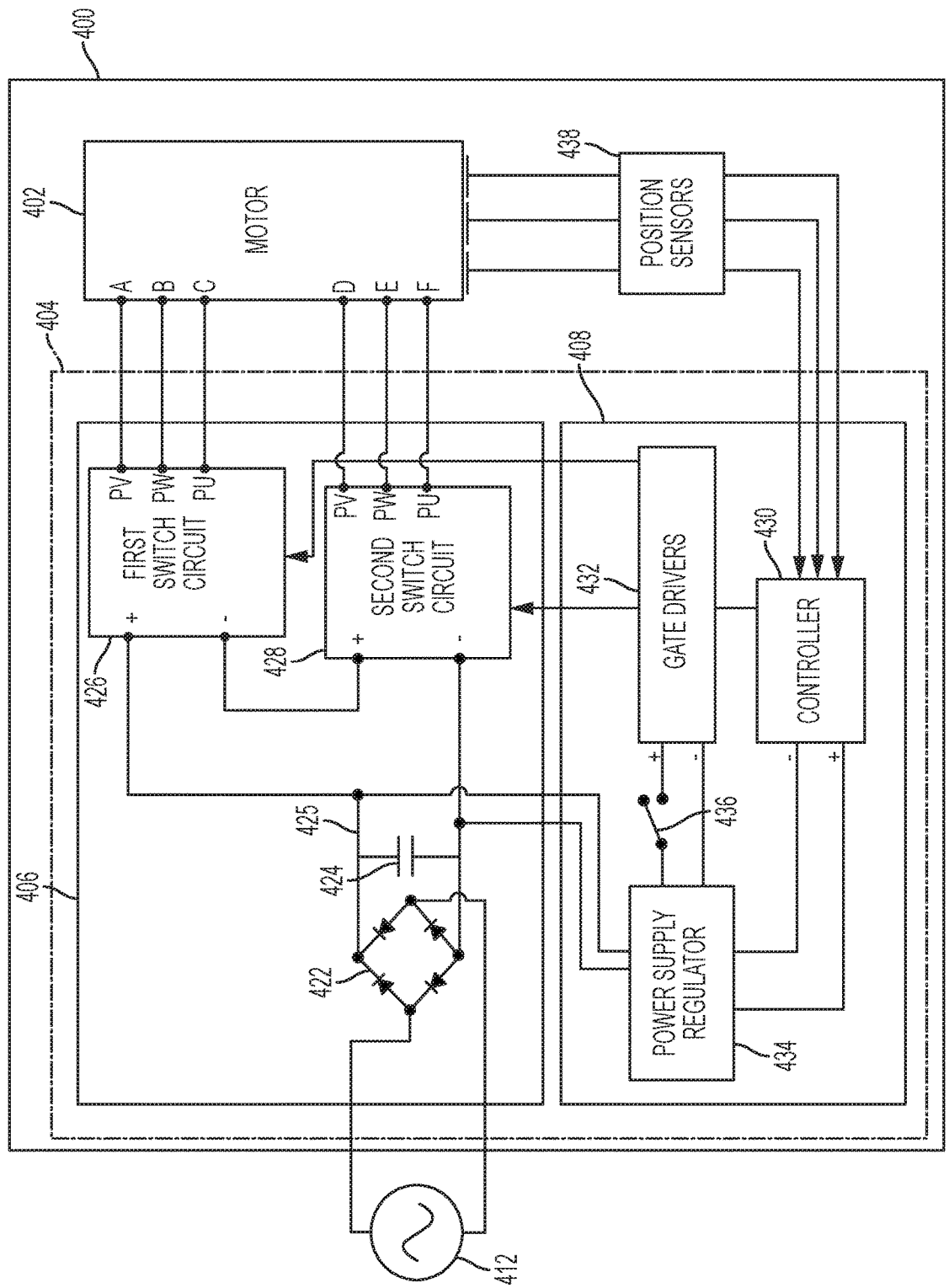
FIG. 26 depicts a block circuit diagram of an AC power tool having a dual-inverter circuit configured to connect the motor windings in series, according to an embodiment.

FIG. 26 depicts a similar exemplary block diagram as FIG. 25 described above, but with the first and second switch circuits 426 and 428 connected so as to facilitate a series winding connection on the motor 402. In this embodiment, the DC bus line 425 is connected to the positive terminal (+) of the first switching circuit 426 and the negative terminal (−) of the second switch circuit 428. The positive terminal (+) of the second switching circuit 428 is coupled to the negative terminal (−) of the first switch circuit 426. The outputs of the first switch circuit 426 are coupled to windings A-C of the motor 402, and the outputs of the second switch circuit 428 are coupled to windings D-F of the motor 402. These windings are configured as shown in FIGS. 11A and 11B previously discussed.

By driving the two switch circuits 426 and 428 concurrently (i.e., using the same commutation drive signals), this configuration allows windings A and D of the motor to be connected and driven in series. Specifically, for each cycle of the rectified AC waveform on the DC bus line 425, a current path is provided through the positive terminal (+) of the first switch circuit 426, into motor winding A, and through the negative terminal (−) of the first switch circuit 426 and the positive terminal (+) of the second switch circuit 428, into motor winding D. Similarly, windings B and F, and windings C and F are connected and driven in series. Thus, this configuration employs a series winding connection on the motor without hardwiring the motor stator windings in a parallel configuration.

Another advantage of the dual-inverter design for a series winding connection is the ability to use smaller and less expensive power switches for high power application, as described herein.

Figure 27:
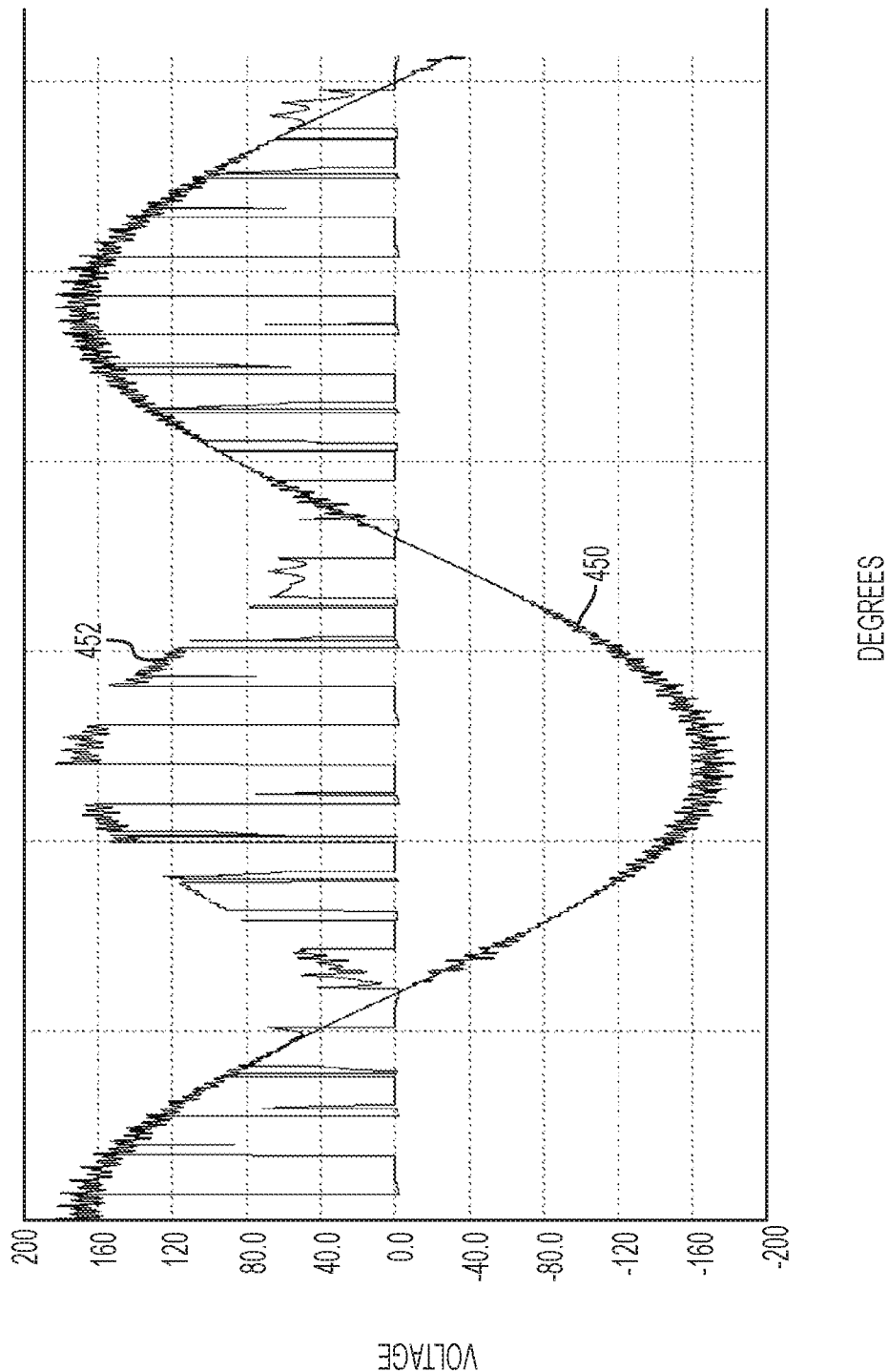
FIG. 27 depicts a voltage waveform diagram for a conventional three-phase BLDC motor wound in a series connection and driven via a single three-phase inverter circuit, according to an embodiment.

FIG. 27 depicts a voltage waveform diagram for a conventional three-phase BLDC motor wound in a series connection and driven via a single three-phase inverter circuit. In this diagram, line 450 represents the AC power supply voltage (e.g., 120VAC rms mains) and line 452 represents the voltage across the inverter switches. In this design, the inverter switches have to be rated to handle a voltage of 120V. Where the AC mains is 240VAC, the inverter switches have to be similarly rated to handle a voltage of 240V, and thus are substantially larger and more expensive.

Figure 28:
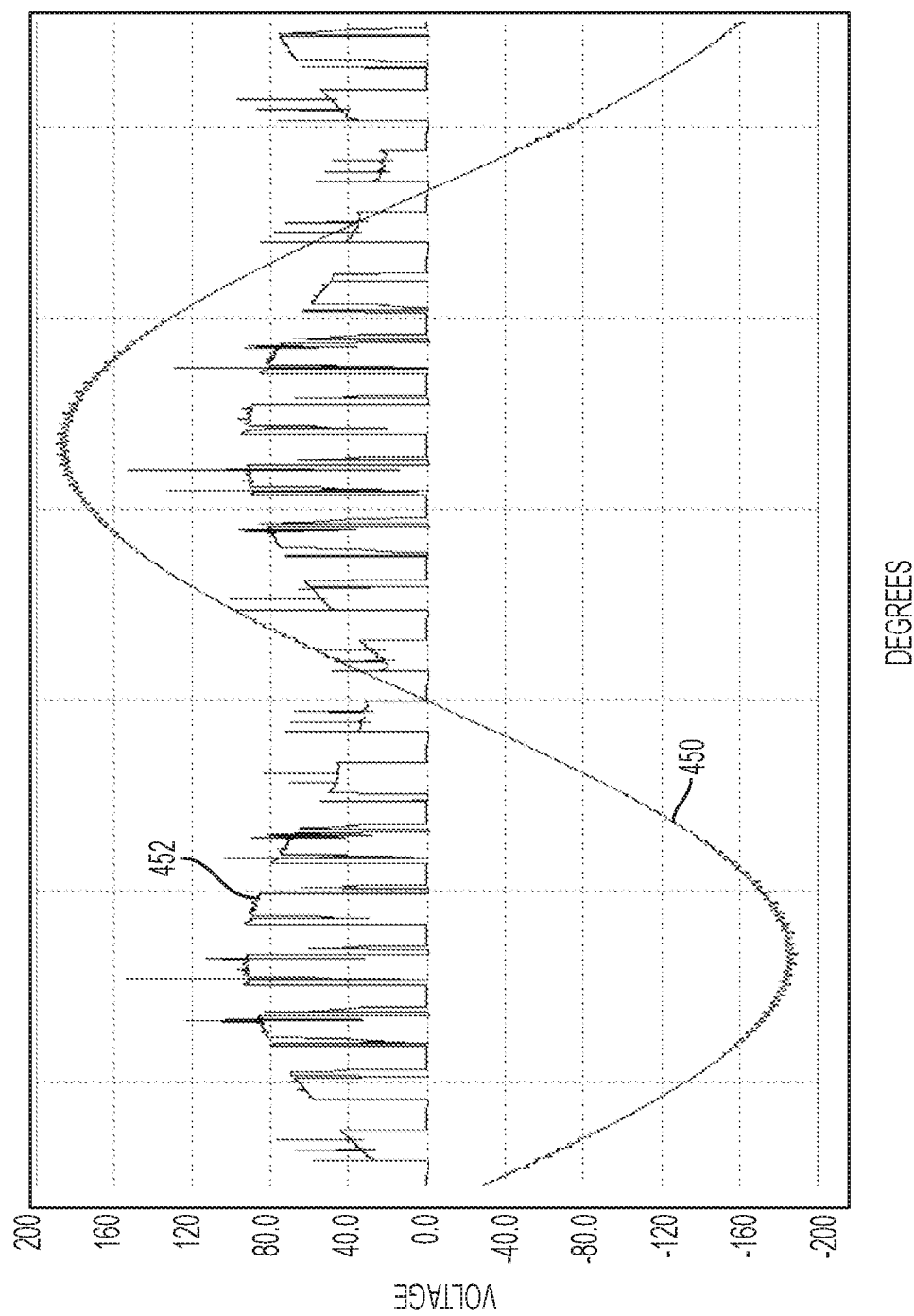
FIG. 28 depicts a voltage waveform diagram corresponding to a parallel motor connection via a dual-inverter circuit as shown circuit diagram of FIG. 25, according to an embodiment.

FIG. 28 depicts a voltage waveform diagram corresponding to the circuit diagram of FIG. 25, according to an embodiment. In this diagram, line 450 represents the AC power supply voltage 412 (e.g., 120 VAC rms mains, also referred to as the nominal voltage of the AC power supply voltage 412) and line 454 represents the voltage across the inverter switches in the first switch circuit 426 and second switch circuit 428. Since the corresponding inverter switches are connected in series, they equally share the voltage of the DC bus line 425. Thus, in this design, the inverter switches have to be rated to handle a voltage of half the AC power supply, i.e., 60V. Where the AC mains is 240VAC, the inverter switches have to be rated to handle a voltage of 1200V, which are substantially cheaper and smaller in comparison to 240V switches.

Accordingly, in the embodiment described above, the increase in the total inverter switches required to facilitate a series connection is significantly offset by the use of smaller and less expensive inverter switches.

Figure 29:
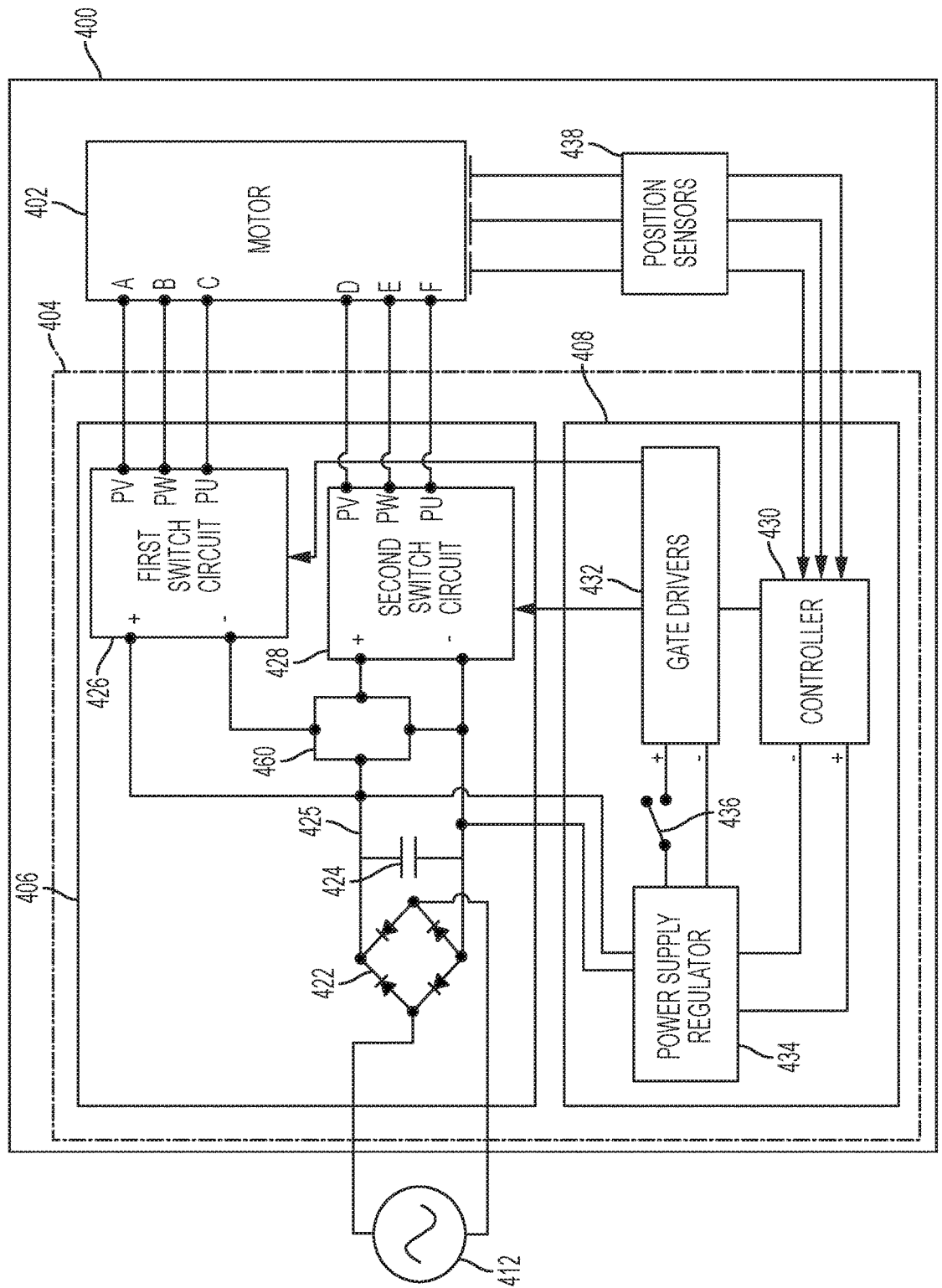
FIG. 29 depicts a block circuit diagram of an AC power tool having a dual-inverter circuit, further provided with a switching unit to selectively connect the motor windings of each phase of the motor in series or parallel, according to an embodiment.

Referring to FIG. 29, an exemplary block circuit diagram for controlling the commutation of BLDC motor 402 for an AC power tool 400 is depicted, according to an alternative and/or additional embodiment of the invention. In contrast to the embodiments of FIGS. 25 and 26, in this embodiment, the first and second switch circuits 426 and 428 are not hardwired into a series or parallel connection. Rather, in this embodiment, a switching unit 460 is further provided on the DC bus line 425 to selectively couple the first and second switch circuits 426 and 428 in a series or parallel connection. In an embodiment, the switching unit 460 may include one or more switches that selectively couple the positive and negative nodes of the DC bus line 525, the negative (−) terminal of the first switch circuit 426, and the positive (+) node of the second switch circuit 428 in such a way to selectively place the switch circuits in either a series or a parallel connection.

Figure 30:
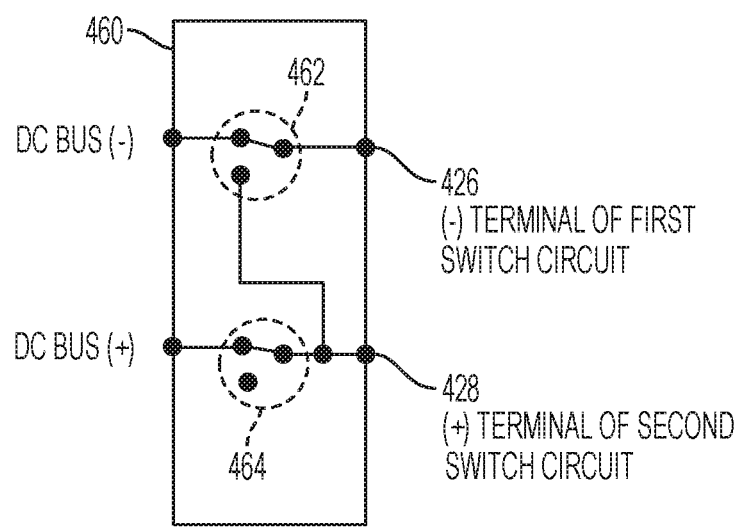
FIG. 30 depicts an exemplary switching unit for the circuit diagram of FIG. 29, according to an embodiment.

FIG. 30 depicts an exemplary switch unit 460, according to an embodiment. In this embodiment, switch unit 460 includes two single-pole double-throw switches 462 and 464. In their normally-closed position, in an embodiment, these switches 462 and 464 connect the DC Bus positive (+)

and negative (−) terminals to the positive terminal of the second switch circuit 428 and the negative terminal of the first switch circuit 426 to place the switch circuits in a parallel connection. When opened, e.g., via a mechanical actuator or other means, in an embodiment, these switches 462 and 464 disconnect the DC Bus positive (+) and negative (−) terminals from the positive terminal of the second switch circuit 428 and the negative terminal of the first switch circuit 426, and instead connect latter terminals together to place the switch circuits in a series connection.

Figure 32:
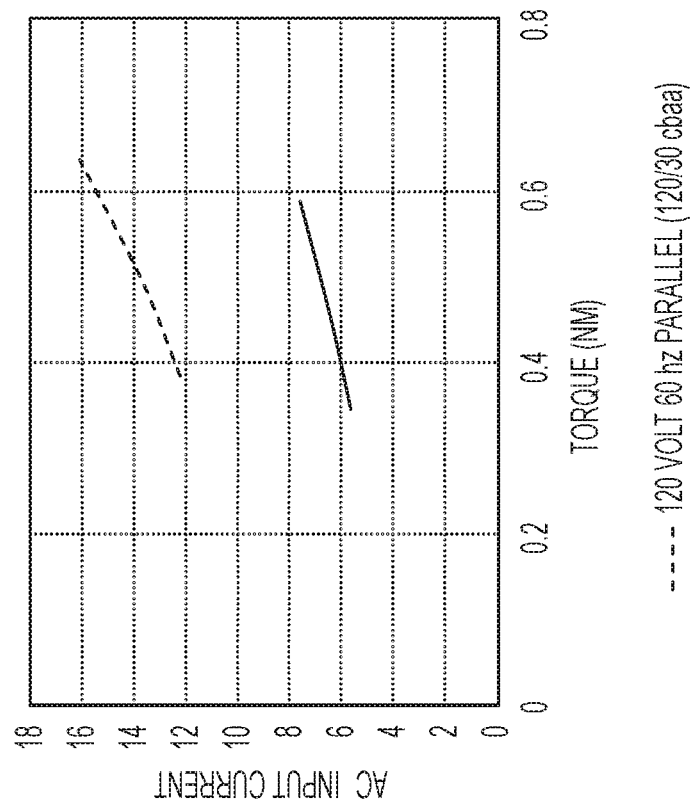
FIGS. 31 and 32 respectively depict comparative power output/torque diagram and AC current/torque of a motor being connected in series and parallel using the dual-inverter circuit, according to an embodiment.
Figure 31:
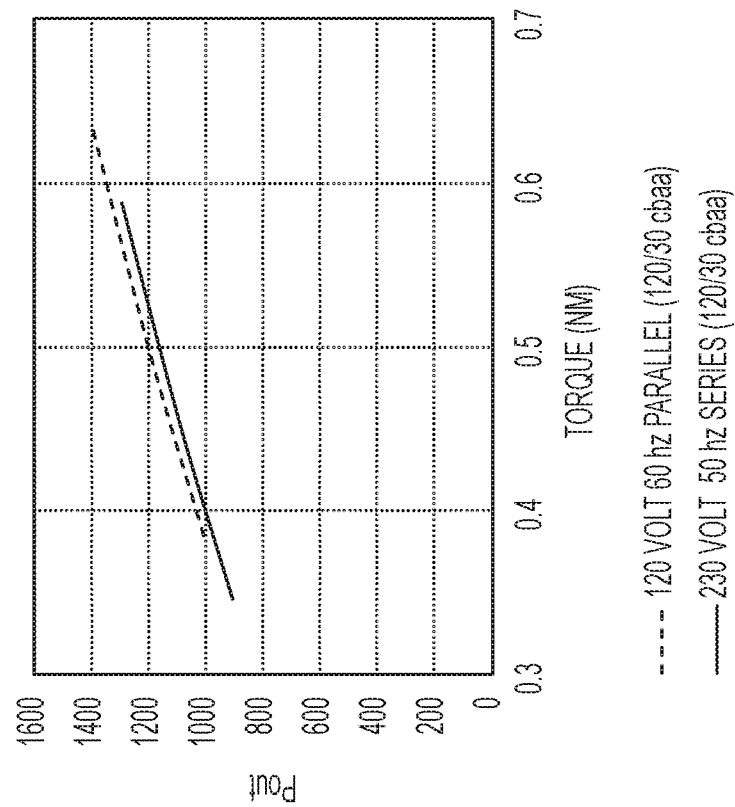

FIG. 31 depicts a power output/torque waveform diagram for the dual-inverter design of this disclosure described above in the series connection (coupled to a 230 VAC 60 hz power supply) and in the parallel connection (coupled to a 120 VAC 50 hz power supply). FIG. 32 depicts an AC current/torque waveform diagram of the same. These measurements correspond to motor commutation at a conduction angle of 120 degrees with an advance angle of 30 degrees. As shown herein, the two configurations result in similar power output performance, with approximately half the AC current for the 230V power supply.

Dual-Inverter for Improved Harmonics and Power Factor

Another aspect of the invention is described herein with reference to FIGS. 33-45, according to an embodiment.

Referring initially to FIG. 33, a current diagram for a conventional three-phase BLDC motor coupled to an AC power supply, is depicted. This current diagram corresponds to the block diagram of FIG. 7 in the AC mode, in an exemplary embodiment. As shown, the motor phase current, represented by a dotted line and measured at the A terminal of the motor, has a substantially sinusoidal waveform. It is noted that in this example, the motor is connected in a wye configuration, and therefore the motor line and phase currents are the same. By contrast, the AC input line current, represented by a solid line, includes large spikes that fluctuating between 0 to over 40 amps each time a phase of the motor is commutated, causes high frequency current harmonics. These current spikes, which are attributable to the switching operation of the power switch circuit 226 between the phases of the motor, significantly decrease the tool's power factor.

Figure 34:
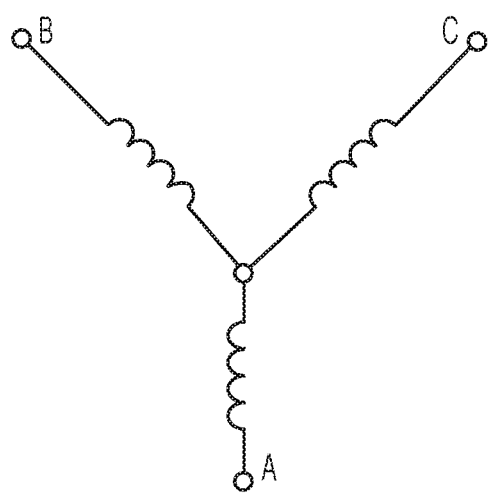
FIGS. 34 and 35 respectively depict exemplary wye and delta motor configurations, according to an embodiment.
Figure 35:
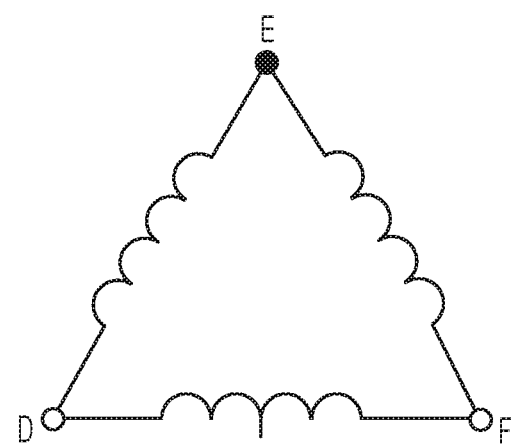

As previously described, a motor stator may be wound in a delta or a wye configuration. FIGS. 34 and 35 respectively depict a wye and a delta motor configuration. Conventionally, in a six-slot four-pole motor, the motor windings are wounds on opposite teeth of the stator for each phase and connected to one another in either a delta or a wye connection.

It is understood by those of ordinary skill in the art that a delta motor connection exhibits a current phase shift compared to a wye connection in the respective phase winding. This phase shift is attributable to the current having two current paths through the windings in the delta connection. Specifically, in a wye connection, the motor phase current is in line with the AC input line current, wherein as a delta connection, the motor phase current lags the AC input line current by approximately 30 degrees. It was found by the inventors that using a two-invertor arrangement, as described herein, the motor windings may be wound using a combination of wye and delta connections so as to utilize this current phase shift to improve current harmonics and power factor, as described herein according to an embodiment of the invention.

Figure 36:
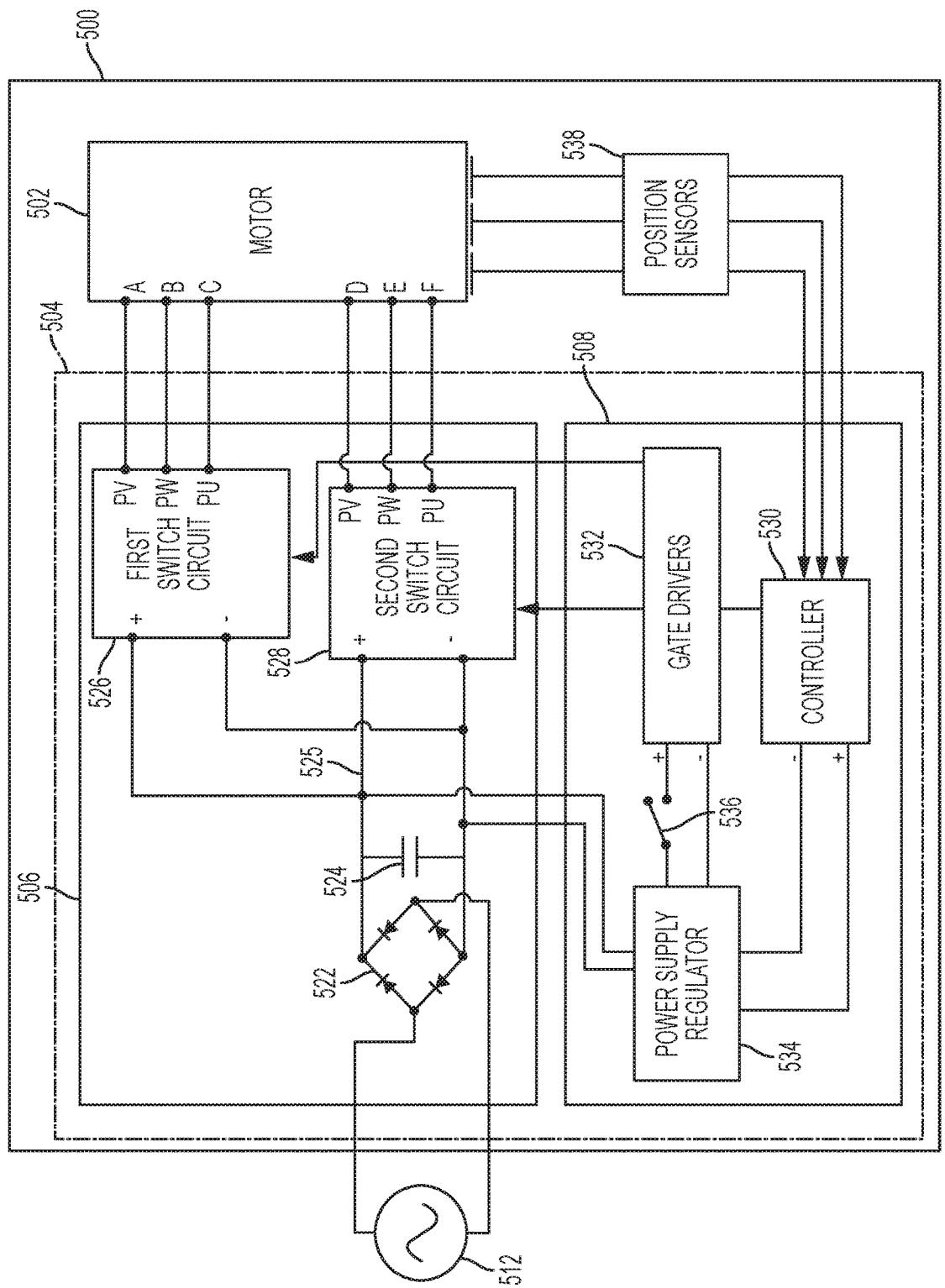
FIG. 36 depicts a block circuit diagram of an AC power tool having a dual-inverter circuit configured for operation the motor windings in six phases, where three windings are connected in a wye configuration and three are connected in a delta configurations, according to an embodiment.
Figure 38:
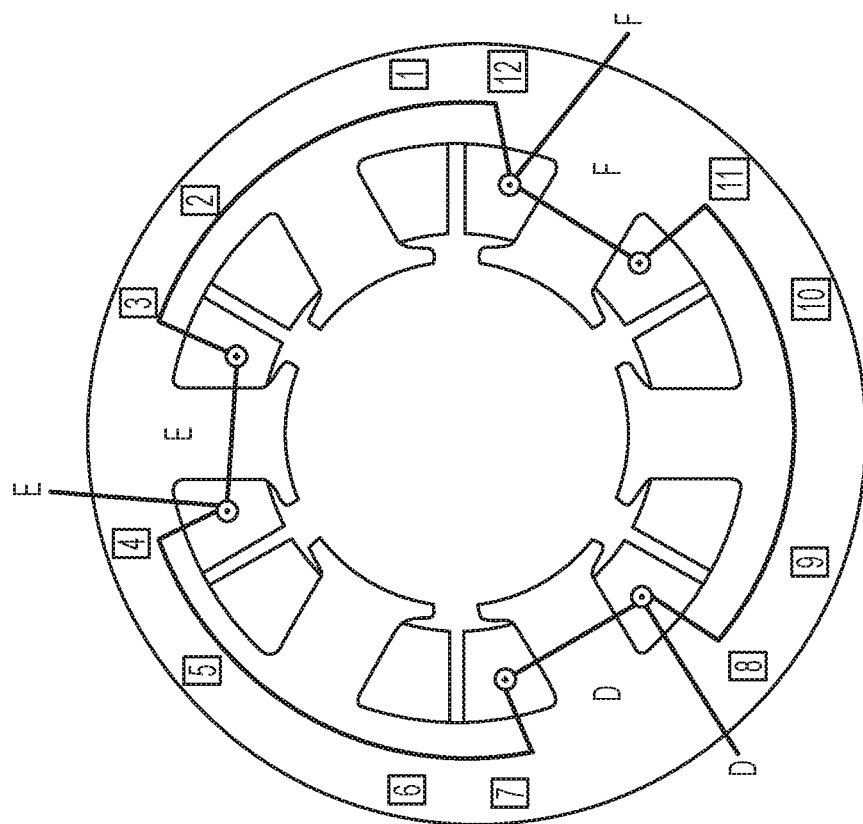
FIG. 38 depicts three stator windings connected in a delta configuration, according to an embodiment.

Referring to FIG. 36, an exemplary block circuit diagram for controlling the commutation of BLDC motor 502 for an AC power tool 500 is depicted, according to an embodiment. In this embodiment, power tool 500 may include a motor control circuit 504 having a power unit 506 and a control unit 508. Similarly to FIG. 7 previously discussed, control unit 508 includes a controller 530, a gate driver 532, a power supply regulator 534, and a power switch 536. Power unit 506 is disposed between AC power supply 512 and the motor 502. Power unit 506 includes bridge rectifier 522 and a bus capacitor 524 to produce a positive waveform on the DC bus line 525.

In this embodiment, power unit 506 includes two power switching circuits: a first switch circuit 526 and a second switch circuit 528. Each of the first and second switching circuits 526 and 528 may IGBTs suitable for high voltage applications, though FETs may be alternatively used in at least one of the first and second switching circuits 526 and 528 in some circumstances. The power terminals of both the first and second switching circuits 526 and 528 are coupled to the DC bus line 525. The outputs of the first switch circuit 526 are coupled to windings A-C of the motor 502. The outputs of the second switch circuit 528 are coupled to windings D-F of the motor 502.

Figure 37:
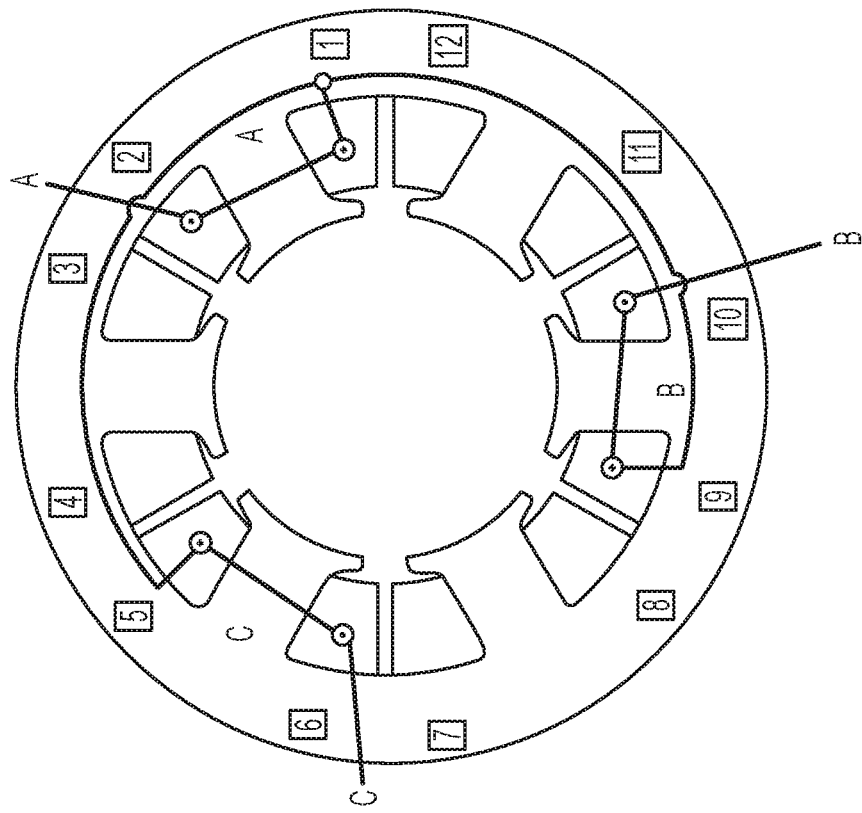
FIG. 37 depicts three stator windings connected in a wye configuration, according to an embodiment.

According to an embodiment, windings A-C of the motor 502 are wound in a wye configuration, as shown in the exemplary cross-sectional view of FIG. 37. Windings D-F of motor 502 are wound in a delta configuration, as shown in the cross-sectional view of FIG. 38.

Figure 39:
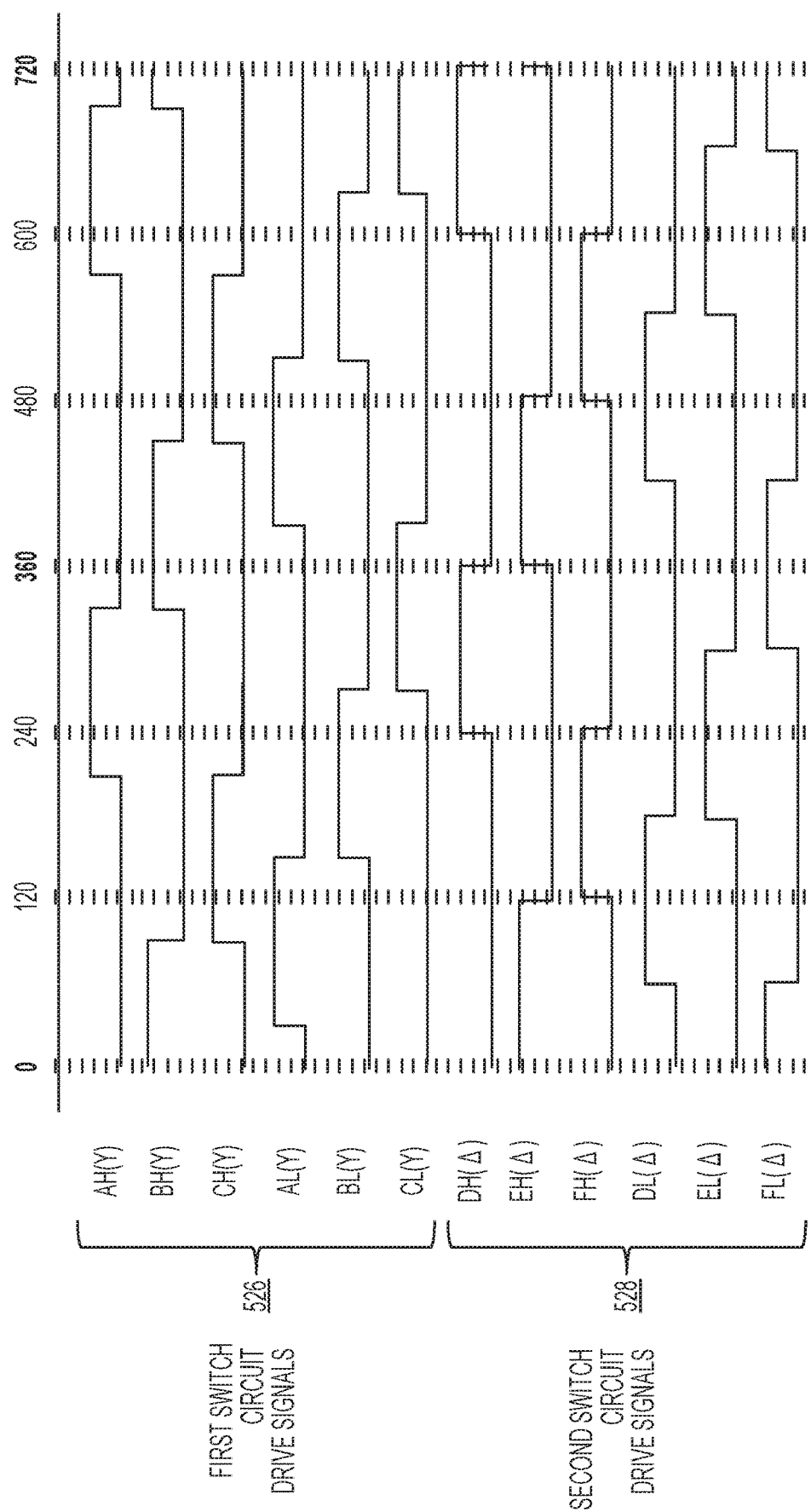
FIG. 39 depicts an exemplary waveform diagram for six-phase commutation sequence of the motor, according to an embodiment.

According to an embodiment, controller 530 drives both sets of windings A-C and D-F via the first and second switch circuits 526 and 528 using a six-phase commutation sequence depicted in the exemplary waveform diagram of FIG. 39, according to an embodiment. As shown herein, in an embodiment, the drive signals for the second switch circuit 528 (i.e., the delta converter) include a 30 degree delay compared to the drive signals for the first switch circuit 526 (i.e., the wye converter). In other words, the wye connection drive signals are advanced by 30 degrees compared to the delta connection drive signals. This arrangement ensures that the motor phase current on the delta windings is properly aligned with respect to the back-EMF of the motor.

Figure 40:
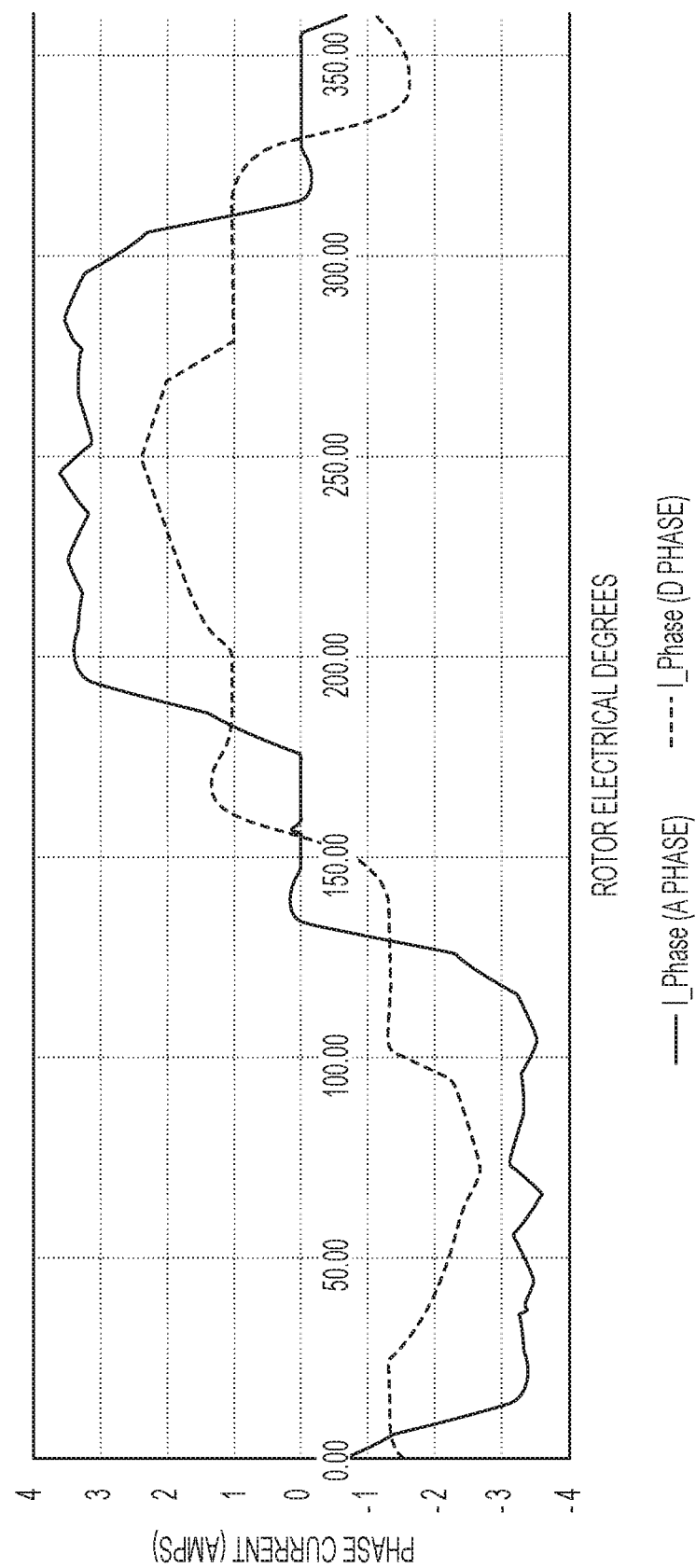
FIG. 40 depicts a waveform diagram showing the motor phase currents for an exemplary wye-connected phase and an exemplary delta-connected phase of the motor, according to an embodiment.
Figure 41:
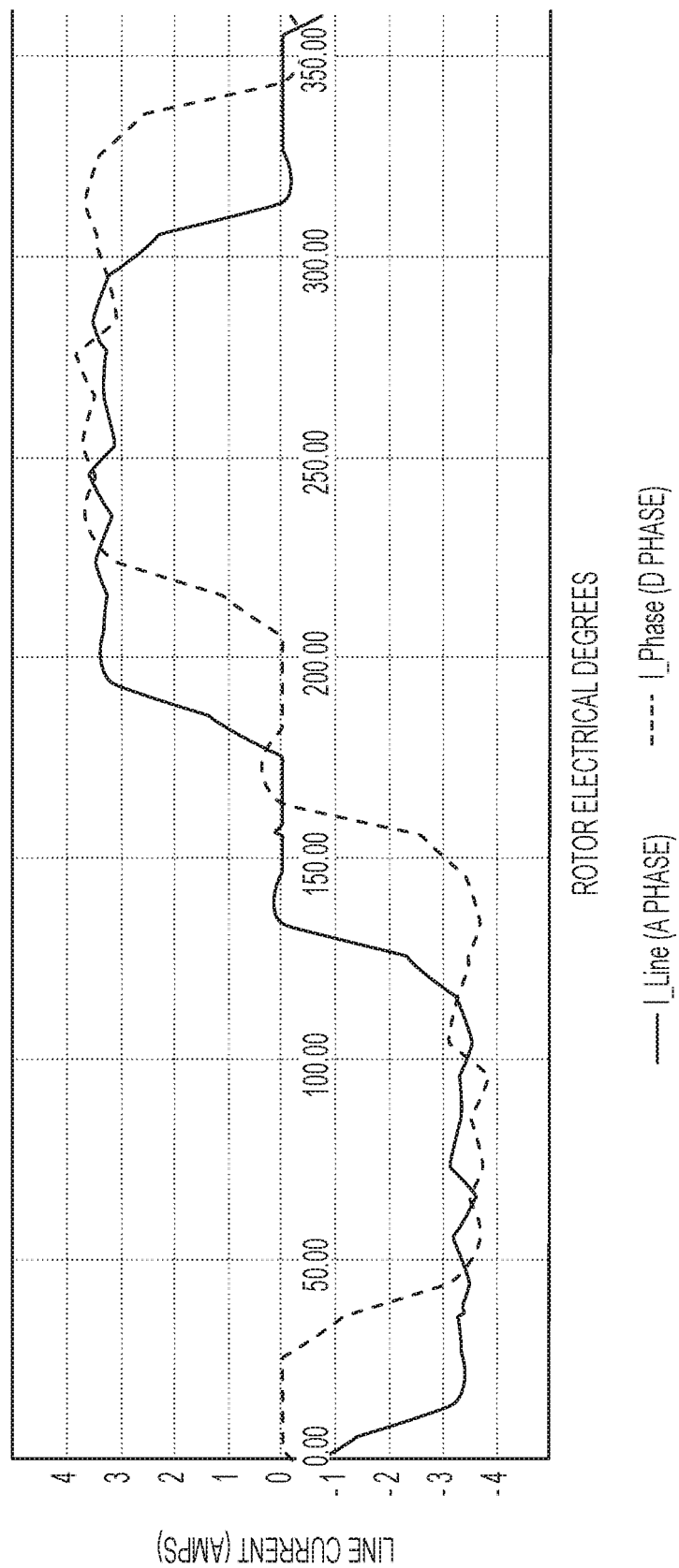
FIG. 41 depicts a waveform diagram showing the motor line currents for the exemplary wye-connected phase and the exemplary delta-connected phase of the motor, according to an embodiment.

FIG. 40 depicts a waveform diagram showing the motor phase currents for phases A (wye connection) and D (delta connection) using the above-described circuit, winding arrangement, and commutation sequence, according to an embodiment. FIG. 41 depicts a waveform diagram showing the motor line current for phases A (wye connection) and D (delta connection), showing the 30 degree delay in the delta connection motor line current, according to an embodiment. It is noted that the motor phase currents are the currents flowing through the motor's respective phase windings, and the motor line currents are measured at the output terminals of the first and second switch circuits 526 and 528 going into the motor.

As shown in FIG. 40, due to the presence of two current paths for the phase current in a delta connection, the phase current in a delta connection is approximately 180 degrees in each AC half cycle. By contrast, the phase current in a wye connection is approximately 120 degrees in each AC half cycle. In the delta connection, the phase current in each phase turns positive 60 degrees before the corresponding high-side switch turns on. Thus, without the 30 degree delay in the delta for delta phase currents (i.e., if both the first and second switch circuits 526 and 528 were driven using the same drive signals), the delta phase currents (e.g., phase A) would lead the wye phase currents (e.g., phase D) by 30 degrees, placing the delta phase out of alignment with the motor back-EMF. The 30 degree delay ensures that the motor phases are properly aligned with the motor back- EMF. In other words, while the shapes of the motor phase currents for the wye and delta connections are different (i.e., 120 degrees compared to 180 degrees in width), with the 30 degree delay, both are properly aligned with the motor back-EMF, allowing the root-mean-square (RMS) values of both phases to be approximately the same.

In an embodiment, the 30 degree delay for the wye connection drive signals discussed above provides an opportunity to operate the BLDC motor effectively as a six-phase machine relative to the AC input current. In other words, while the motor emulates a three-phase machine due to the alignment of the delta and wye phases, it draws current from the power supply in six phases due to the shift in the motor line currents of the delta-connected windings, as shown in FIG. 41.

Figure 42:
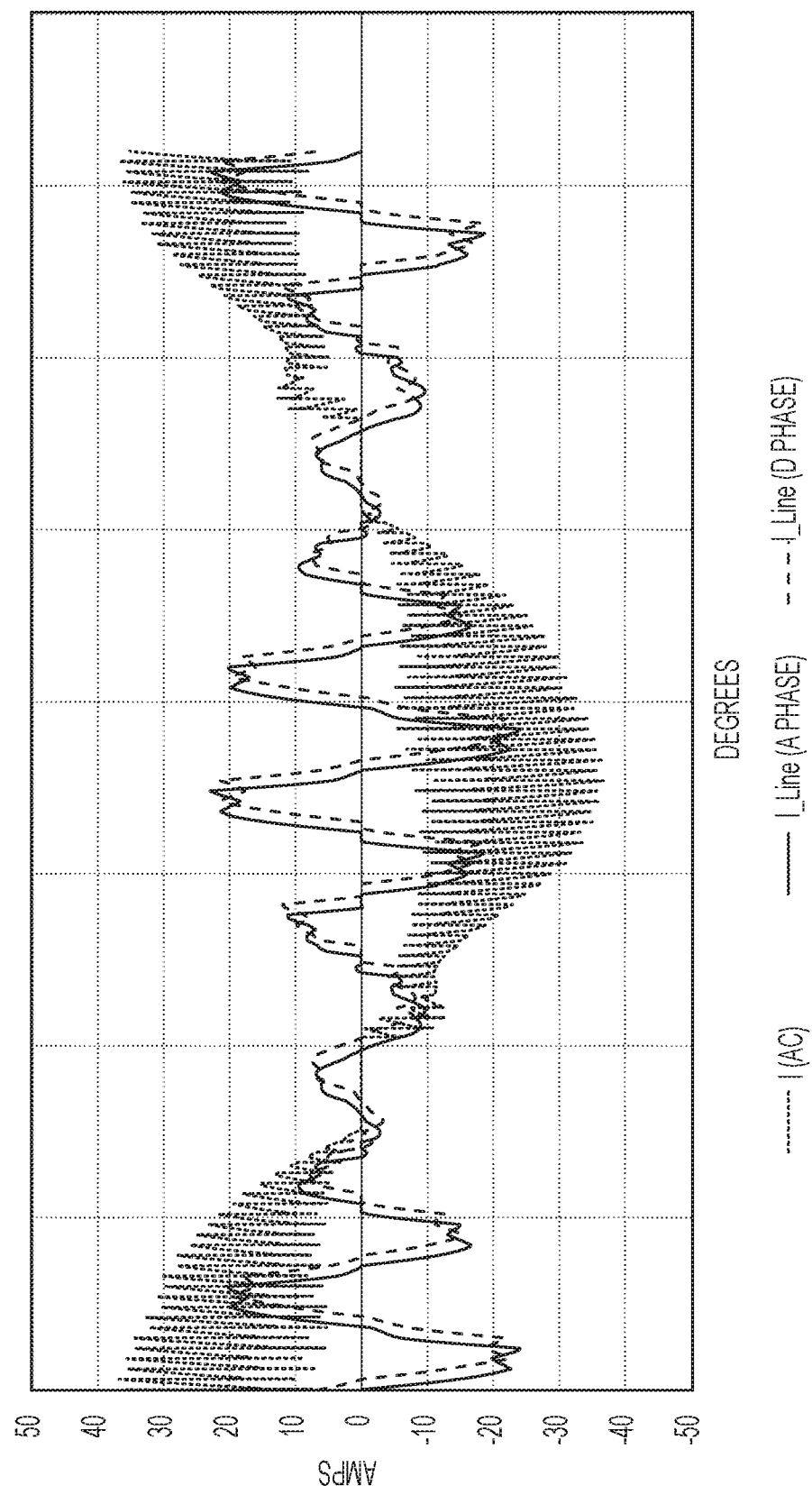
FIG. 42 depicts a waveform diagram showing another comparative view of the motor line current for phases A (wye connection) and D (delta connection), as well as the AC input current as measured from the power supply, according to an embodiment.

FIG. 42 depicts a waveform diagram showing another comparative view of the motor line current for phases A (wye connection) and D (delta connection), as well as the AC input current as measured from the power supply. As shown herein, since the motor line currents for the wye and delta connections are out of phase as a result of the six-phase commutation scheme described above, the current draw from the AC power supply does not drop to zero between the motor commutation switching sequences. Specifically, in a conventional six-step three-phase, the current flowing into the inverter circuit drops to zero for each of the six commutation steps between the time one of the switches turns off and the time the subsequent switch turns on. Thus, the current on the AC line cycle drops to zero within each motor commutation cycle, as shown in FIG. 33. By contrast, using the six-phase commutation sequence of this disclosure, as shown in FIG. 39, when one switch of the first switch circuit 526 transition turns off, the corresponding switch of the second switch circuit 528 remains on for another 30 degrees and continues to draw current from the power supply. Thus, the current does not drop to zero within each commutation cycle. This drastically reduces current transients on the AC line current from the power supply, which reduces current harmonics.

Figure 43:
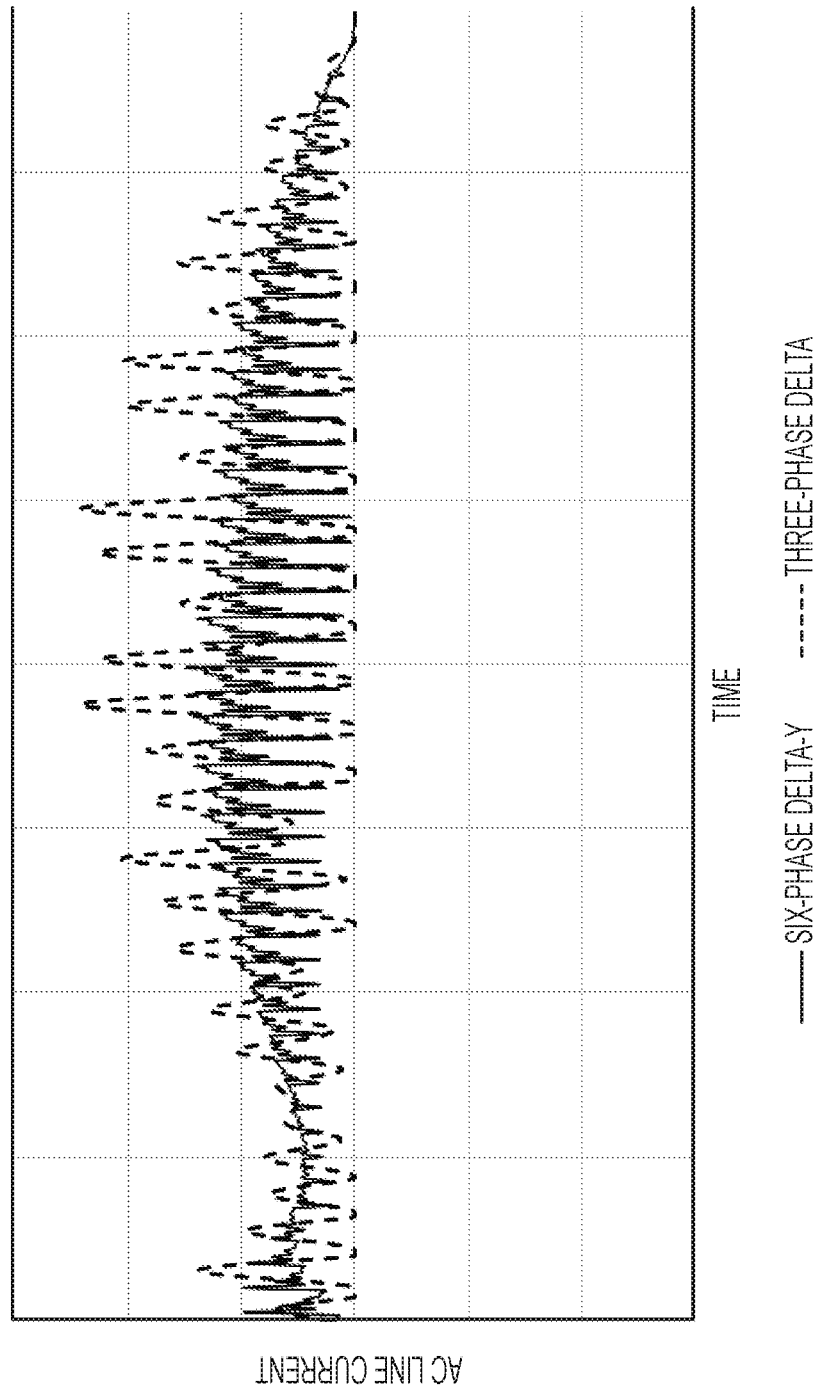
FIG. 43 depicts comparative waveform diagrams of the AC input current for a conventional three-phase motor, and the AC input current for a motor configured and controlled according to the six-phase commutation sequence of this disclosure, according to an embodiment.

FIG. 43 depicts comparative waveform diagrams of the AC input current for a conventional three-phase motor, e.g., one shown in FIG. 33, and the AC input current according to the six-phase commutation sequence of this disclosure, according to an embodiment. As shown in this figure and FIG. 42, the current fluctuations on the AC input current from the power supply are substantially less in the present embodiment than the current spikes for the conventional three-phase motor.

Figure 44:
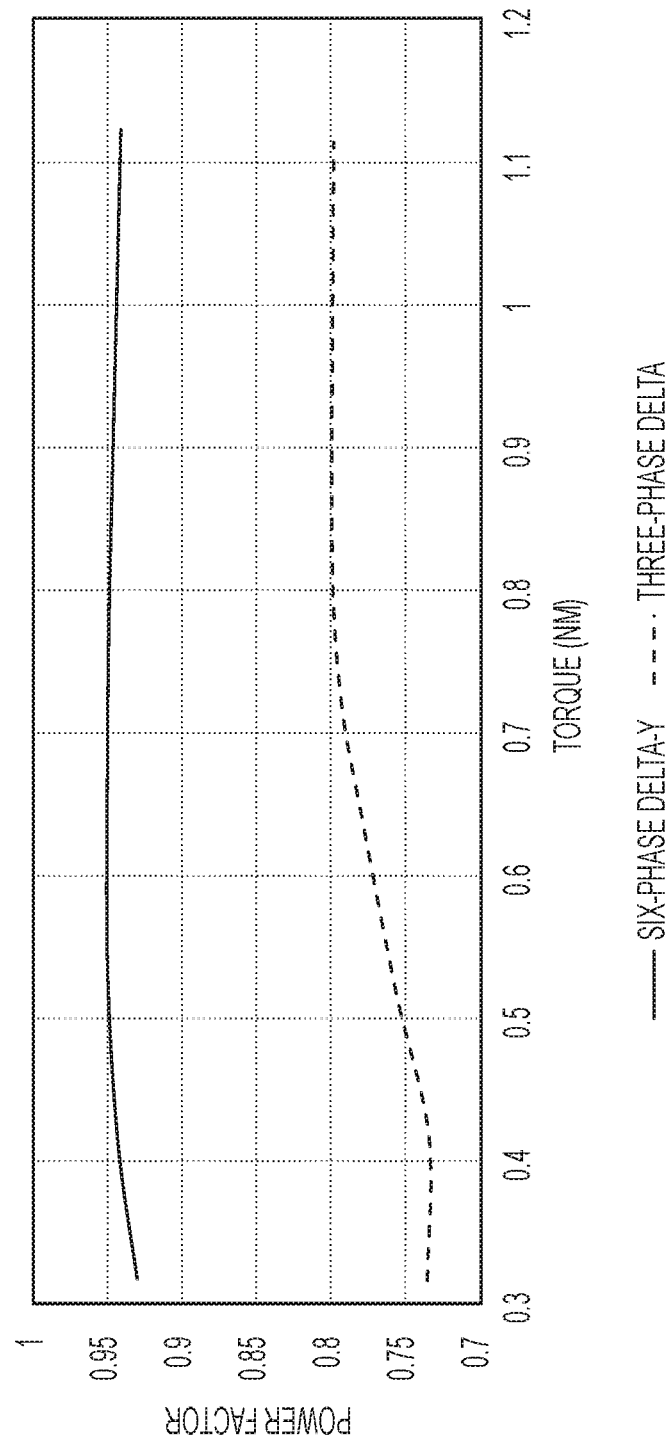
FIG. 44 depicts comparative waveform diagrams of power factor of a conventional three-phase motor, and power factor of a motor configured and controlled according to the six-phase commutation sequence of this disclosure, according to an embodiment.

This arrangement reduces the AC input current harmonics frequencies, which is needed to comply with certain regulatory standards. Also, since the AC input current waveform has a more sinusoidal shape, this arrangement significantly improves power factor. As shown in FIG. 44, the above-described embodiment improves power factor from under 0.8 to more than 0.9 and close to 0.95 in mid torque ranges.

Figure 45:
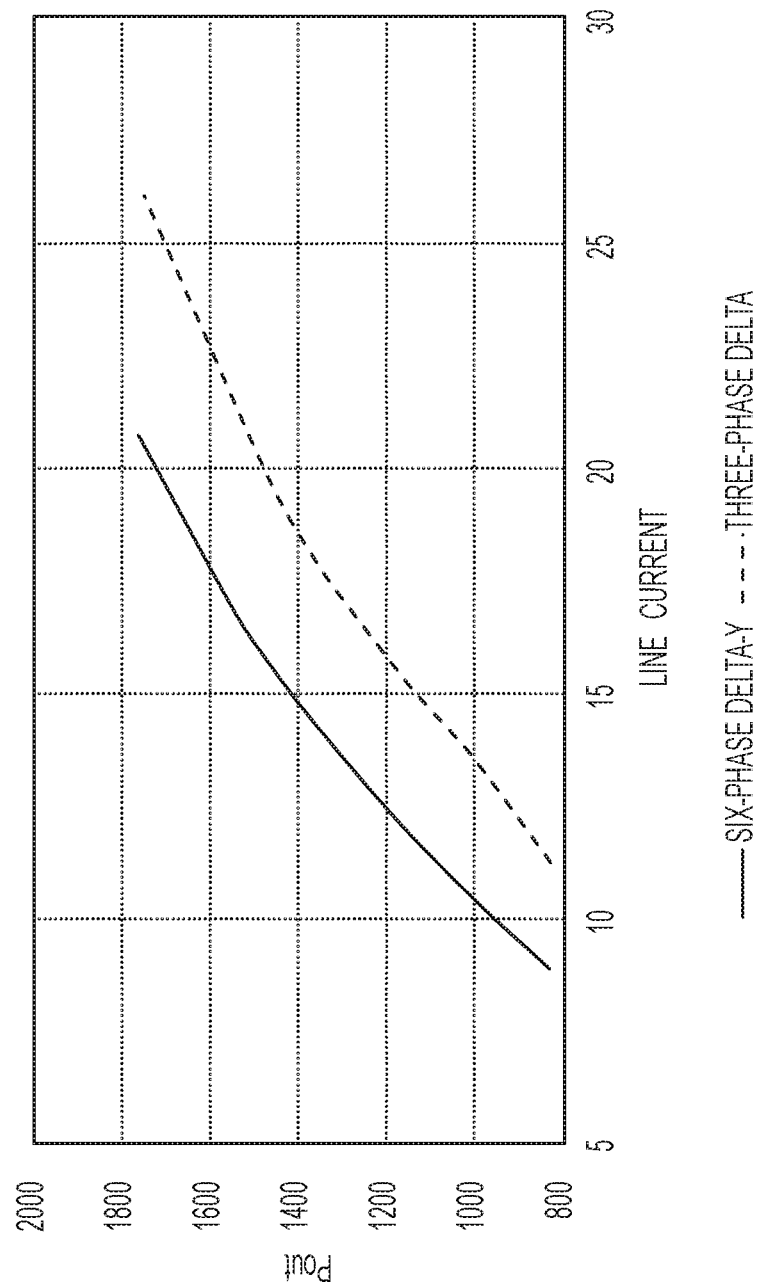
FIG. 45 depicts comparative waveform diagrams of power output of a conventional three-phase motor, and power output of a motor configured and controlled according to the six-phase commutation sequence of this disclosure, according to an embodiment.
Figure 46:
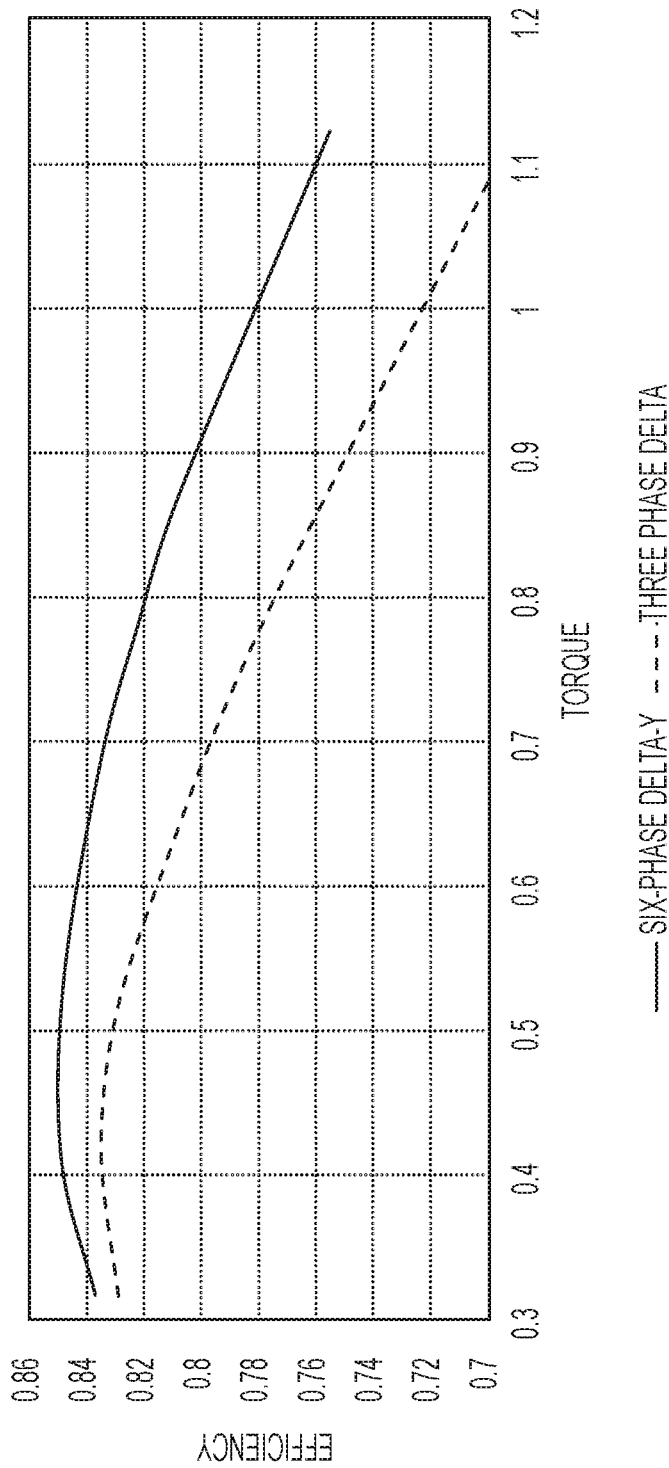
FIG. 46 depicts comparative waveform diagrams of system efficiency for a conventional three-phase motor, and system efficiency a motor configured and controlled according to the six-phase commutation sequence of this disclosure, according to an embodiment.

Moreover, as shown in FIG. 46, the above-described embodiment unexpectedly improves system efficiency, by approximately 5-10% in high torque ranges. Also, as shown in FIG. 45, the above-described embodiment significantly improves power output. Although it was originally expected by the inventor of this disclosure that the wye and delta would behave relatively independently, it is believed that the magnetic coupling between corresponding phases of the delta and wye connections indeed improves motor power output and system efficiency.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   an electric brushless direct current (BLDC) motor having a rotor and a stator defining a plurality of phases, the stator including a first set of stator windings and a second set of stator windings;
   a first set of battery terminals that couples to a first battery pack to receive direct current (DC) power from the first battery pack;
   a second set of battery terminals that couples to a second battery pack to receive direct current (DC) power from the second battery pack;
   a power unit including: a first switch circuit having output nodes connected electrically to the first set of stator windings, and a second switch circuit having output nodes connected electrically to the second set of stator windings;
   a selector switch configured to selectively couple the first set of battery terminals to input nodes of the second switch circuit in a single-battery pack mode of operation where the only first battery pack is provided so both the first set of stator windings and the second set of stator windings are powered from the first battery pack, and to selectively couple the second set of battery terminals to the input nodes of the second switch circuit in a dual-battery pack mode of operation where both the first battery pack and the second battery pack are provided so that the first set of stator windings is powered from the first battery pack and the second set of stator windings is powered from the second battery pack in parallel; and
   a controller configured to control switching operations of the first switch circuit and the second switch circuit to regulate a supply of power to the motor.

2. The power tool of claim 1, wherein the first and second battery packs both comprises removeable 20V max power tool battery packs.

3. The power tool of claim 1, wherein the first switch circuit and the second switch circuit both comprise a plurality of insulated-gate bipolar transistors (IGBTs) or a plurality of field-effect transistors (FETs).

4. The power tool of claim 1, wherein the first and second battery packs have the same maximum voltage and, when the first and second battery packs are both coupled to the first and second sets of battery terminals respectively, the controller controls the switching operations of the first switch circuit and the second switch circuit so as to approximately double the runtime of the first and second battery packs, and operate the motor at a voltage corresponding to the voltage of the first and second battery packs.

5. The power tool of claim 1, wherein the controller is configured to control motor commutation by concurrently driving the first switch circuit and the second switch circuit using one set of drive signals.

6. The power tool of claim 1, wherein the first set of windings and the second set of windings are alternatingly disposed around the stator.

7. The power tool of claim 1, wherein the selector switch includes no output nodes coupled to the first switch circuit.

8. The power tool of claim 1, wherein the first switch circuit is electrically isolated from the second switch circuit.

9. A power tool comprising:
   an electric brushless direct current (BLDC) motor having a rotor and a stator defining a plurality of phases associated with a plurality of windings;
   a power unit including a first switch circuit connected electrically between a first set of battery terminals and a first set of stator windings of the plurality of windings and a second switch circuit connected electrically between a second set of battery terminals and a second set of windings of the plurality of windings, wherein the first set of battery terminals receives direct current (DC) power from a first battery pack when coupled to the first battery pack, and the second set of battery terminals receives DC power from a second battery pack when coupled to the second battery pack;
   a selector switch that couples the first set of battery terminals to the second switch circuit in a first mode of operation where the first battery pack is coupled to the first set of battery terminals but the second battery pack is not coupled to the second set of battery terminals, but couples the second set of battery terminals to the second switch circuit in a second mode of operation where both the first battery pack and the second battery pack are respectively coupled to the first set of battery terminals and the second set of battery terminals; and
   a controller configured to control switching operations of the first switch circuit and the second switch circuit to regulate a supply of power to the motor such that, in the first mode of operation, the first switch circuit energizes the first set of stator windings from the first battery pack and the second switch circuit energizes the second set of stator windings from the second battery pack, the first and second switch circuits being electrically isolated so as to draw current in a parallel configuration from the first and second battery packs while electrically isolating the first and second battery packs to prevent flow of current between the first and second battery packs, and in the second mode of operation, both the first switch circuit and the second switch circuit respectively energize the first set of stator windings and the second set of stator windings from the first battery pack.

10. The power tool of claim 9, wherein first and second battery packs have the same maximum voltage and, when the first and second battery packs are both coupled to the first and second sets of battery terminals respectively, the controller controls the switching operations of the first switch circuit and the second switch circuit so as to approximately double the runtime of the first and second battery packs, and operate the motor at a voltage corresponding to the voltage of the first and second battery packs.

11. The power tool of claim 9, wherein the first and second battery packs both comprise removeable 20V max power tool battery packs.

12. The power tool of claim 9, wherein the first switch circuit and the second switch circuit both comprise a plurality of insulated-gate bipolar transistors (IGBTs).

13. The power tool of claim 9, wherein the first switch circuit and the second switch circuit both comprise a plurality of field-effect transistors (FETs).

14. The power tool of claim 9, wherein the controller is configured to control motor commutation by concurrently driving the first switch circuit and the second switch circuit using one set of drive signals.

15. The power tool of claim 9, wherein the selector switch includes no output nodes coupled to the first switch circuit.

16. A power tool comprising:
- an electric brushless direct current (BLDC) motor having a rotor and a stator defining a plurality of phases, the stator including a first set of stator windings and a second set of stator windings;
- a first power supply interface that receives direct current (DC) power from a first battery pack;
- a second power supply interface that receives direct current (DC) power from a second battery pack;
- a power unit including a first switch circuit and a second switch circuit arranged to respectively switchably energize the first set of stator windings and the second set of stator windings from one or both of the first battery pack and the second battery pack;
- a selector switch that couples the first battery pack to both the first switch circuit and the second switch circuit in a first switch position wherein only the first battery pack is coupled to the power tool, and couples the first battery pack to the first switch circuit and the second battery pack to the second switch circuit in a second switch position where both the first and the second battery packs are coupled to the power tool; and
- a controller configured to control switching operations of the first switch circuit and the second switch circuit to regulate a supply of power to the first set of stator windings and the second set of stator windings,
- wherein, in the second switch position, the power unit energizes the first set of stator windings from the first battery pack but not from the second battery pack, and energizes the second set of stator windings from the second battery pack but not from the first battery pack, such that the first and second battery packs supply power to the motor in a parallel configuration while electrically isolating the first and second battery packs, and
- wherein, in the first switch position, the power unit energizes both the first set of stator windings and the second stator windings from the first battery pack.

17. The power tool of claim 16, wherein the first switch circuit is electrically isolated from the second switch circuit.

* * * * *